(12) United States Patent
Dodge, III et al.

(10) Patent No.: US 8,728,260 B2
(45) Date of Patent: May 20, 2014

(54) RECYCLABLE SURFACE COVERING AND METHOD AND SYSTEM FOR MANUFACTURING A RECYCLABLE SURFACE COVERING

(75) Inventors: Arthur B. Dodge, III, Lancaster, PA (US); John McFalls, Lancaster, PA (US)

(73) Assignee: Ecore International Inc., Lancaster, PA (US)

( * ) Notice: Subject to any disclaimer, the term of this patent is extended or adjusted under 35 U.S.C. 154(b) by 290 days.

(21) Appl. No.: 12/756,954

(22) Filed: Apr. 8, 2010

(65) Prior Publication Data

US 2011/0189410 A1 Aug. 4, 2011

Related U.S. Application Data

(60) Provisional application No. 61/301,468, filed on Feb. 4, 2010.

(51) Int. Cl.
*B32B 25/16* (2006.01)
*B32B 38/04* (2006.01)
*B32B 37/06* (2006.01)

(52) U.S. Cl.
USPC ................................................ 156/60; 156/1

(58) Field of Classification Search
USPC ...................................................... 156/60, 1
See application file for complete search history.

(56) References Cited

U.S. PATENT DOCUMENTS

| | | |
|---|---|---|
| 2,336,235 A | 12/1943 | Fischer |
| 3,593,939 A | 7/1971 | Bolles |
| 3,865,059 A | 2/1975 | Jackson |
| 3,975,562 A | 8/1976 | Madebach et al. |
| 4,123,313 A | 10/1978 | Queen et al. |
| 4,128,523 A | 12/1978 | Britton et al. |
| 4,405,668 A | 9/1983 | Wald |
| 4,942,072 A | 7/1990 | Chung |
| 6,203,879 B1 | 3/2001 | Desai |
| 2003/0203152 A1 | 10/2003 | Higgins et al. |
| 2004/0211130 A1 | 10/2004 | Horstman et al. |
| 2004/0255538 A1 | 12/2004 | Ruhdorfer |
| 2006/0105136 A1 | 5/2006 | Brazier et al. |

(Continued)

OTHER PUBLICATIONS

International Search Report and Written Opinion issued on Mar. 9, 20, 2011, in PCT/US 10/56548 filed Nov. 12, 2010.

(Continued)

*Primary Examiner* — Brent O'Hern
(74) *Attorney, Agent, or Firm* — McKenna Long & Aldridge LLP

(57) ABSTRACT

A process and system for making a laminated surface covering and the surface covering itself are described. The covering includes several layers bonded to each other. The system performs the process. One example of the process includes passing a first material across a first conveyor, passing a second material across a second conveyor, passing a bonding material across a third conveyor, contacting the first material and the second material to the bonding material, and heating at least one of the first material and the second material. The process also includes introducing the first material, the second material, and the bonding material into a pressure zone such that the bonding material is introduced between a bottom surface of the first material and a top surface of the second material. The process applies pressure to bond the first material and second material together via the bonding material to produce a laminated material.

24 Claims, 50 Drawing Sheets

(56) References Cited

U.S. PATENT DOCUMENTS

| | | |
|---|---|---|
| 2006/0127647 A1 | 6/2006 | Thrush |
| 2006/0165950 A1 | 7/2006 | Dodge, III |
| 2007/0059543 A1* | 3/2007 | Kornfalt et al. ............... 428/502 |
| 2007/0178794 A1 | 8/2007 | Nishio et al. |
| 2007/0254131 A1 | 11/2007 | Shail et al. |
| 2007/0275207 A1* | 11/2007 | Higgins et al. ................. 428/95 |
| 2008/0261004 A1 | 10/2008 | Higgins et al. |
| 2008/0274307 A1 | 11/2008 | Chereau et al. |
| 2009/0032180 A1 | 2/2009 | O'Connor |
| 2009/0120007 A1 | 5/2009 | Aritake et al. |
| 2011/0167744 A1 | 7/2011 | Whispell et al. |

OTHER PUBLICATIONS

Hot Melt Adhesive Models 775 I Black Bros. Co.—"Adhesive Spreaders and Roll Coaters Bulletin.pdf" —http://www.blackbros.com/products/coaters_and_glue_spreaders/model775_hot_melt_adhesive_spreader Accessed Mar. 15, 2010, 9 Pages.

"Puzzletile", http://www.regupol.com, Sep. 1, 2005, 12 pages.

"Carpeted Kids Playroom Flooring (interlocking carpet tiles) Premium SoftCarpet", http:.//www.matsmatsmats.com/kids/playroom-floor/soft-carpet.html, Sep. 8, 2011, 37 pages.

"Interlocking Tile Installation", http://www.ecosurfaces.com/pdfs/TechManuals/TechManual_InterlockingTiles.pdf, Sep. 10, 2010, pp.1-3.

* cited by examiner

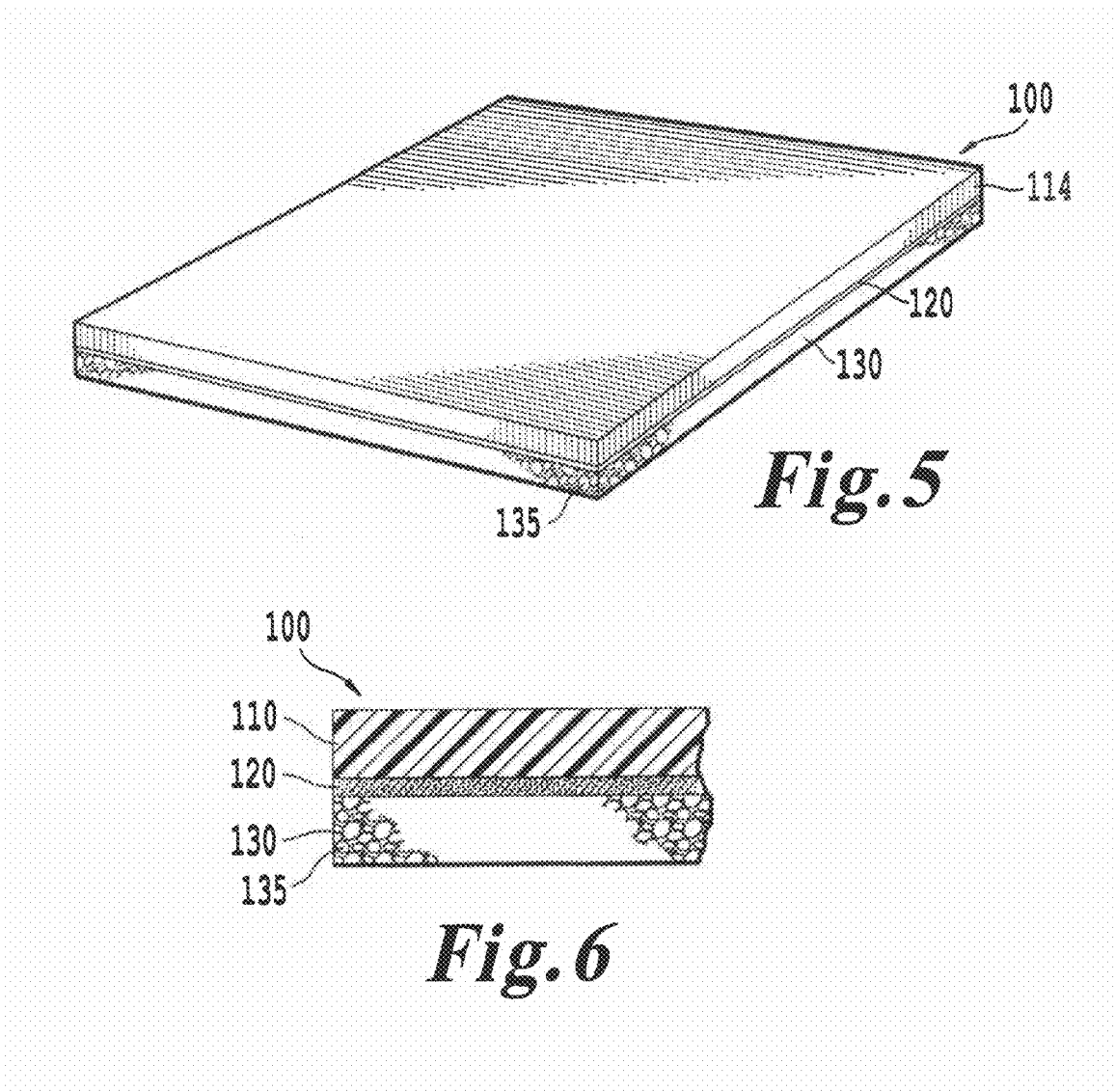

Fig. 8

| 10 UNWIND STATION FOR BACKING MATERIAL |
|---|
| 11 SPLICE STATION FOR BACKING MATERIAL |
| 12 UNWIND STATION FOR FACING MATERIAL |
| 13 SPLICE STATION FOR FACING MATERIAL |
| 14 BONDING LAYER UNWIND STATION |
| 15 LAMINATOR |
| 16 COOLING CONVEYOR |
| 17 OPTIONAL INSPECTION STATION |
| 18 ACCUMULATOR |
| 19 REWIND SYSTEM / 22-23 CONTINOUS DIE CUTTING |
| 22-23 OPTIONAL DIE-CUTTING |

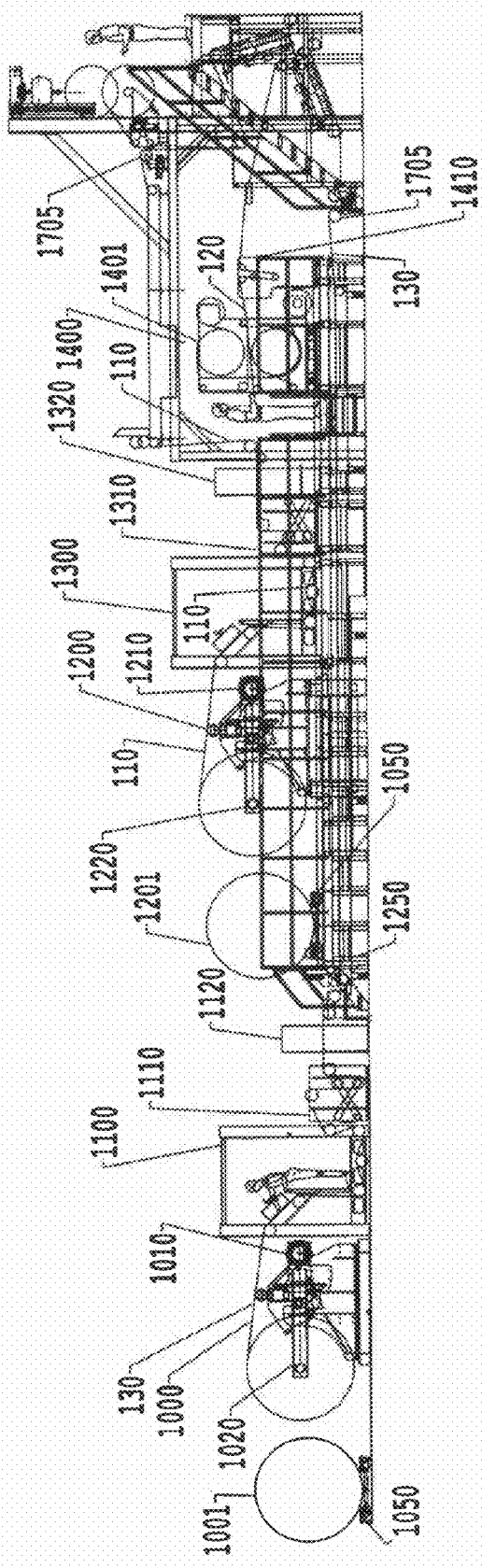

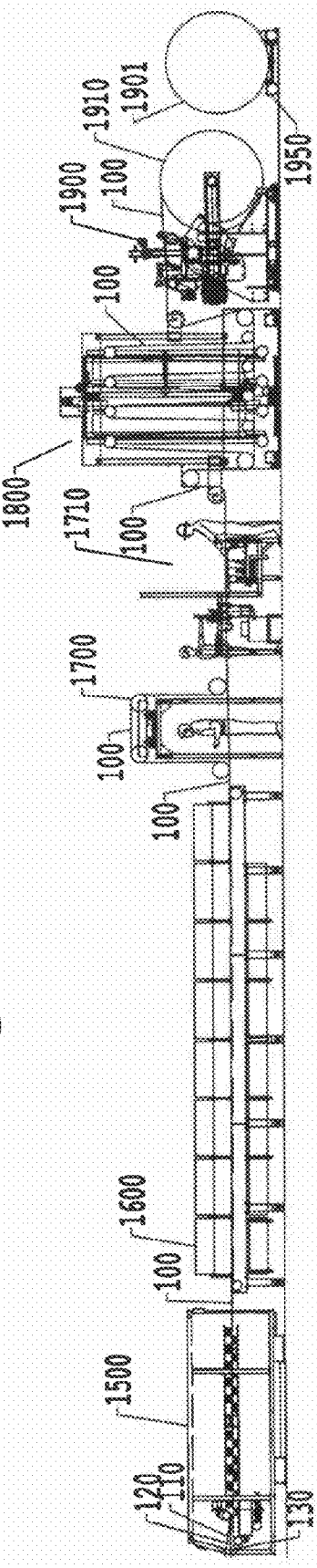

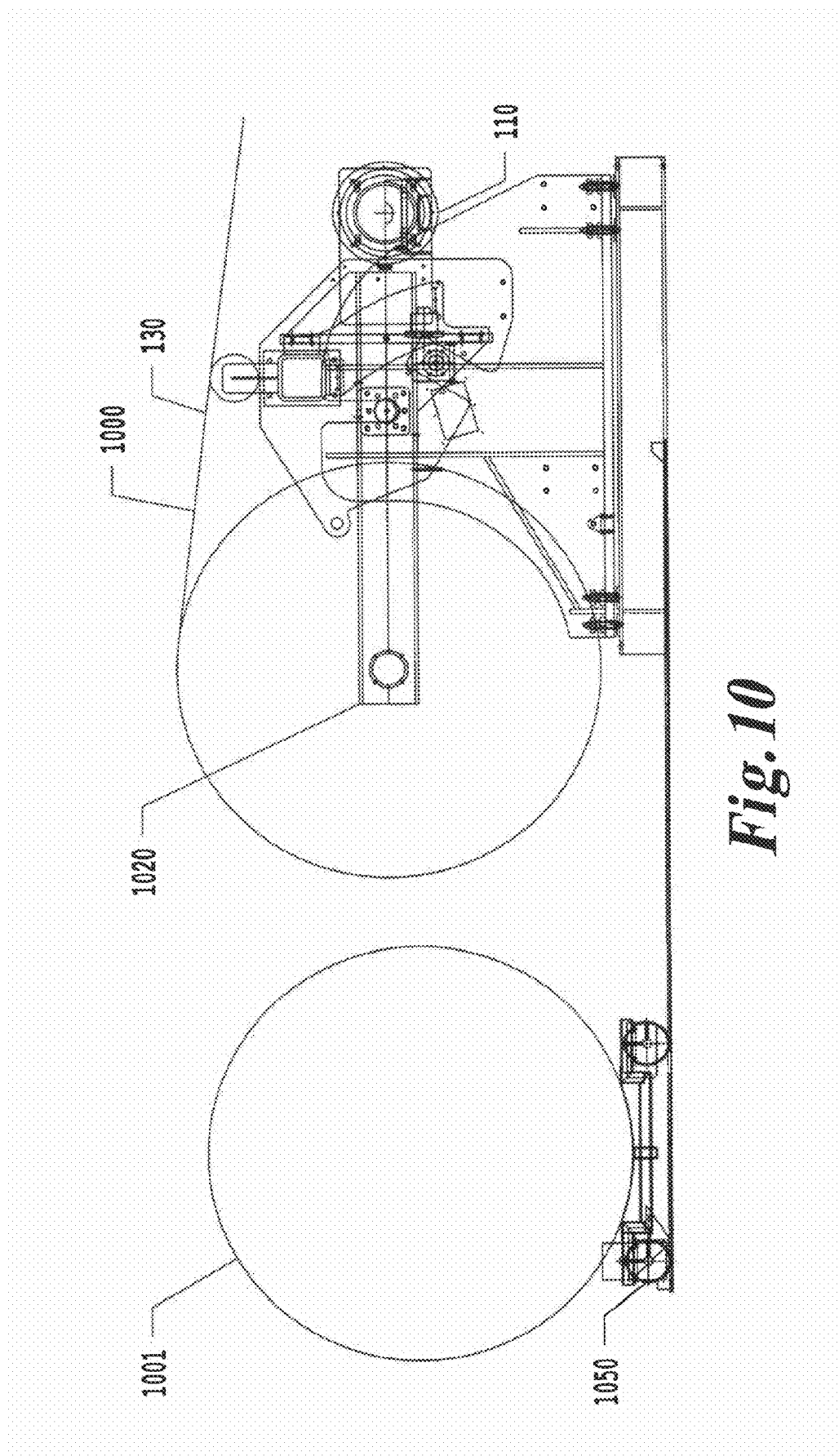

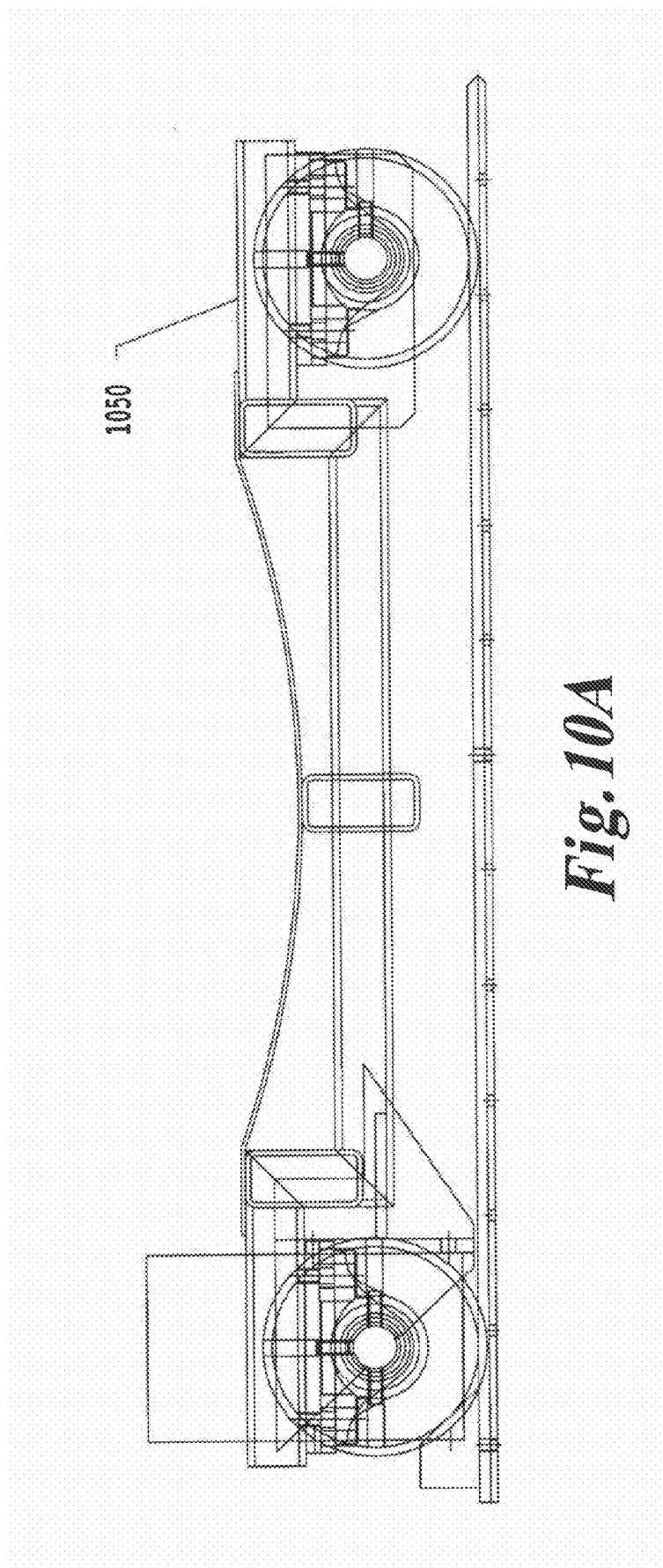

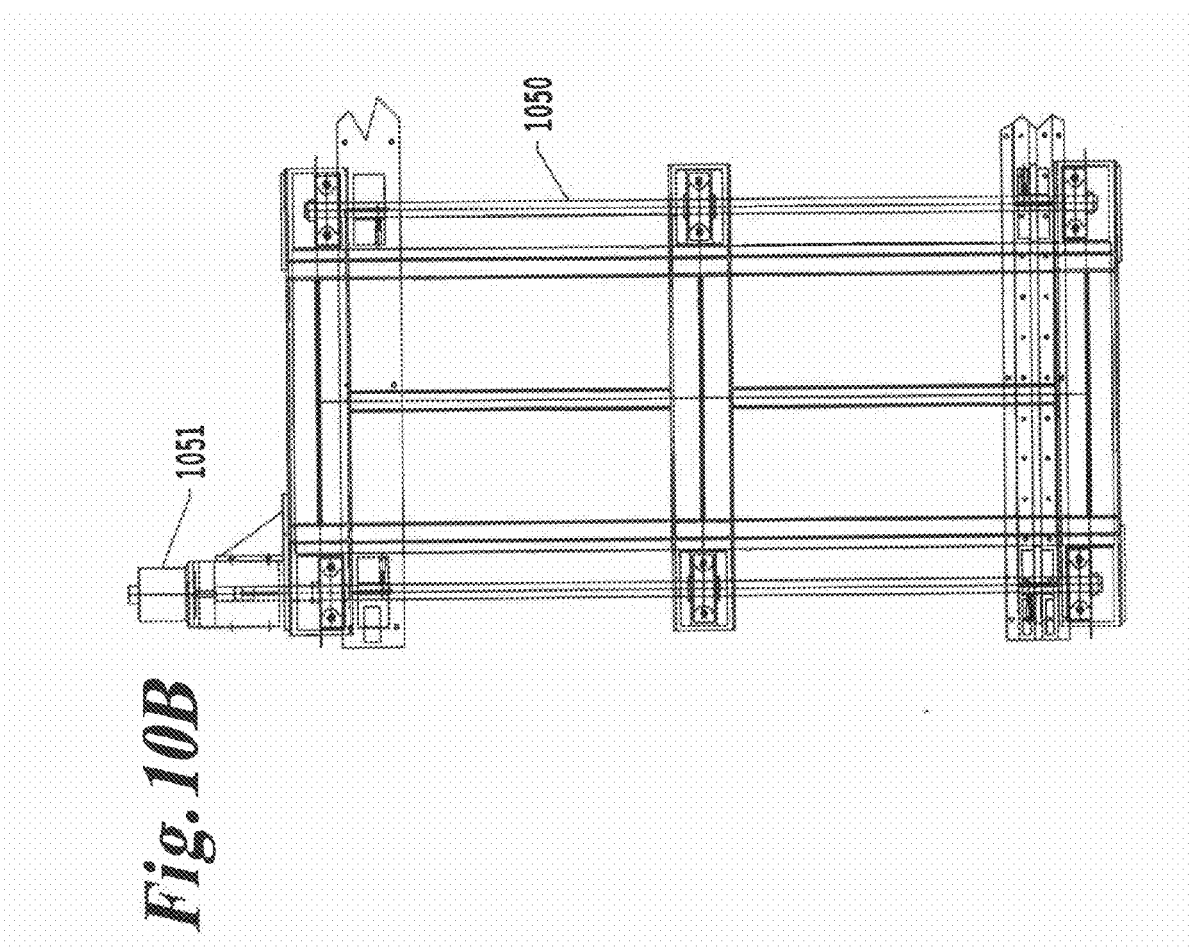

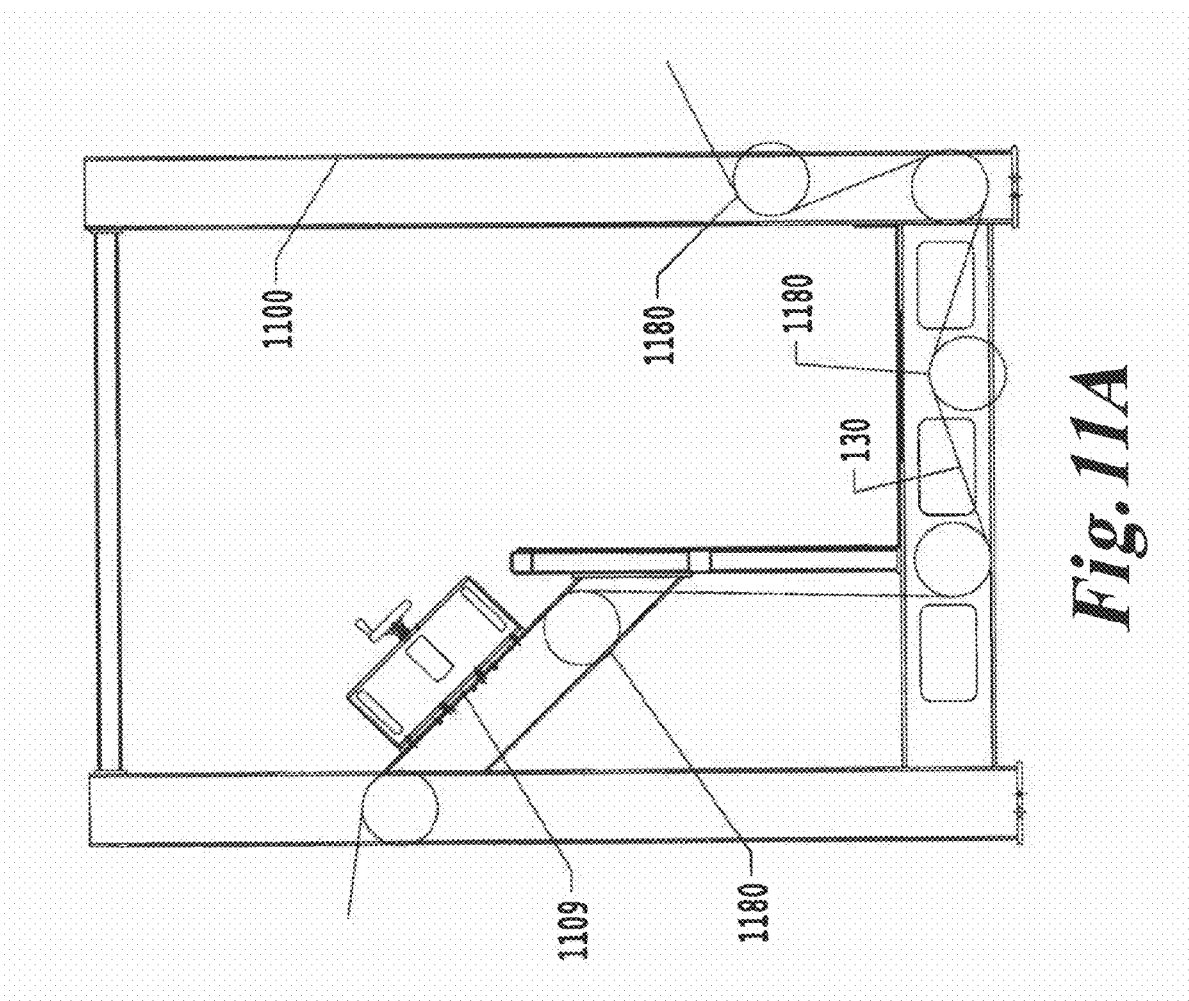

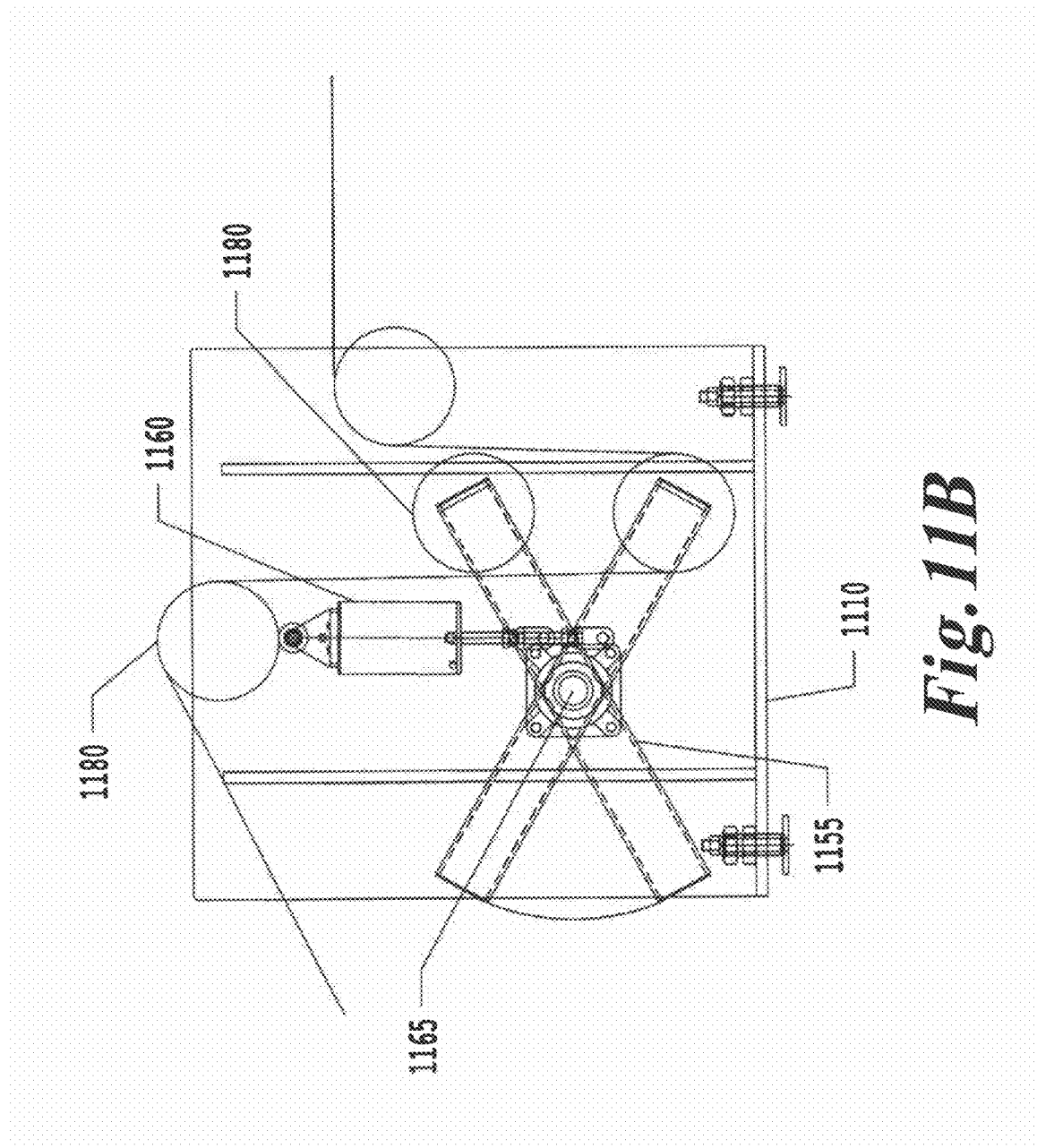

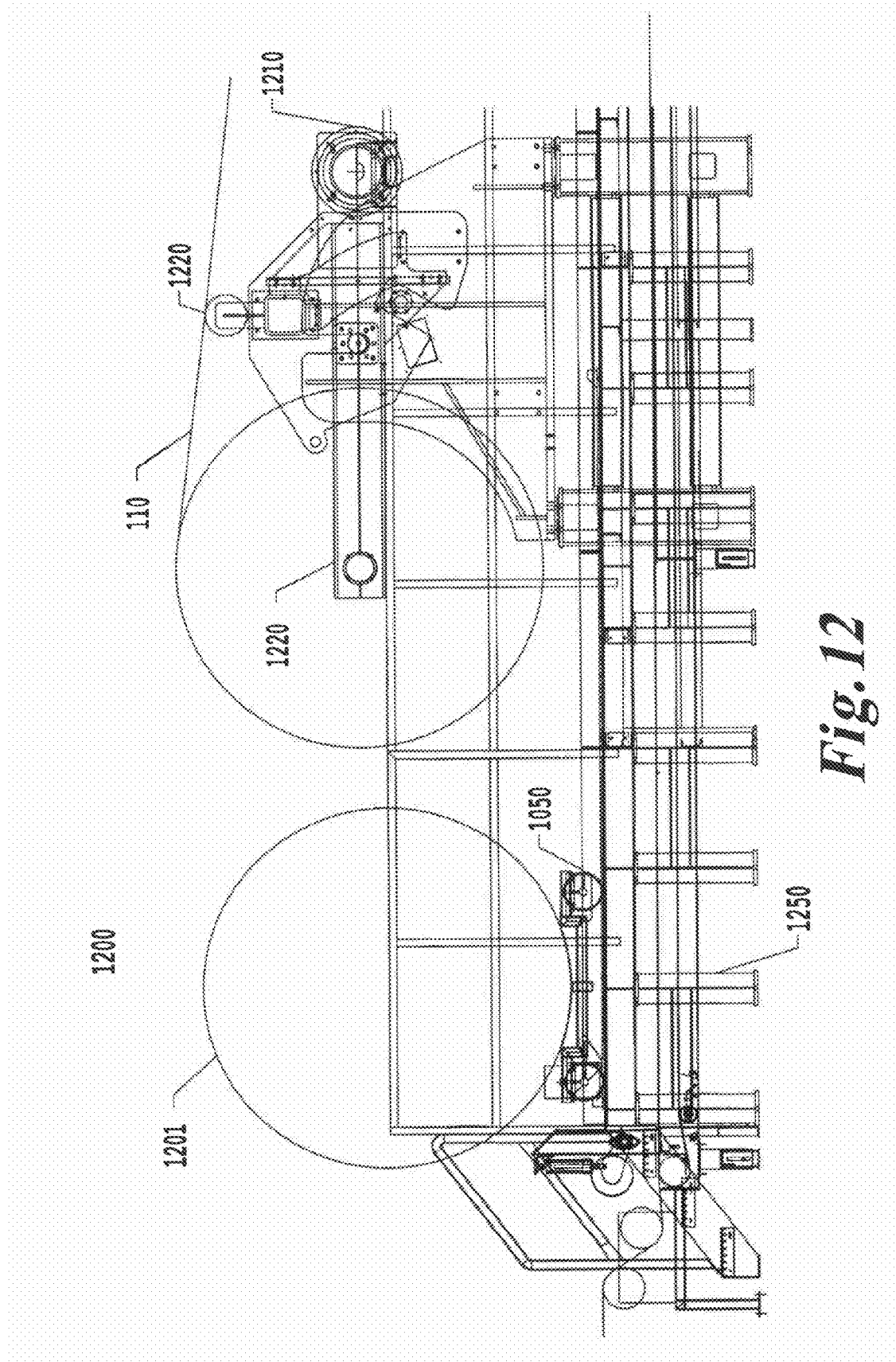

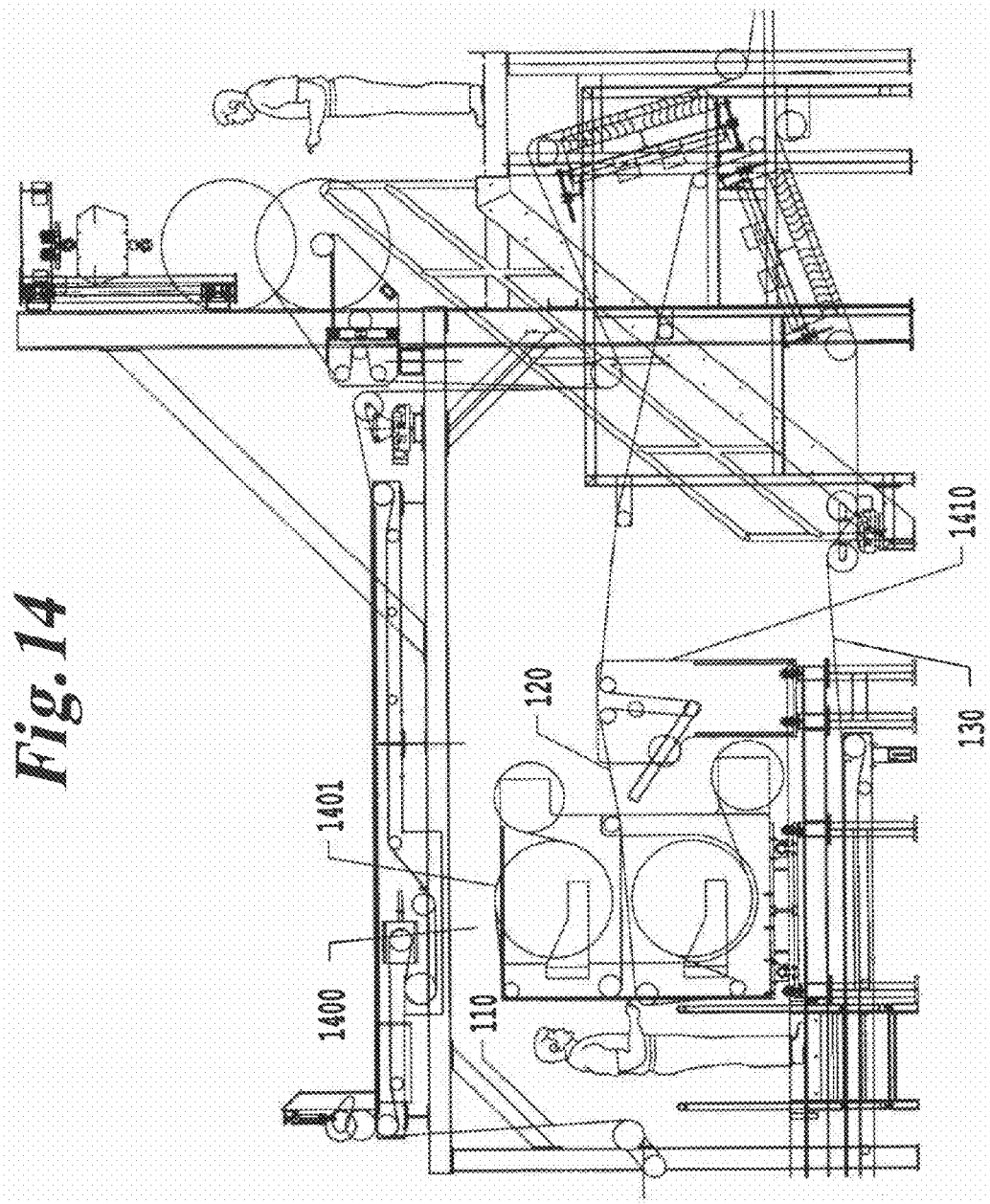

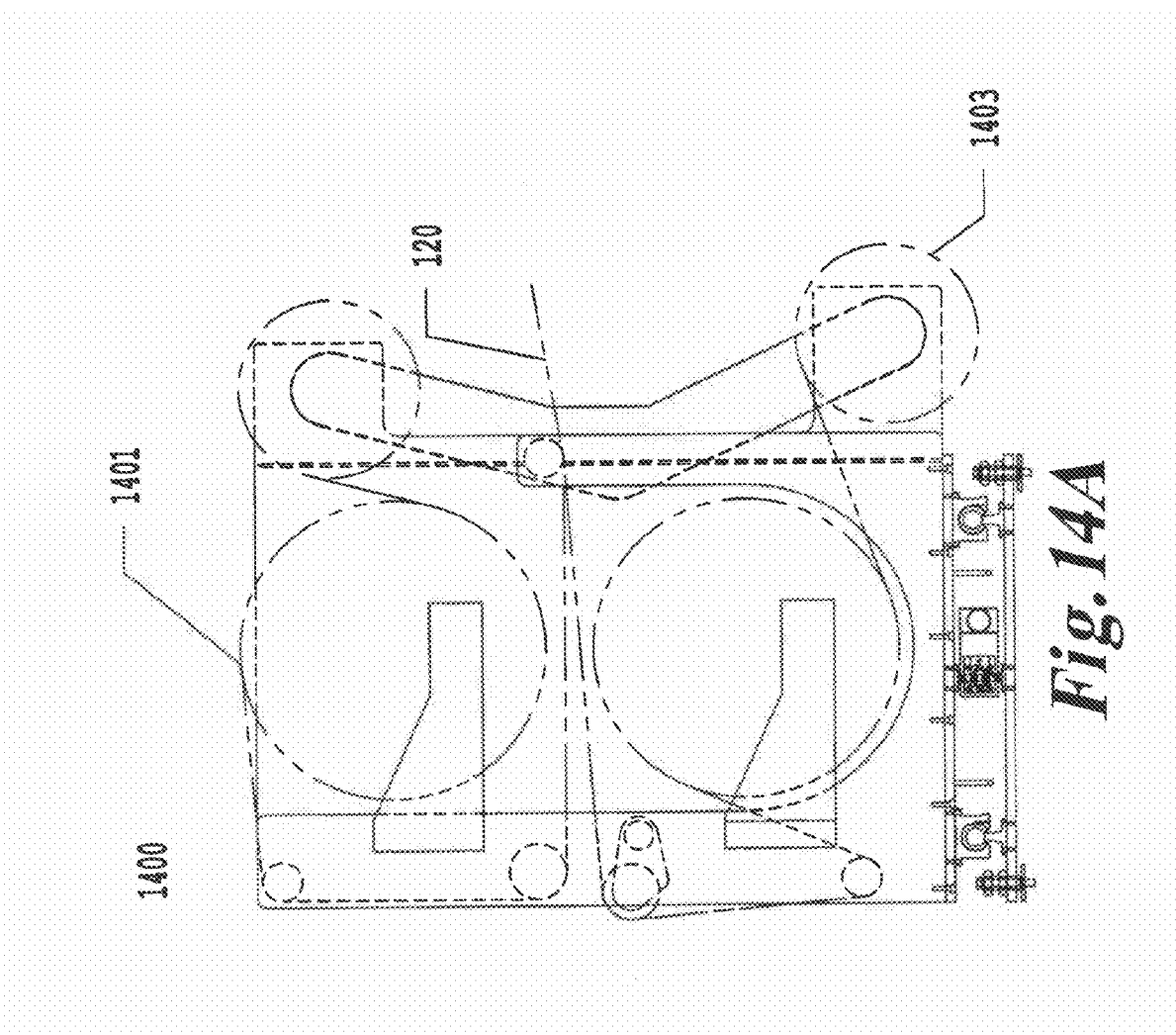

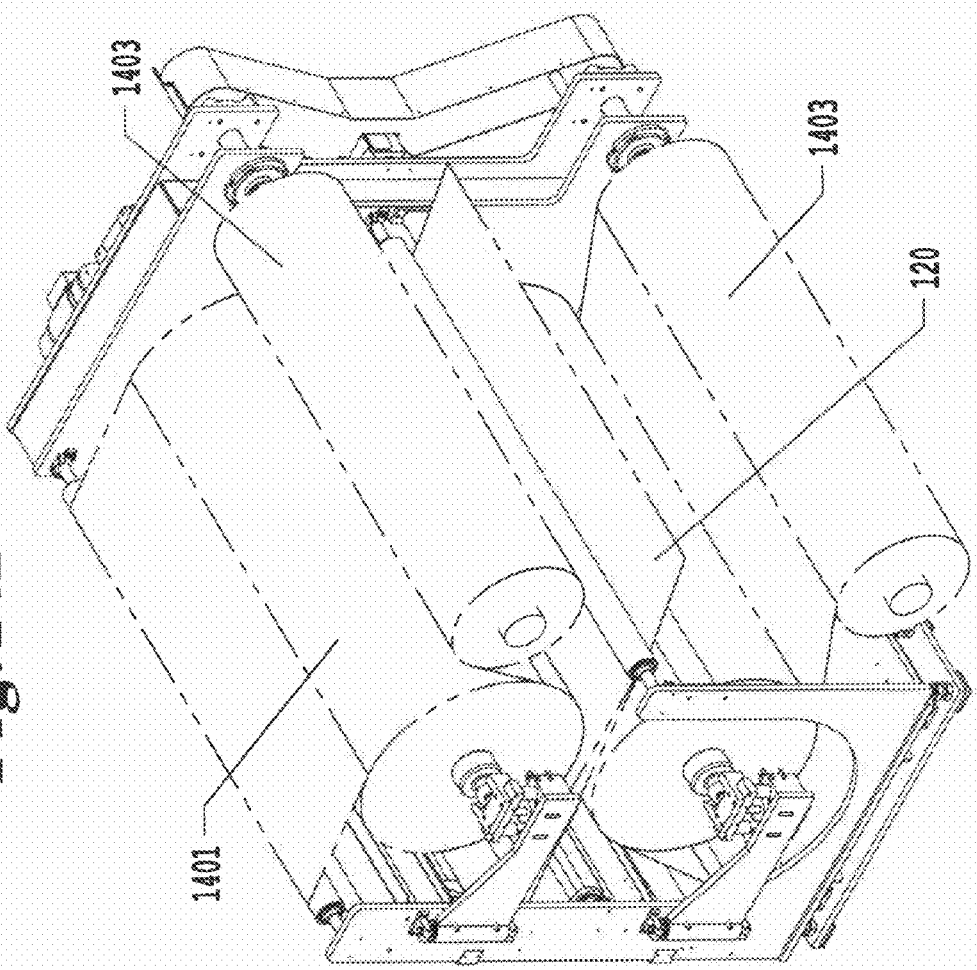

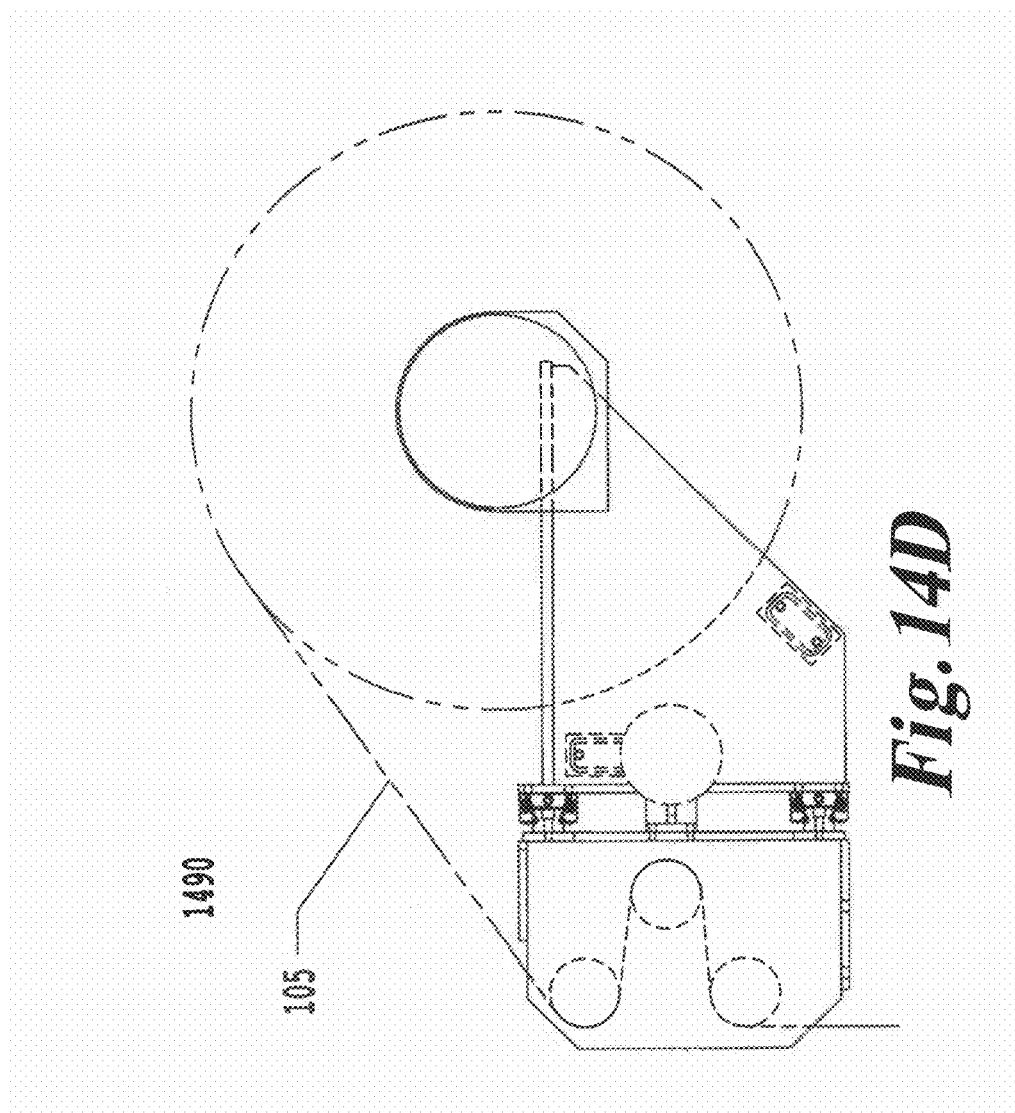

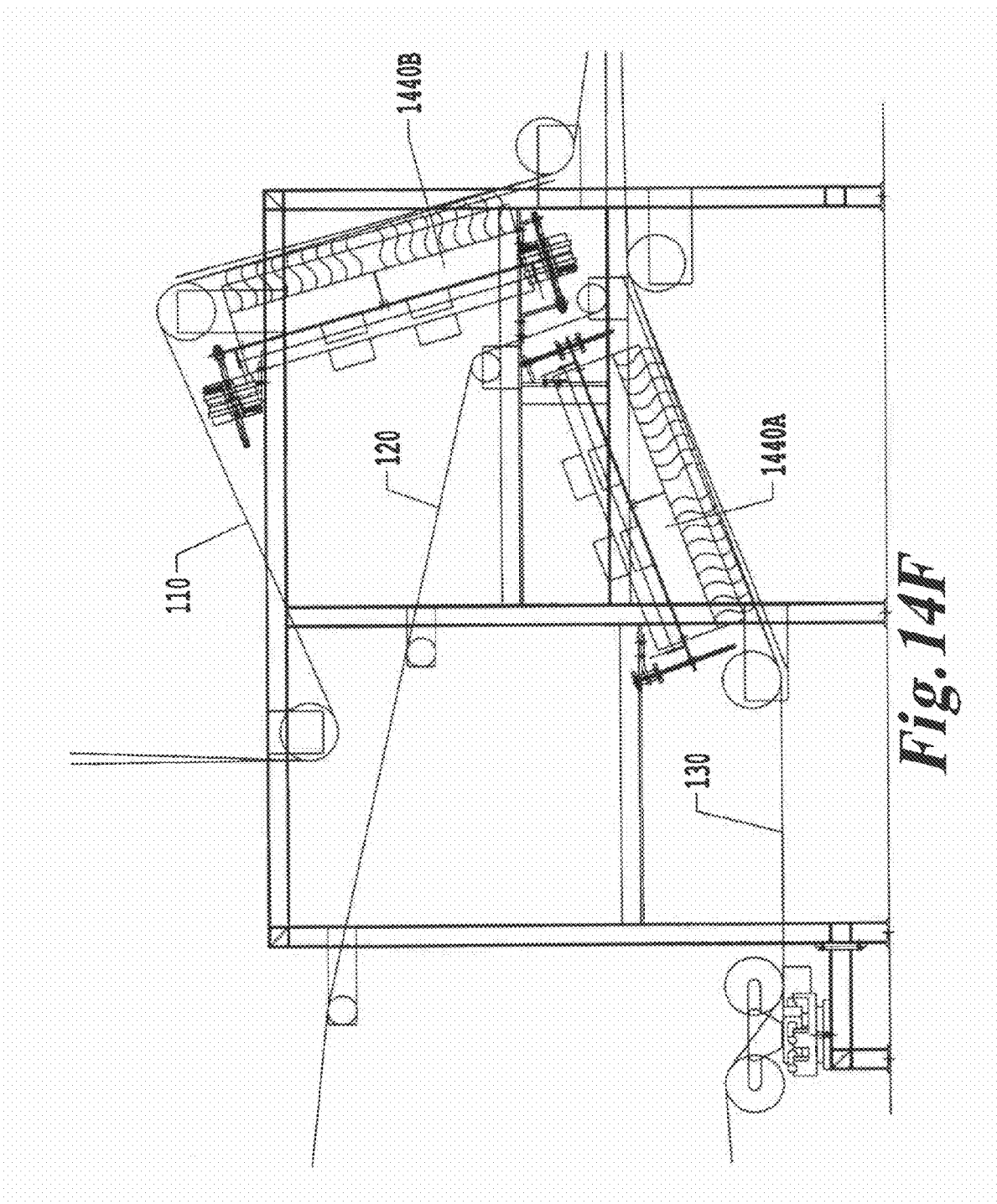

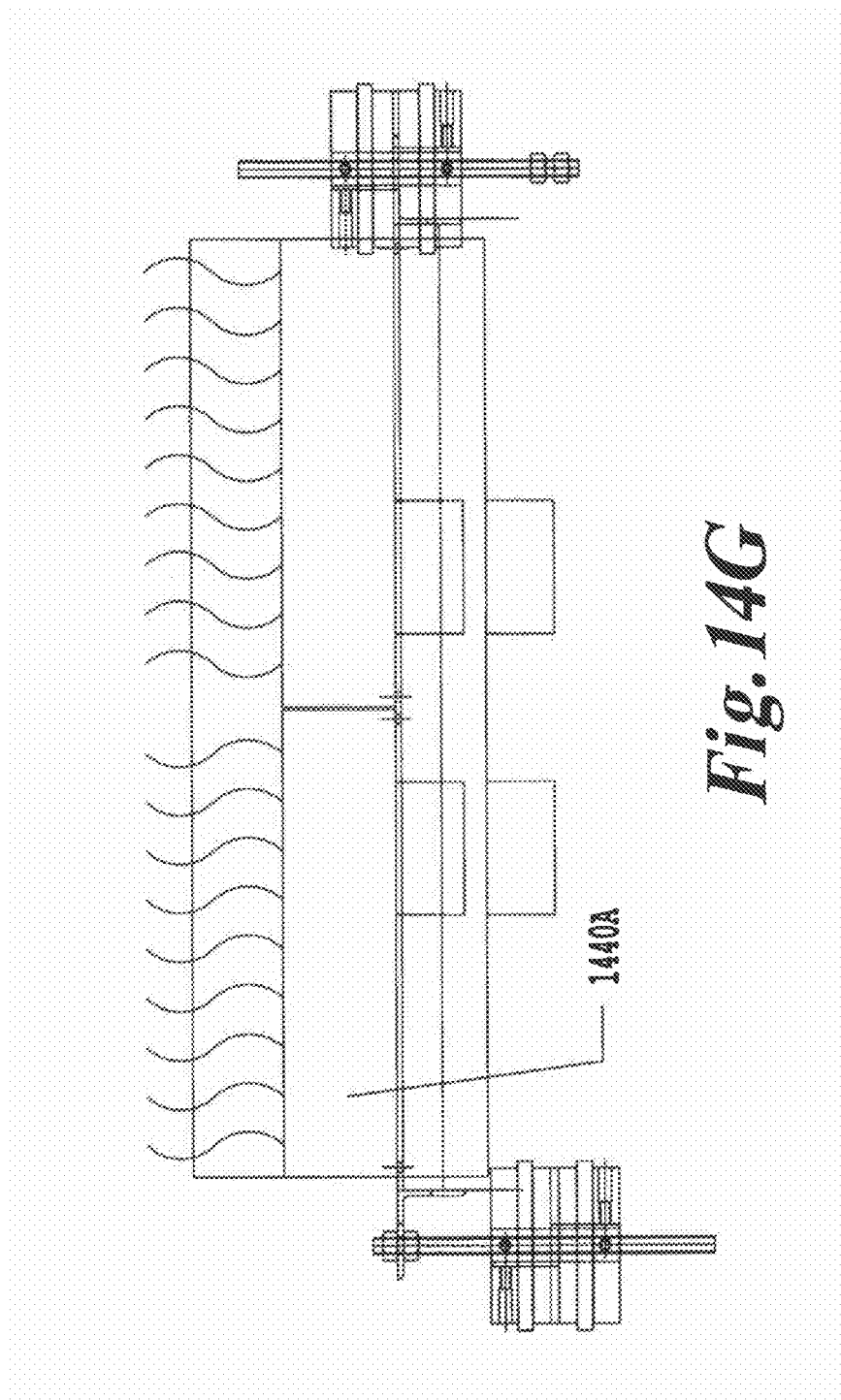

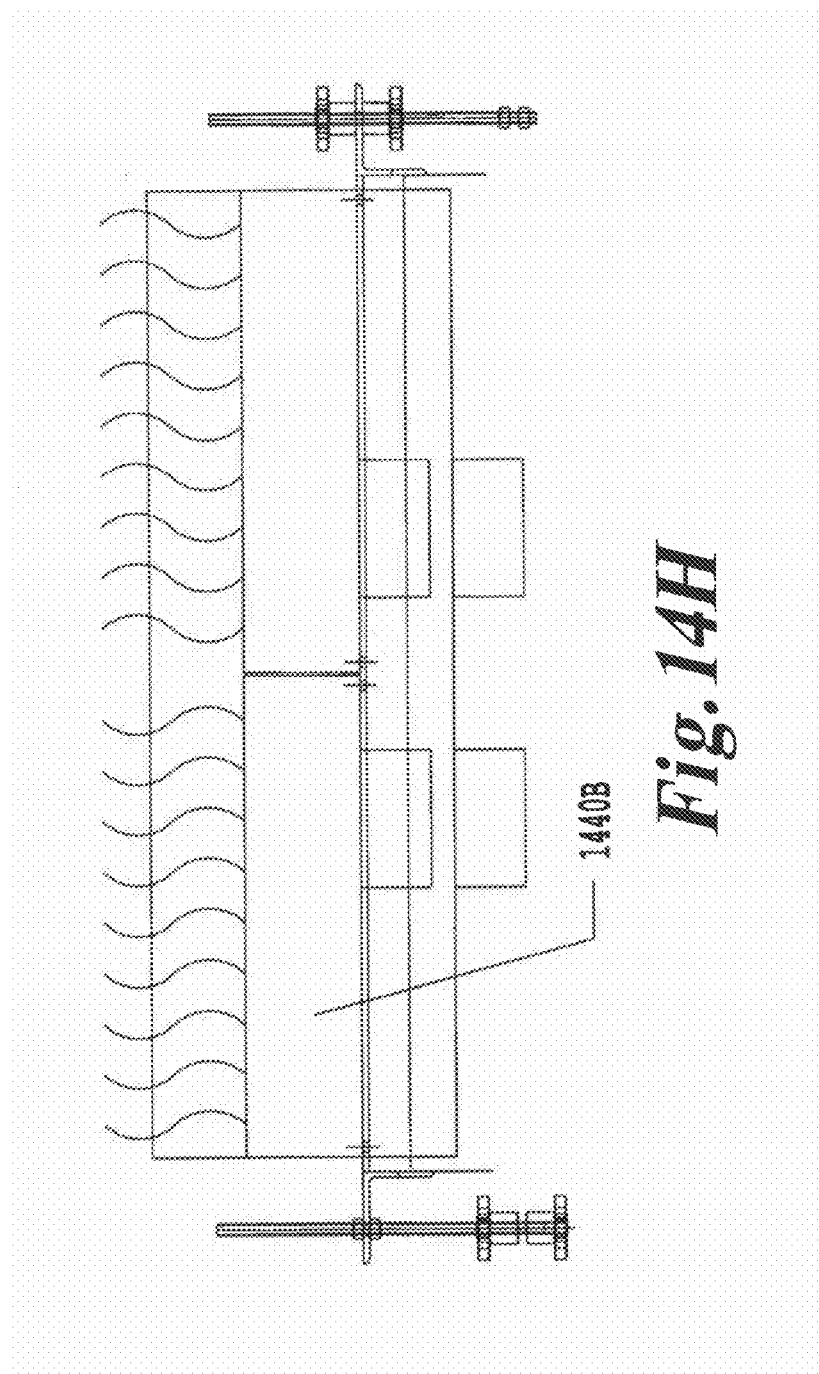

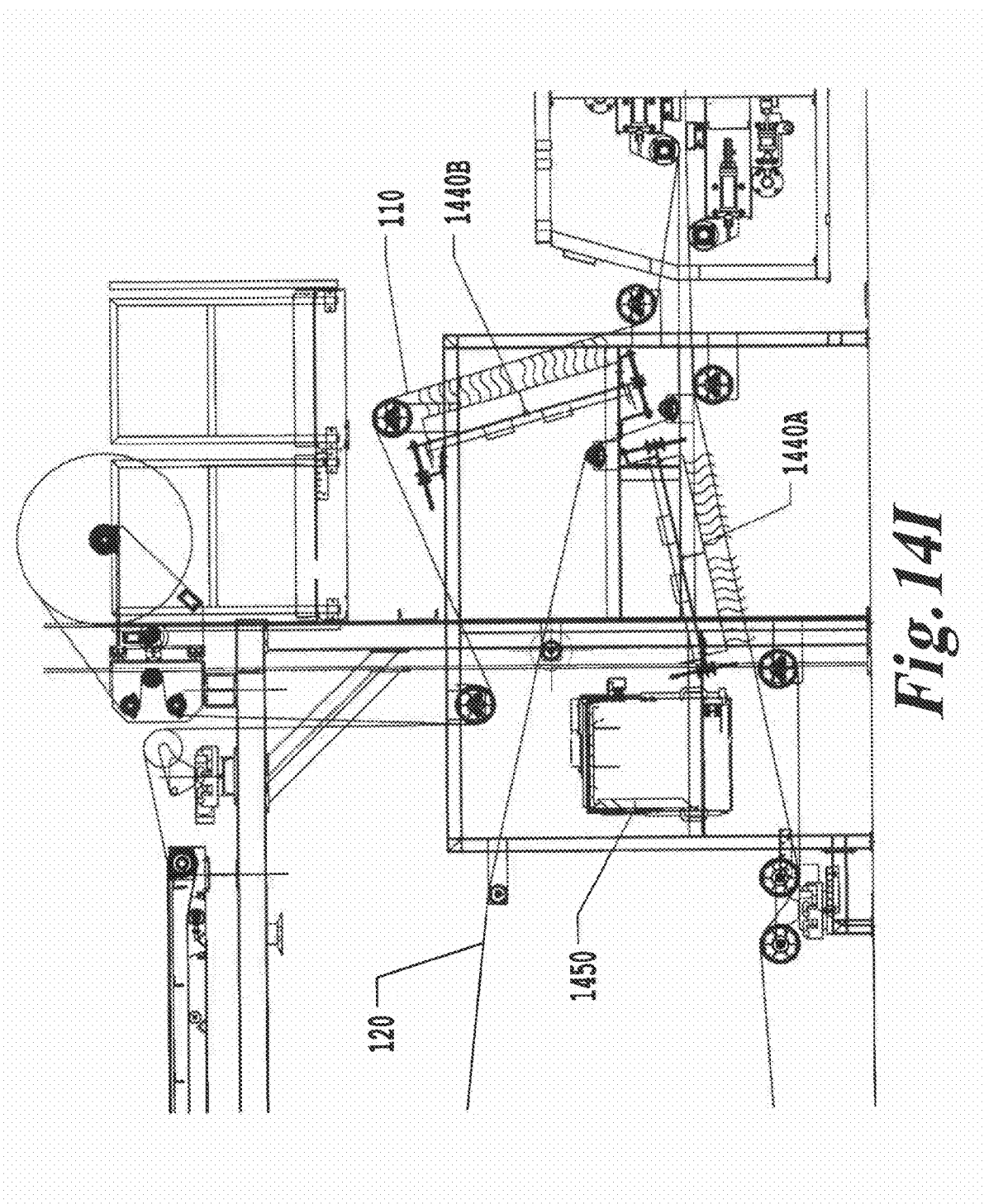

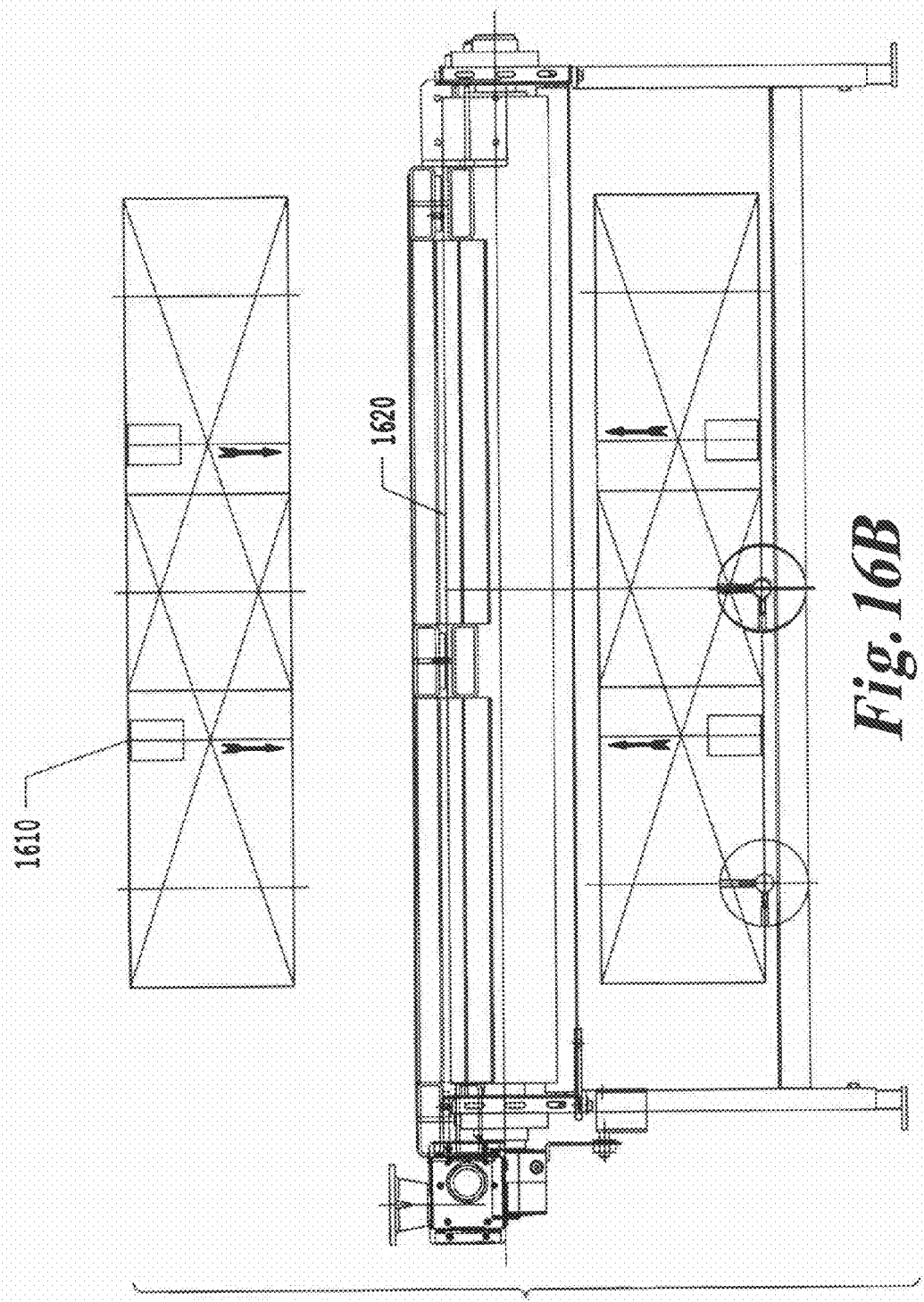

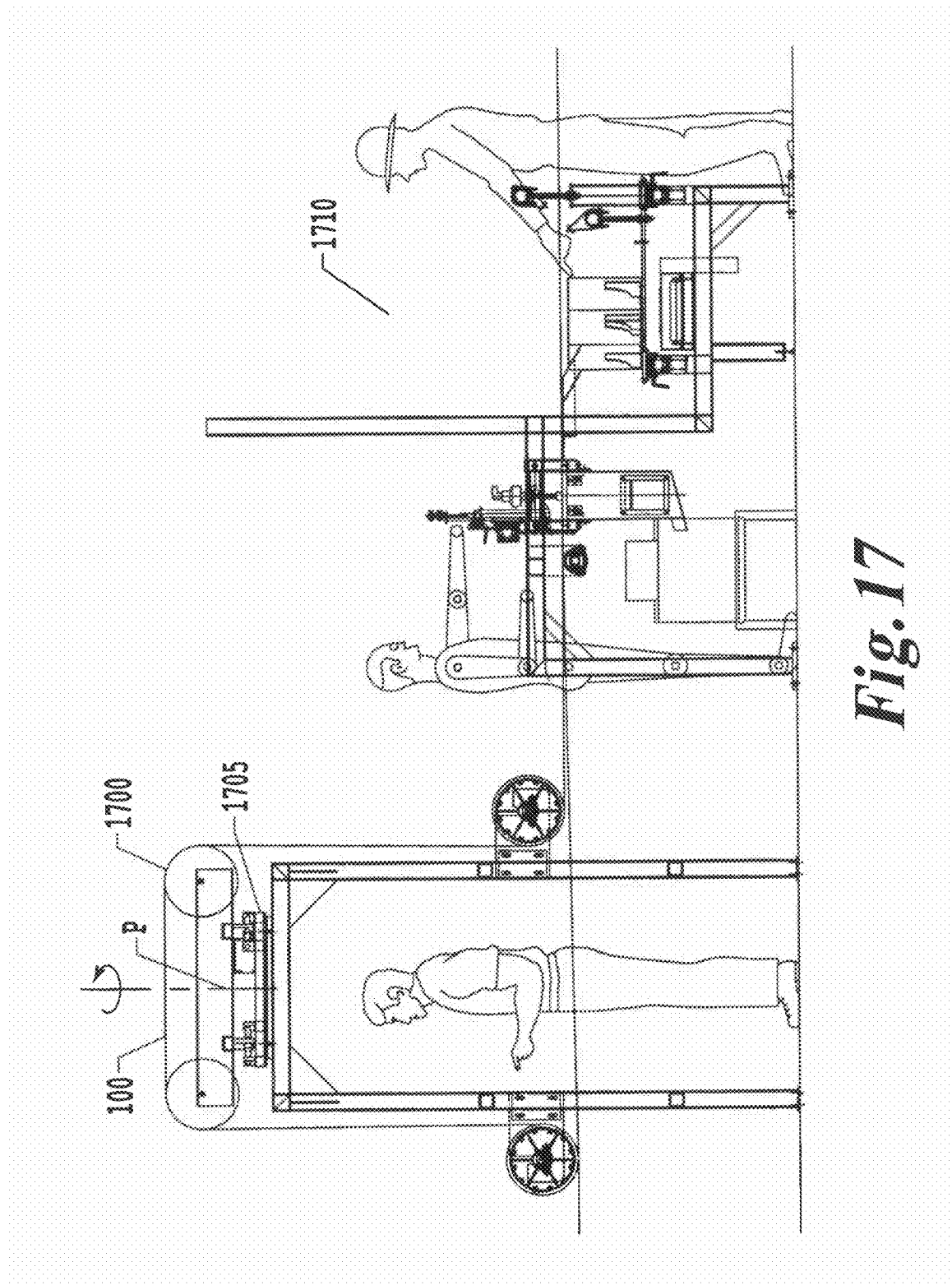

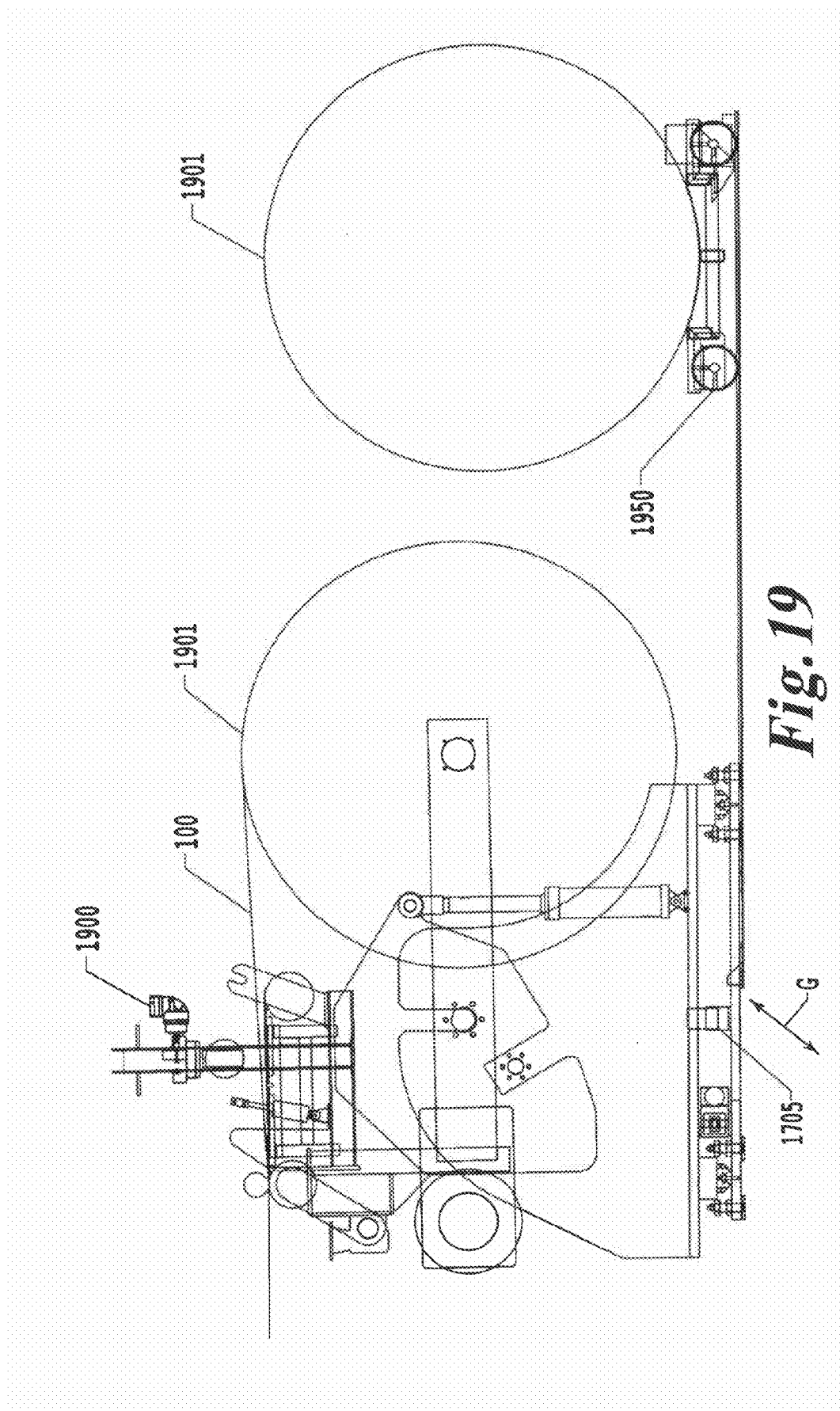

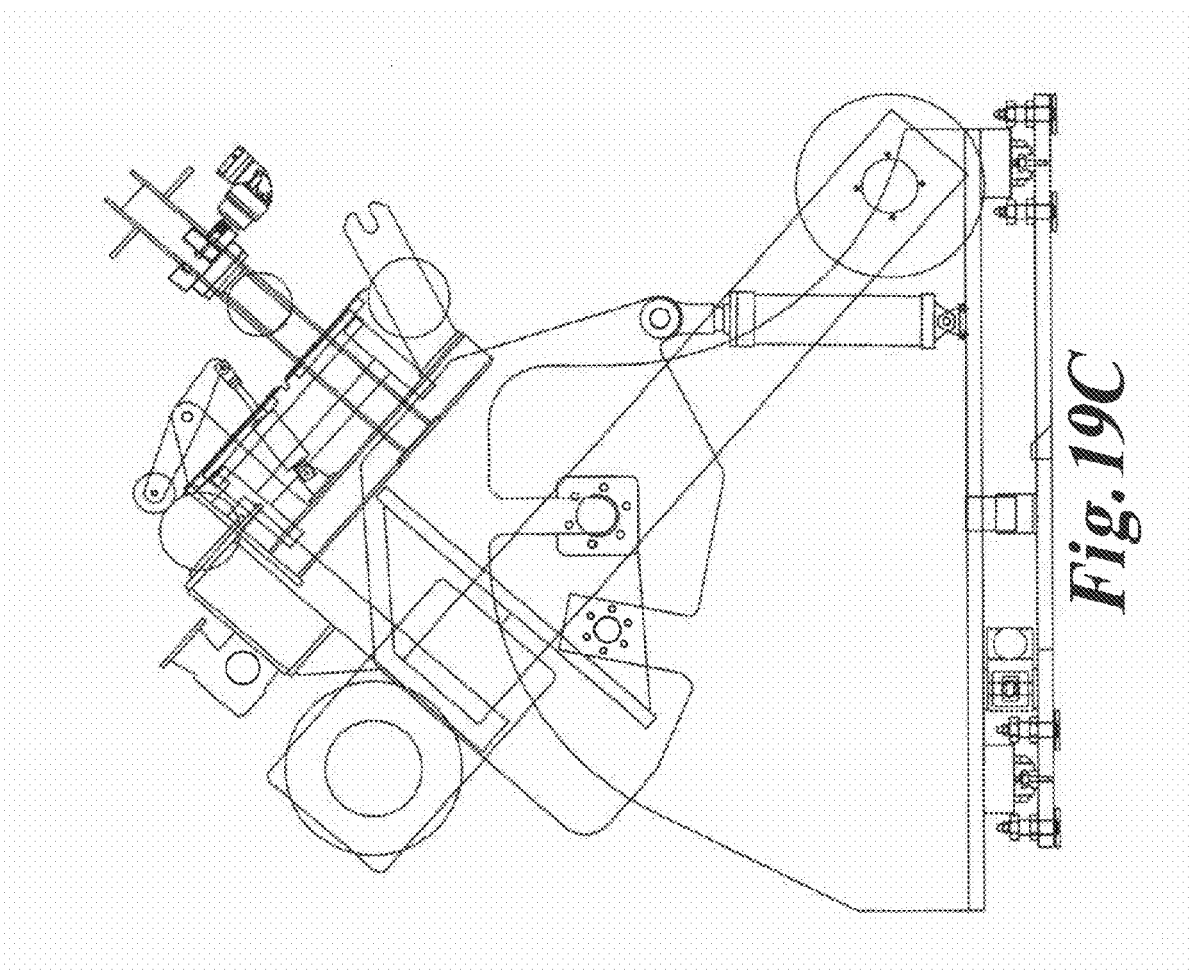

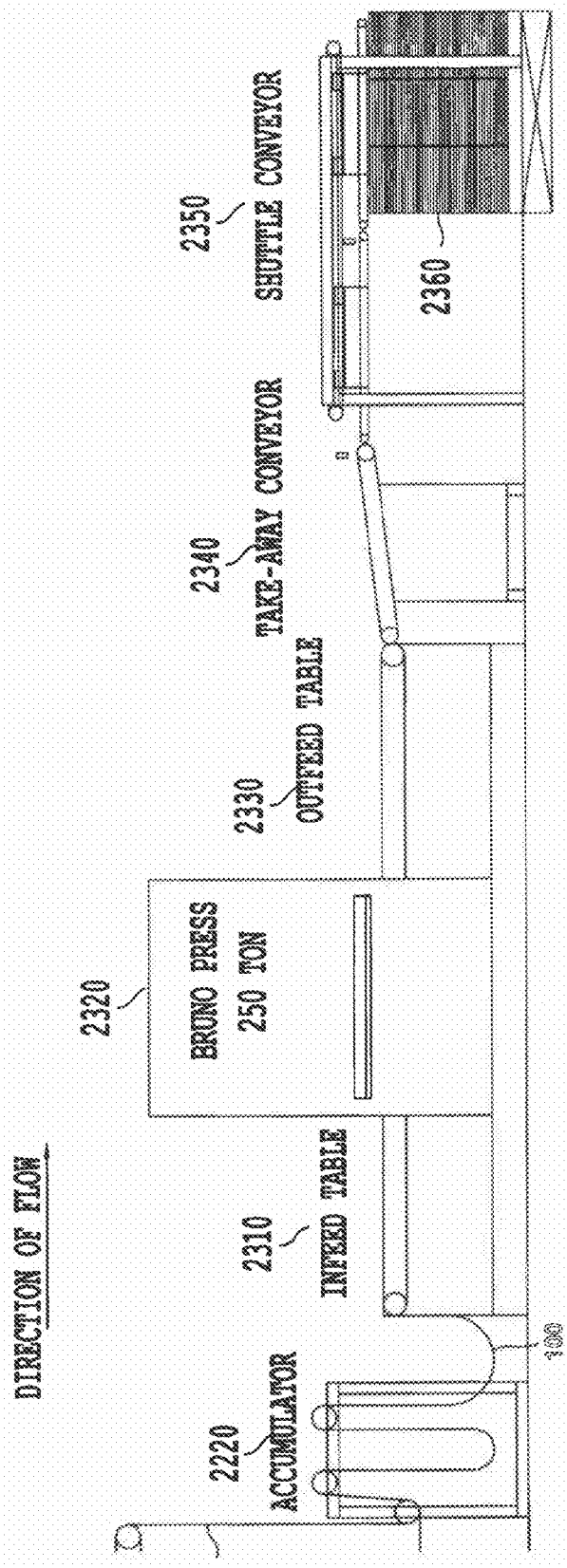

RECYCLABLE SURFACE COVERING AND METHOD AND SYSTEM FOR MANUFACTURING A RECYCLABLE SURFACE COVERING

CROSS-REFERENCE TO RELATED APPLICATIONS

The present application claims priority to U.S. provisional application Ser. No. 61/301,468, the entire contents of which are hereby incorporated by reference herein.

BACKGROUND OF THE INVENTION

1. Field of the Invention

One embodiment of the invention relates to various types of recyclable surface coverings. For example, the recyclable surface coverings include granulated rubber bottom layers in combination with surface layers bonded to the granulated bottom layers. Another aspect of the invention relates to a system, such as a manufacturing line, that produces the above-noted recyclable surface covering. Another aspect of the invention relates to a process for manufacturing the above-noted recyclable surface covering.

2. Description of the Related Art

Recyclable floor coverings include carpet, matting, wood, and tile. Carpet and matting, for example, rubber matting, typically require substantial amounts of solvents and/or adhesives during production or installation. Conventional solvents and adhesives produce emissions, which can be harmful to the environment.

Additionally, disposal of conventional carpets and matting poses difficulties inasmuch as these materials can be difficult to recycle. For example, conventional carpets and mattings are often formed of dissimilar materials, and therefore, conventional recycling techniques, which may include liquidation of the materials to be recycled, are relatively ineffective.

For example, one type of floor covering provides a flocked layer of nylon fibers electrostatically flocked onto a polyvinylchloride (PVC) backing. In production of this material, a glass fiber layer is added between a PVC backing and a flocking to provide dimensional stability. The flocked floor covering is screen printed to provide a wide range of patterns and colors. However, PVC is generally not considered to be easily recyclable. Furthermore, heating PVC, for example, in a liquidation process, produces hazardous fumes. Additionally, the need to add a glass fiber increases manufacturing complexity and cost. Furthermore, the glass fiber material itself may be difficult to recycle.

An alternative form of surface covering provides a flocked layer adhered to a substrate via an adhesive. However, as discussed above, adhesives, and any solvents associated with such adhesives, contribute to pollution in the environment surrounding the production and possibly the installation process. Additionally, the use of liquid adhesives during the production process poses difficulties in providing a uniform layer of adhesive. This lack of uniformity creates difficulties in adding a flocked layer to the backing material. Therefore, providing an attractive, preprinted flocking layer to a backing material covered in a liquid adhesive has typically been difficult.

Accordingly, a desire exists for a recyclable floor covering that is relatively free of solvents during its production process and which provides a uniform bonding layer between an upper layer, for example a flocking layer, and a lower layer, for example a backing material.

SUMMARY OF THE INVENTION

One aspect of the invention includes a process for making a laminated surface covering. The process includes passing a first material across a first conveyor, passing a second material across a second conveyor, and passing a bonding material across a third conveyor. The process further includes contacting the first material and the second material to the bonding material, heating at least one of the first material and the second material, introducing the first material, the second material, and the bonding material into a pressure zone such that the bonding material is introduced between a bottom surface of the first material and a top surface of the second material, and applying pressure to bond the first material and second material together via the bonding material to produce a laminated material.

Another aspect of the invention provides a process for making a laminated surface covering, wherein the process includes passing a first material across a first conveyor, passing a second material across a second conveyor, passing a bonding material across a third conveyor, and contacting the second material to the bonding material. The process further includes heating at least one of i) the second material and bonding material after contacting the second material to the bonding material, or ii) the first material, and contacting the first material to the bonding material after the second material and bonded material are contacted to each other and after the heating. The process further includes introducing the first material, the second material, and the bonding material into a pressure zone such that the bonding material is introduced between a bottom surface of the first material and a top surface of the second material. The process further includes applying pressure to bond the first material and second material together via the bonding material to produce a laminated material.

Another aspect of the invention provides a surface covering including a first layer including a rubber material and a second layer including a flocked material. A heat-activated bonding layer is disposed between the first layer and second layer and bonds the first layer to the second layer.

Another aspect of the invention provides a recyclable surface covering including a first material adhered to another material and a second material including recycled rubber comprising rubber granules inter-bonded to each other via a chemical bonding agent.

Another aspect of the invention provides a process for making surface covering on a continuous laminator line. The process includes introducing a roll of backing material into a backing unwind station including a conveyor, introducing a roll of facing material into a facing unwind station including a conveyor, and introducing a roll of bonding material into a bonding material unwind station including a conveyor. The process further includes conveying backing material from the roll of backing material to a first heat source, conveying facing material from the roll of facing material to a second heat source, and heating a first surface of the backing material with the first heat source. The process further includes heating a second surface of the facing material with the second heat source, conveying the adhesive from the adhesive unwind station between the heated first surface of the backing material and the heated bottom surface of the facing material, and pressing the face material, the adhesive, and the backing material together to form a composite product. The process further includes conveying the composite product into a laminator and laminating the pressed together product to form a laminated flooring material. The process also includes conveying the laminated flooring material from the laminator into and through a cooling station and conveying the flooring material from the cooling station to an edge trim station. The process also includes trimming the edges of the flooring material in the edge trim station and conveying the trimmed flooring material from the edging station to a rewind station. Optionally, or alternatively, the process includes die cutting the flooring material before or after trimming. In one example, the die cutting is performed continuously, for example, by a continuous die cutter. The process further includes winding the flooring material on a spool and removing filled spools of flooring material from the continuous laminator line.

Another aspect of the invention provides a computer readable medium on which medium is store code. When the code is executed on a computer, the code causes the computer to control a system to perform any of the processes described above.

Another aspect of the invention provides a material bonding system including a first conveyor configured to convey a first material in a direction of conveyance and a second conveyor configured to convey a second material. This aspect includes a heating system configured to apply heat to at least one of the first or second materials and a combination zone configured to receive the first material and the second material from the first and second conveyors and configured to press the first material and second material toward each other.

A further aspect of the invention provides surface covering including a first layer that defines a first outer surface of the surface covering and a second layer including rubber granules inter-bonded by a chemical bonding agent, the second layer defining a second outer surface of the surface covering. This aspect includes a heat activated bonding layer disposed between the first layer and the second layer and bonding the first layer to the second layer.

BRIEF DESCRIPTION OF THE DRAWINGS

These an other advantages of the invention, in its various aspects, will become more apparent and more readily appreciated from the following detailed description of the exemplary embodiments of the invention taken in conjunction with the accompanying drawings where:

FIG. 5 is an isometric view of a third embodiment of a product produced according to the invention;

FIG. 6 is a side view of the product depicted in FIG. 5;

FIG. 8 is a schematic representing an assembly line used to perform a process set forth in FIG. 7;

FIG. 9A is a partial side view of a system used to produce the products produced in FIGS. 1-6;

FIG. 9B is a partial side view of the remainder of the system shown in FIG. 9A;

FIG. 10 is a side view of a backing unwind station from the system depicted in FIGS. 9A and 9B;

FIG. 10A is a side view of a shuttle used in the backing unwind station depicted in FIG. 10;

FIG. 10B is a plan view of the shuttle depicted in FIG. 10A;

FIG. 11A is a detailed view of the splicing station depicted in FIG. 11;

FIG. 11B depicts a dancer (tension adjustment system) from FIG. 11, in detail view;

FIG. 12 depicts a facing unwind station;

FIG. 14 depicts an overhead path along which the facing travels, a bonding layer unwind station, a dancer used in conjunction with the bonding layer unwind station, an auxiliary unwind station, and heaters;

FIG. 14A is a side view of the bonding layer unwind station;

FIG. 14B is an isometric view of the bonding layer unwind station;

FIG. 14D is a detailed side view of the auxiliary unwind station depicted in FIG. 14;

FIG. 14F is a detailed view of the heaters depicted in FIG. 14;

FIG. 14G is an end view of the upper heater depicted in FIG. 14;

FIG. 14H is an end view of the lower heater depicted in FIG. 14;

FIG. 14I is a view of an embodiment of the heaters depicted in FIG. 14, but with a powder scattering unit installed for dispensing a powdered bonding material;

FIG. 16B is an end view of the laminator depicted in FIGS. 16 and 16A;

FIG. 17 depicts an optional inspection station (guider) and trimming station disposed downstream of the cooling conveyor depicted in FIG. 16;

FIG. 19 depicts a rewind station disposed downstream of the accumulator depicted in FIG. 18;

FIG. 19C depicts the rewind station depicted in FIG. 19 in an unloaded state;

FIG. 21A is a detail view of an edge of the puzzle-cut pattern including a chamfer;

FIG. 23 depicts the second part of the optional/alternative continuous die cutting pathway shown in FIG. 22.

DETAILED DESCRIPTION OF THE PREFERRED EMBODIMENTS

Figure 1:
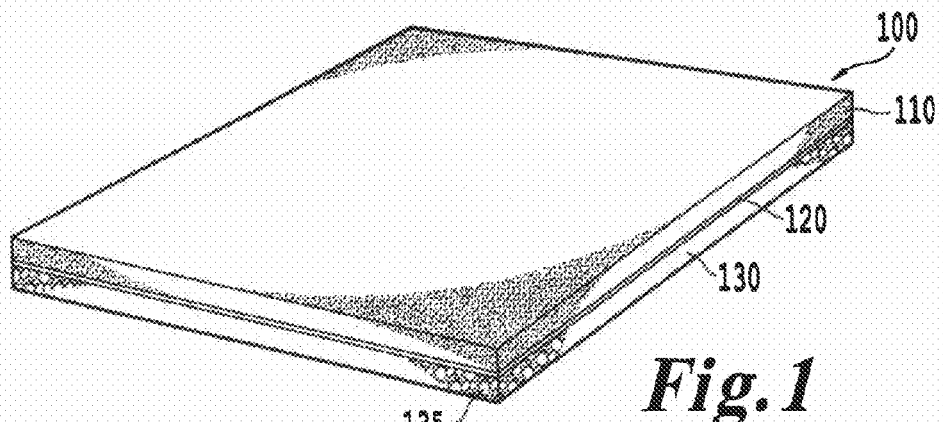
FIG. 1 is an isometric view of a first example of a product produced according to one aspect of the invention.

Referring now to the drawings, wherein like reference numerals designate identical or corresponding parts throughout the several views.

With reference to FIG. 1, one example of a surface covering according to the present invention is depicted in isometric view. The product 100 includes a layer of facing material 110 bonded to a layer of backing material 130 via a layer of bonding material 120. In other words, the bonding material 120 is sandwiched between the facing material 110 and the backing material 130.

In the depicted embodiment, the facing material 110 is a rubber material such as EPDM (ethylene propylene diene Monomer (M-class) rubber). However, other facing materials may be used. The bonding material 120 is a heat-activated bonding material, i.e., one that is typically in solid form at room temperature 21° C. (70° F.) and becomes much less viscous at higher temperatures, typically about 48° C. (118° F.) and above. In one example, the bonding material becomes partially liquefied between about 48° C. and 180° C. The term "about" in this document means plus or minus ten percent, when dealing with numerical values. The bonding material 120 is sandwiched between the facing material 110 and the backing material 130 in a process described later. One benefit of using a bonding material that is in solid or semi-solid form at room temperature such as the bonding material 120 is that the facing material 110 may be bonded to the backing material 130 with relatively little solvent in comparison with conventional bonding techniques used for conventional flooring materials. In one example, the bonding material 120 is mostly or entirely free of hydrocarbon solvents. In another example, the bonding material 120 is mostly or entirely free of all solvents, including organic and inorganic solvents. Additionally, the bonding material 120 can be disposed between the facing material 110 and the backing material 130 in a relatively uniform layer. In other words, lumps, bubbles, runs, or other irregularities that may be present when applying a typical liquid-based adhesive to a backing material can be reduced or avoided. The above-noted increase in uniformity of the bonding layer can provide an improved appearance to the finished product inasmuch as the facing material 110 may include a decorative pattern, and runs, bubbles, or lumps disposed in a bonding material located beneath the facing material 110 may detract from the appearance of the facing material 110.

The backing material 130 is typically formed of a granulated rubber material. In other words, the granulated material is interbonded with itself via a process as described in application Ser. Nos. 11/336,116 and 11/468,741, the entire contents of each of which is incorporated by reference herein in their entirety. The backing material 130 may further be material as described in Downey, application Ser. No. 09/931,320, now U.S. Pat. No. 6,920,723, the entire contents of which are herein incorporated by reference in their entirety.

The backing material 130 may be produced from granulated rubber material such as recycled rubber material from discarded automobile tires, for example. Additionally, the backing material 130 may be formed, entirely, or partially, from material produced by recycling discarded floor coverings, for example, floor coverings using the same type of backing material as the backing material 130. Thus, the costs and environmental impact of producing the backing material 130 may be less than conventional backing materials inasmuch as the backing material 130 may be produced by recycling other products (such as tires, floor matting, shoe soles or carpet) or incorporating used backing material that is identical or similar to the backing material 130 in composition. In one example, the product 100 is itself ground into particles and inter-bonded by heat fusion or a chemical bonding agent to form a new layer of backing material 130. Depending on the content of the products recycled to form the backing material 130, additional rubber materials such as raw rubber or substantially pure rubber may be added to form a mixture of recycled materials and raw materials. For example, the entire flooring material 100 may be ground to form granules. Then, depending on whether the granules formed by this process contain impurities or undesirable materials, granules formed from raw rubber material or from more pure recycled rubber may be added to create an appropriate mixture of recycled and raw materials. Pressure, a binder and/or heat may be added to the mixture to form a billet of rubber backing material with inter-bonded granules. The billet is typically cylindrical in shape and is cut, shaved, or shaped by rotating the billet while a blade is pressed against the billet to form a continuous sheet or layer of backing material 130. The backing material 130 is then rolled into a roll inasmuch as this material is typically thin and flexible enough to bend without breaking.

In one example, the backing material 130 includes 10% or more of granulated recycled rubber material from a flooring material such as the flooring material represented by reference numeral 100. In another example, the backing material 130 is substantially 100% recycled material from a flooring material such as the flooring material 100 depicted in FIG. 1, FIG. 3, or FIG. 5. In other words, the entire surface covering 100 may be turned into a backing material 130 for a following generation of surface covering 100.

Figure 2:
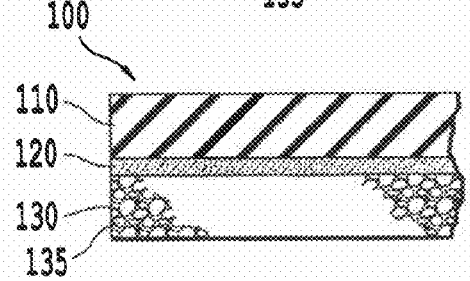
FIG. 2 is a side view of the product depicted in FIG. 1.

FIG. 2 describes a side view of the flooring material 100 depicted in FIG. 1. As shown in FIG. 2, the backing layer 130 typically includes granules 135 interbonded with each other to form the backing material 130. The granules 135 may be bonded to each other via partial melting with or without the addition of a binder material.

As is apparent from FIG. 2, the interbonded granules 135 can produce a relatively uneven surface. Accordingly, application of a liquid adhesive to such a surface creates difficulties in the application of a facing material to the backing material 130. This is so because the high portions and low portions of the granules 135, when coated with a liquid adhesive, tend to create high spots and low spots in the adhesive layer. Accordingly, the flooring material 100 depicted in FIGS. 1 and 2 is formed with a process using a bonding material that is typically in solid or semi-solid form at room temperature. Once the bonding material 120 is applied to either the backing material 130 or the facing material 110, heat activates the bonding material 120, and the facing material 110 and the backing material 130 are adhered to each other. The heat may be introduced to the bonding material 120 in the form of heat stored in at least one of the materials 110 and 130. The heat may be applied via a lamp, for example, an infrared lamp which will be discussed later. Alternatively, or additionally, the heat may be applied to the bonding material 120 via a heating apparatus after the facing material 110 sandwiches the bonding material 120 with the backing material 130.

Figure 3:
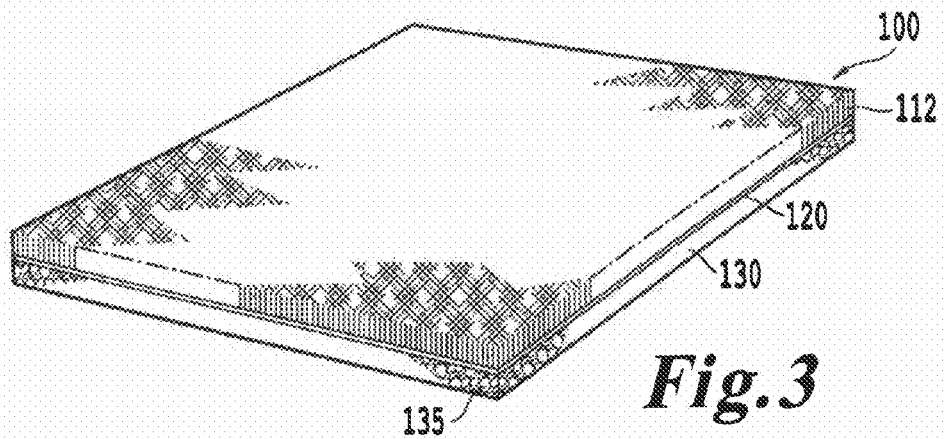
FIG. 3 is an isometric view of a second example of a product produced according to the invention.
Figure 4:
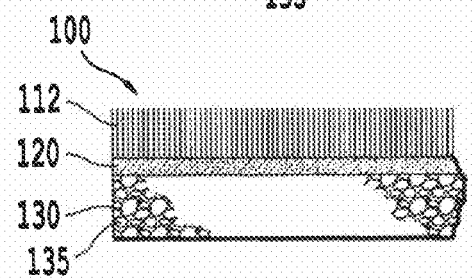
FIG. 4 is a side view of the product depicted in FIG. 3.

FIGS. 3 and 4 depict an enhanced facing material 112 disposed on the bonding material 120 rather than the rubber material 110 described in FIG. 1. The enhanced may include one or more of a flocked material, a tufted material, recycled fibers, a woven fabric, a non-woven fabric, wear-layers, cotton fibers, and/or synthetic fibers. Similar processes to those described above and hereafter regarding bonding the facing material 110 to the backing material 130 are used to bond the enhanced facing material 112 to the backing material 130. Thus, the enhanced material can be used to produce a wide range of floor coverings or carpet.

FIGS. 5 and 6 depict a wood-grain facing material 114 provided on the backing material 130 rather than a rubber facing material 110 or flocked facing material 112. In some cases, the wood-grain facing material 114 includes PVC. As discussed previously, certain recycling processes using PVC create harmful byproducts. However, as the recycling process that may be used in the formation of the backing layer 130 does not completely liquefy the materials used to form this layer, the backing material 130 may be recycled from surface covering 100 even if the surface covering 100 includes PVC, for example, in the wood-grain layer 114. In other words, the recycling process used to create the backing material 130 can accommodate materials of different chemical compositions and of different specific gravities. In one example, the backing material can include grains of PVC material interbonded to grains of another material of a different specific gravity, such as EPDM or another type of rubber. Accordingly, it is possible to recycle the surface covering 100 in its entirety into a new backing layer 130 if the finished product is to be a second generation of the surface covering 100.

Figure 7A:
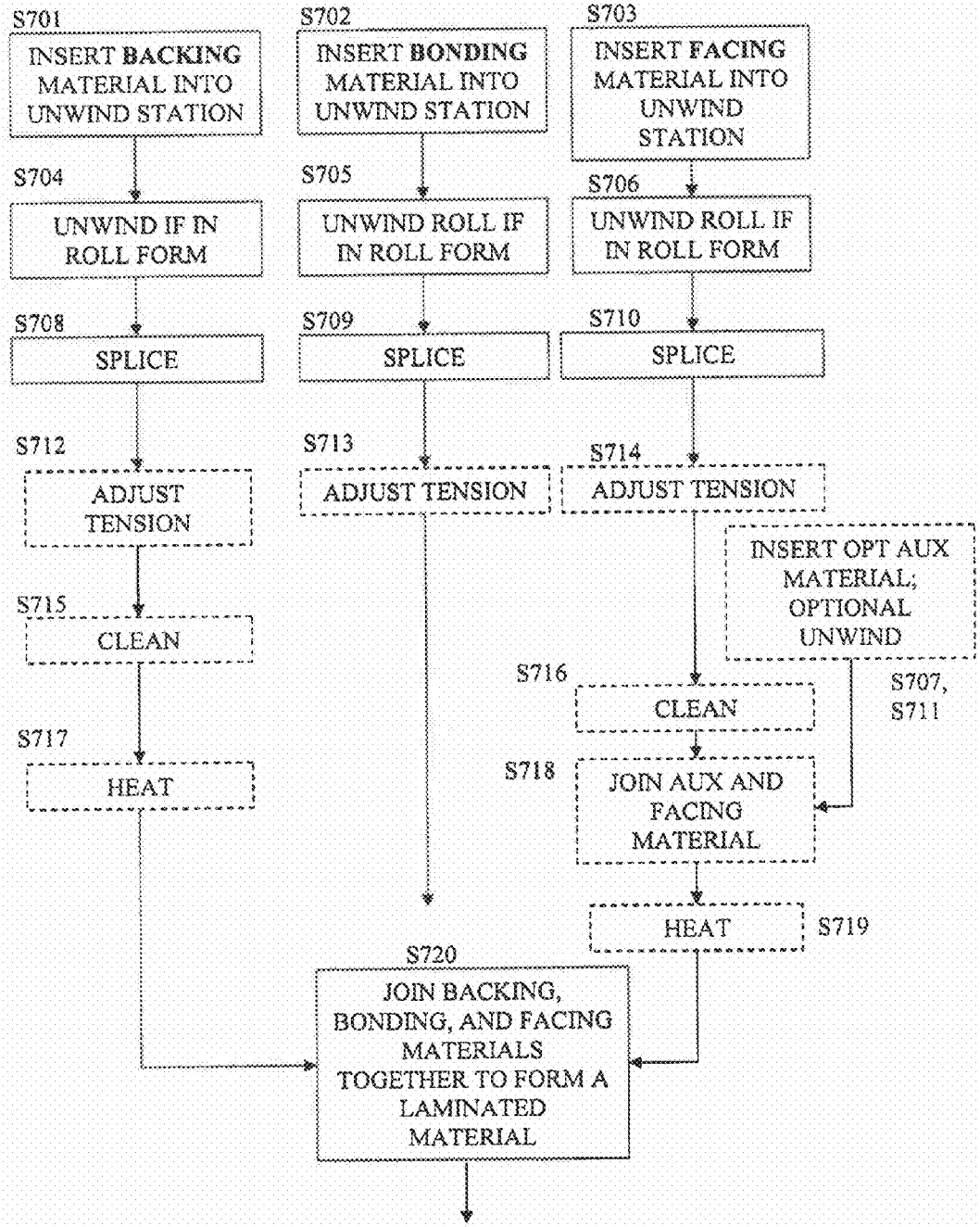
FIGS. 7A-B are first and second parts of a flow chart depicting a process used to produce products as depicted in FIGS. 1-6.
Figure 7B:
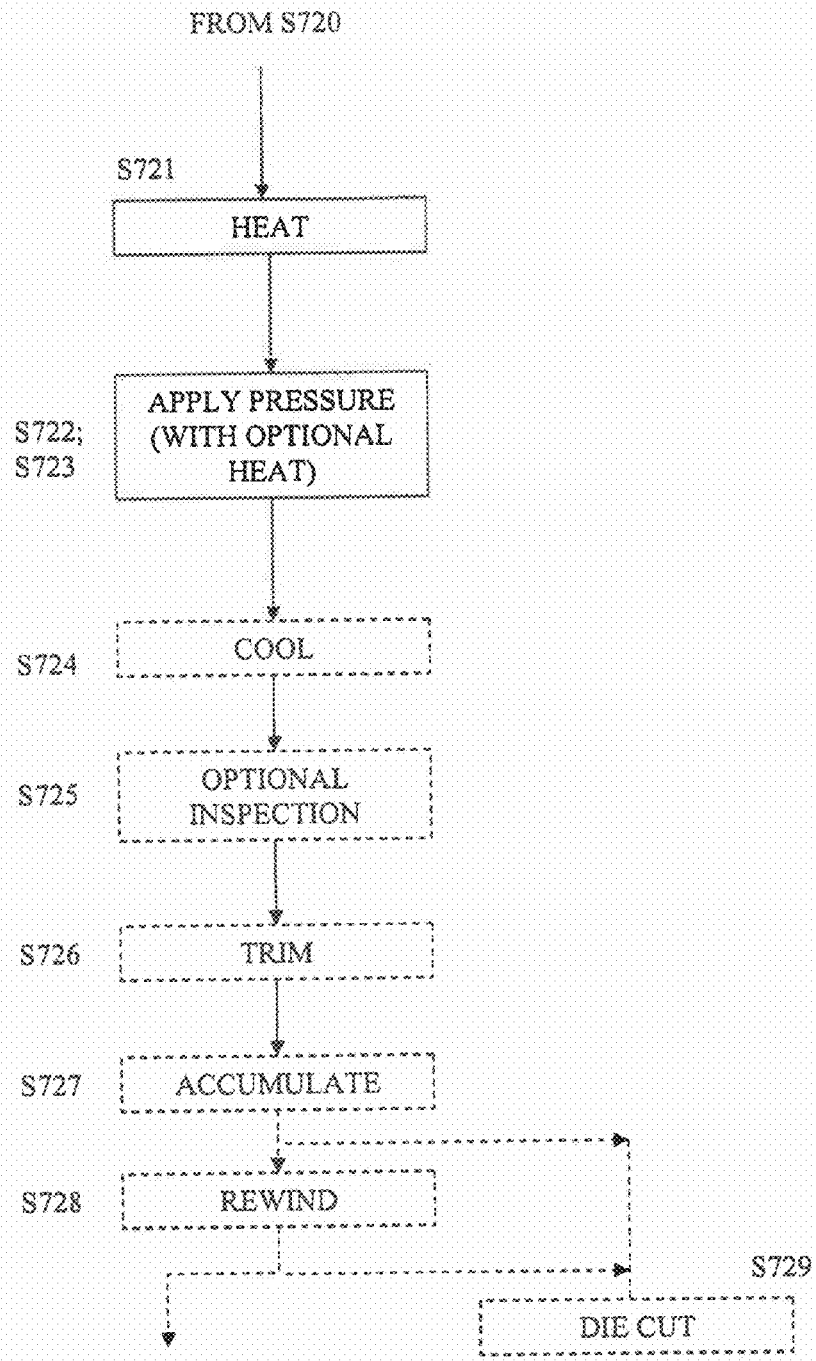

FIGS. 7A-7B depicts a flow chart illustrating one example of the process used to produce the products described in FIGS. 1, 3, and 5. In step S701, a backing material is inserted in the form of a roll in a backing unwind station 110 (see FIG. 10). The backing material may be a recycled material or a substantially new material. In any case, the backing material may be strong enough to support the weight of a person when installed on a floor surface.

Step S702 indicates that a bonding material is disposed in an unwind station. Typically, the backing material is introduced to the unwind station in the form of a roll, as is the backing material.

Similarly, a facing material is introduced into a facing material unwind station in step S703. It should be noted that, in some cases the backing material, bonding material, or facing material may be introduced in a form other than in a roll. Therefore, if the backing material, bonding material, or facing material is introduced in the form of a flat sheet or some other form different from a roll, no unwind steps such as depicted in steps S701, S702, and S703 will be necessary.

The respective materials are unwound in steps S704, S705, and S706. As the process is typically used in a commercial application, time required for the manufacture of the surface covering is a factor in determining the cost of the material. Accordingly, the backing, bonding, and facing materials used in the process typically travel within a range of approximately 10 to 30 feet per minute. Additionally, in order to maintain product flow, one batch of backing, bonding, or facing material will typically be spliced with another batch of the respective material (or roll of material) in the splice steps S708, S709, and S710.

Since each batch of the respective materials (i.e. backing material, bonding material, and facing material) is spliced to maintain product flow, each material can be thought of as having a continuous length in the product flow direction. The length of the respective materials is continuous with respect to a production run.

In some cases, the ultimate surface covering produced by the process will include a flocking material that is separately applied to the facing material. This optional process is depicted in steps S707 and S711.

As the process is typically performed on a continuous process line, before or after the splicing, tensioning of the respective materials may be performed in steps S712, S713, and S714. Typically, such tensioning is performed via a "dancer", which is configured to apply a predetermined amount of tension to the respective material. However, such tensioning is optional.

Steps S715 and S716 depict optional cleaning processes. It should be noted that the cleaning processes are depicted as taking place after the tensioning processes. However, the optional cleaning processes S715 and S716 may take place before the tensioning described in S712, S713, and S714. It is preferable that the cleaning take place after the tensioning inasmuch as it is beneficial to provide cleaning as near in time to the process that joins the respective materials together in order to avoid dust or other particles from adhering to the materials after the cleaning, but before the joining process.

Step S718 describes joining the auxiliary material to the facing material. As discussed above, this step is optional inasmuch as the auxiliary material is not included with all of the products produced. Rather, in some cases, for example when only a rubber facing material is provided, no auxiliary material will be added. In other words, the step S718 is optional, depending upon the facing material used. One embodiment of the process adds an enhanced material to a substrate material to form the facing material 110. Thus, the auxiliary material may be an enhanced material such as a flocked material, a tufted material, recycled fibers, a woven fabric, a non-woven fabric, wear-layers, cotton fibers, and/or synthetic fibers, and the facing material 110 may be the substrate material to which the enhanced material is added.

Steps S717 and S719 describe heating the backing and facing materials, respectively. The heat process can occur to only the backing layer, and therefore, only step S717 will be included, and step S719 will be omitted. Alternatively, step S717 may be omitted and only step S719 may be provided. In another embodiment, heating can be performed after or during the joining step S720, and this heating may be used in place of or in conjunction with the heating performed in either or both of steps S717 and S719.

As the bonding material is typically a heat-activated bonding material that is solid or substantially solid at room temperature, the heat applied in steps S717 or S719 serves to activate the bonding material and allow bonding of the backing material to the facing material via the bonding material. Therefore, it is preferable to apply the heat to the backing material and/or facing material before attempting to bond the backing material to the facing material. In this way, heat stored in either the backing material or the facing material will activate the bonding material, and active heating via lamp or other heater may not have to be applied directly to the bonding material itself. As the bonding material is typically a relatively thin web, mesh, or film, it is beneficial to avoid applying heat directly to the web, mesh, or film before the bonding material is in contact with at least one of the backing or facing materials, which can provide support for the relatively weak web, mesh, or film and prevent or reduce tearing. Additionally, it is preferable to directly heat the surface of the backing or facing material (or both) that will be in contact with the bonding material inasmuch as the backing material and facing material are typically relatively unconductive (insulative) with regard to heat transfer. Therefore, applying heat to a side of the backing material or facing material opposite to the side that will be bonded via the bonding material can be wasteful because the heat energy applied to this side will have to travel all of the way through the backing or facing material in order to activate the bonding material. In other words, it is typically more efficient to heat only the area of the backing material and/or facing material that will actually transfer heat to the bonding material than it is to heat the backing material and/or facing material through its entire thickness.

As discussed above, heat may be applied to either the backing material or the facing material or both. Additionally, both of steps S717 and S719 may be omitted and heat may be applied after joining the backing material, bonding material, and facing material. Furthermore, either the step S717, which heats the backing material, or the step S719, which heats the facing material, or both, may be used in conjunction with step S721, which heats the joined material including the backing layer, bonding layer, and facing layer. After step S721, or during step S721, pressure is applied to the joined material to form a laminated layer. Additional heat may be applied after this step in step S723. However, this additional heating, like the heating described in step S721, is optional. After pressure is applied in step S722, the laminated material (backing material/bonding material/facing material combination) is cooled in step S724. The cooling may take place via exposure to ambient temperatures or may be actively performed via one or more fans or a refrigeration unit. The laminated material is then typically trimmed in step S726, although an optional inspection S725 may be performed before or after the cooling. Before or after trimming, the laminated material may be die cut in step S729, for example, into squares, rectangles, other polygons, curved shapes, or interlockable puzzle-cut pieces (see FIGS. 21-23).

In order to further allow cooling and to provide a temporary storage area for the laminated material before the material is rolled into rolls or die cut, accumulation is provided in step S727, wherein the material travels back and forth in different directions across a series of rollers. The accumulation allows a predetermined amount of laminated material to be held in the manufacturing line before rolling and partially recreates the effect of having a process line of substantially greater length than the one actually used. For example, approximately 60 to 70 feet of material may be stored in the accumulator by traveling back and forth in substantially upward and downward directions even though the accumulator is typically about 10 feet in length.

As the above steps have described the lamination of continuous lengths of backing, bonding, and facing material, it follows that the laminator outputs a continuous length of laminated surface covering, wherein the continuous length is in the direction of product flow and the length is continuous with respect to a production run.

After the optional accumulation step S727, the laminated material is wound into rolls and cut at a predetermined length in step S728 or die cut in step S729. Typically, a roll of material will then be removed from the line on a roll shuttle (see FIG. 19).

Figure 7C:
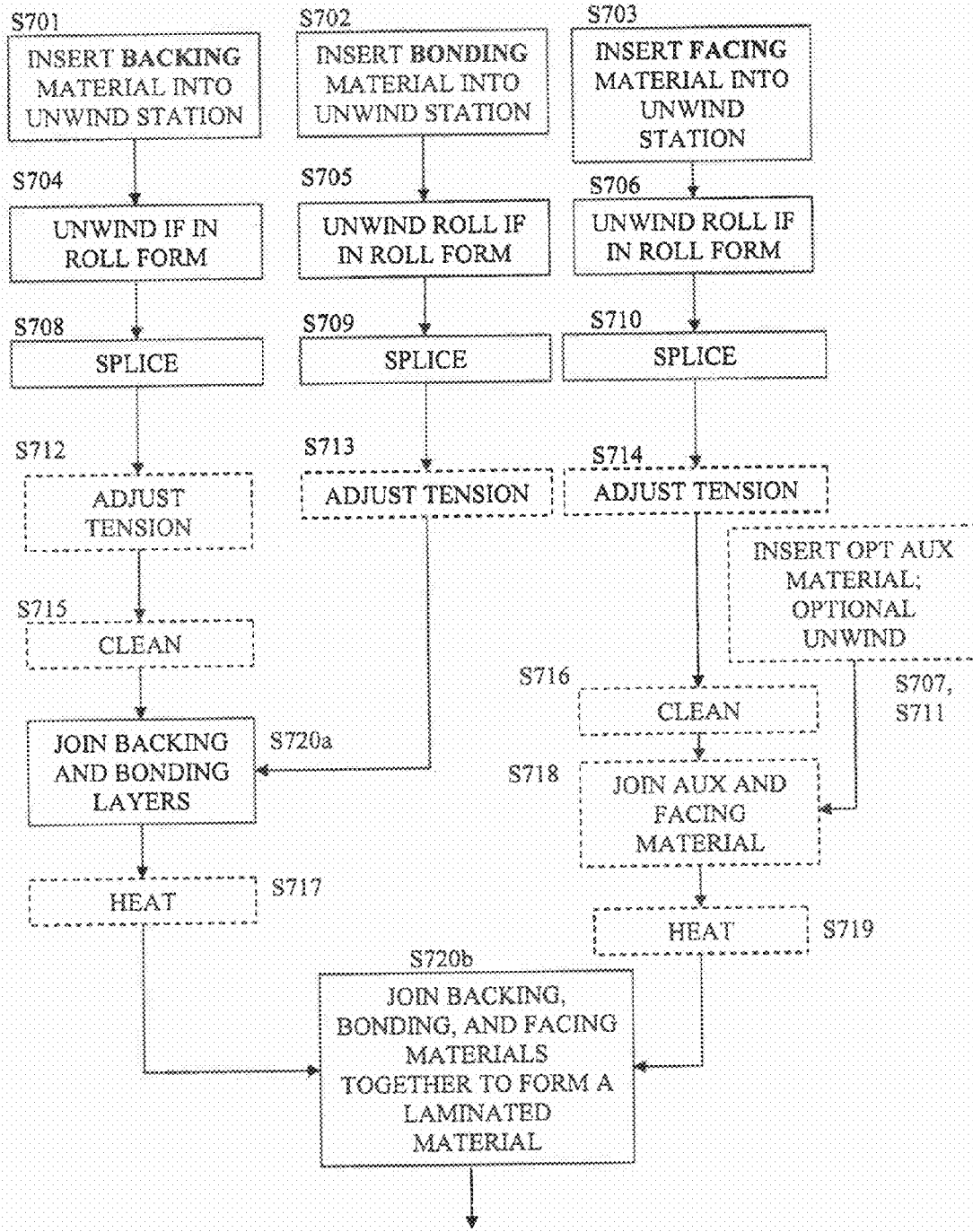
FIGS. 7C-D are first and second parts of flow chart in which backing material and bonding material are placed in contact with each other before facing material is placed in contact with the bonding material.
Figure 7D:
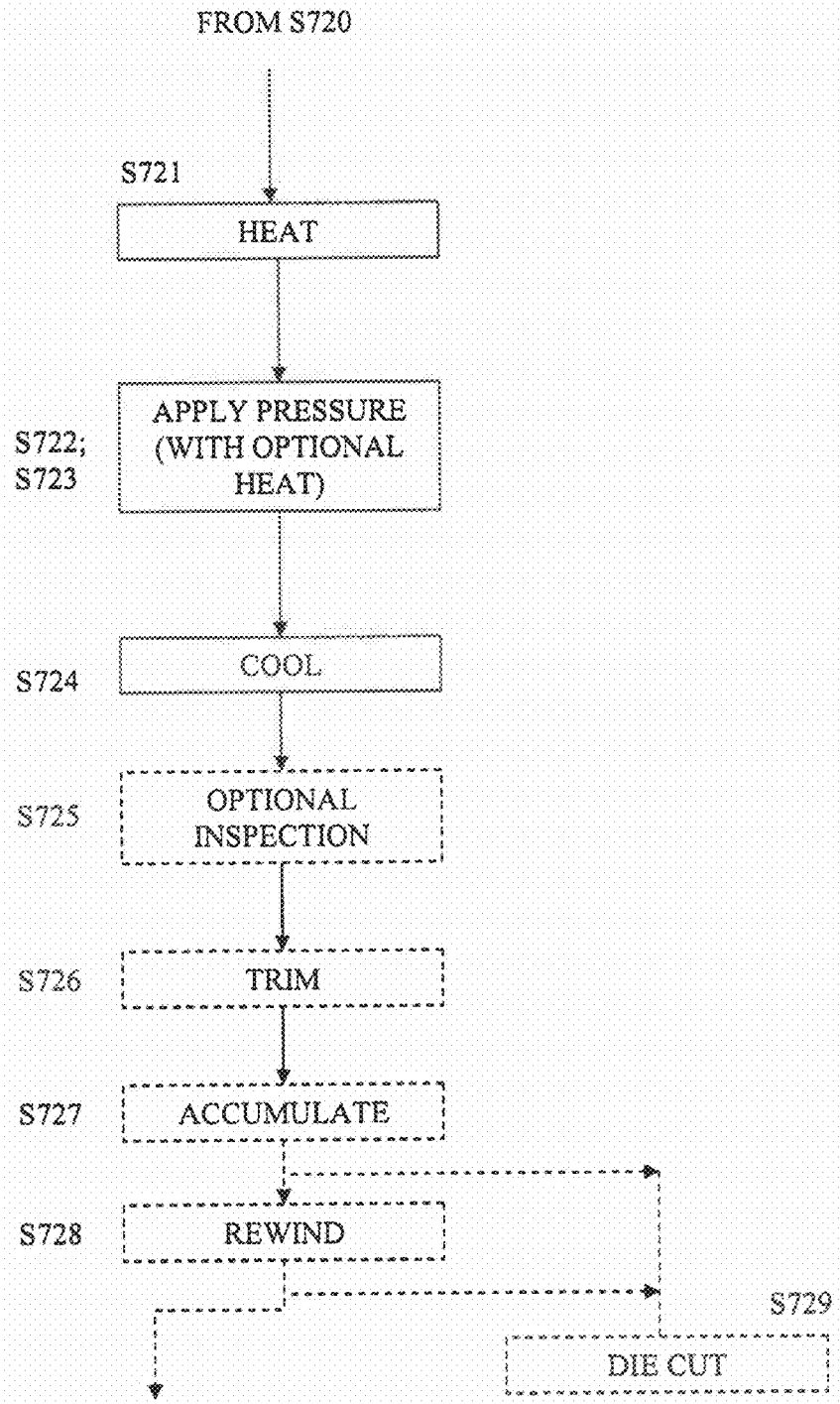

FIGS. 7c and 7d depict a similar process to that shown in FIGS. 7a and 7b, with the exception that the bonding material is joined with the backing material in step S720a prior to heating the backing material and prior to joining the backing material to the facing material in step S720b. The same reference numbers are used in FIGS. 7c and 7d as are used in FIGS. 7a and 7b, aside from S720, S720a, and S720b. One benefit of joining the bonding material to the backing material before the backing and facing materials are joined is that the backing material can act as a support for the bonding material. Thus, although the bonding material is typically relatively low in tensile strength in its heated state, and therefore, usually not directly heated on its own, the bonding material can be directly heated while supported by the backing material. For example, while the bonding material is resting or moving along with the backing material, a lamp may apply radiation directly to the bonding material before the bonding material touches the facing material.

FIG. 8 describes a general layout of a manufacturing system 101 for making surface coverings as depicted in FIGS. 1, 3, and 5. In general, the reference numbers 10-19 depicted in FIG. 8 on the schematic representations of the various operation stations in the system 101 correspond to FIGS. 10-19. However, it should be noted that the general linear arrangement of the system 101 is not required, and nonlinear arrangements may be used. For example, the various stations 10-19 may be arranged in the form of an arc or segmented polygon, for example.

FIG. 9A represents a first portion of a system 101 schematically represented in FIG. 8. FIG. 9A depicts stations 10-14, and FIG. 9B depicts stations 15-19.

Figure 10C:
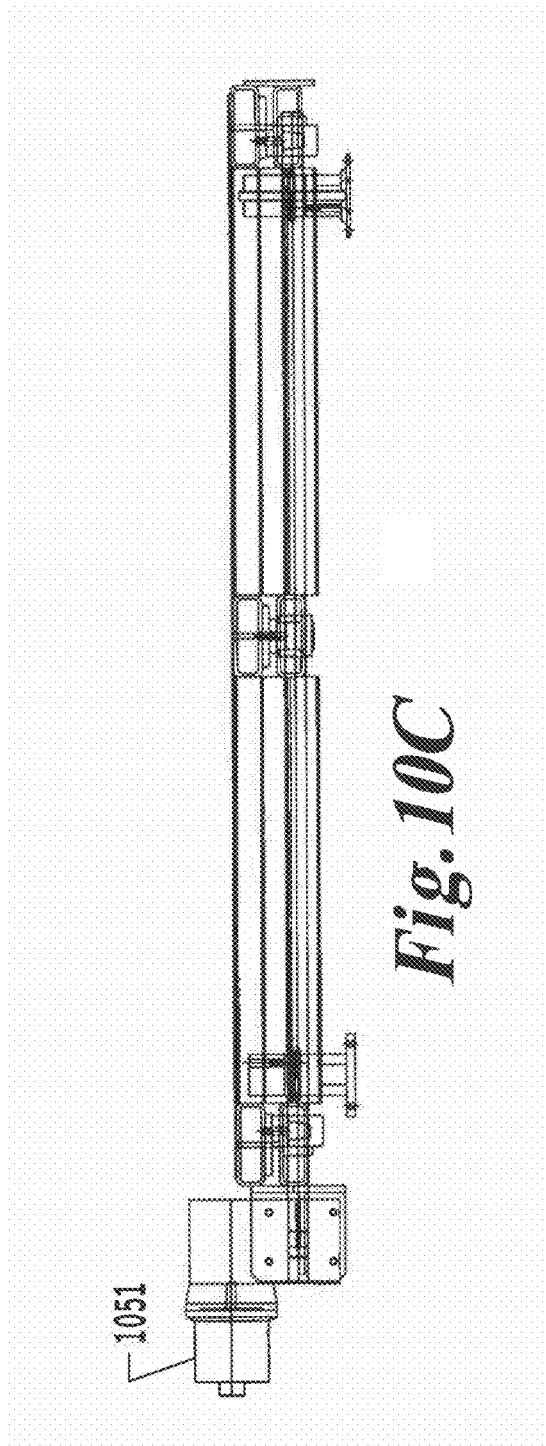
FIG. 10C is a front view of the shuttle depicted in FIG. 10A.

With respect to FIG. 10, a roll shuttle 1050 holds a roll of backing material 1001. The backing material depicted in roll 1001 typically corresponds to the backing material 130 depicted in FIGS. 1, 3, and 5, for example. A user will typically push the roll shuttle 1050 with the roll 1001 into position for loading onto the backing unwind station 1000. The backing unwind station 1000 is typically either pneumatically or hydraulically operated so as to tilt, receive, and then lift the roll 1001. If the system 101 is empty, for example after a large scale maintenance operation, then a user will thread a leader (not shown) through the system 101 in order to pull backing material from the roll 1001 into the system as if the system were being used for the first time. More common, however, is replacement of an empty roll 1001 with a full roll 1001 after the system has been in use for a period of time. In this case, material from the roll 1001 will be spliced via a splicing station 1100 as shown in FIG. 11. In any case, the backing unwind station 1000 is typically operated via a hydraulic, pneumatic, or electric motor 1010 as shown in FIG. 10.

FIG. 11 depicts a splicing station 1100, which, as discussed above, is used to combine material from a previous roll 1001 with material from a new roll 1001. In general, material flows from the left to the right in FIG. 11. Accordingly, after the splice station 1100, it is sometimes advantageous to adjust a tension of the material 130. Accordingly, FIG. 11 depicts a dancer, which is a term in the art used to describe a system of rollers and framework configured to apply a predetermined amount of tension to a material conveyed via rollers.

Although the dancer 1110 depicted in FIG. 11 is positioned immediately after, in the direction of material movement, the splice station 1100, other positions may be used for the dancer 1110. Additionally, more than one dancer may be used in a given system 101 for any of the materials handled by the system.

FIG. 11 next depicts an optional cleaning system 1120 through which the material 130 flows after passing through the dancer 1110. FIG. 10A depicts a side view of the roll shuttle 1050, and FIG. 10B depicts a top view of the roll shuttle 1050. FIG. 10C depicts an end view of the roll shuttle 1050, and as is evident in FIGS. 10B and 10C, the roll shuttle 1050 may include a motor 1051 to assist in movement of the rolls 1001 inasmuch as the rolls 1001 often weigh approximately 1500 pounds. As is further evident from FIG. 10A, the roll shuttle 1050 typically includes a partial section of a circle in order to securely accommodate the roll 1001.

Figure 10D:
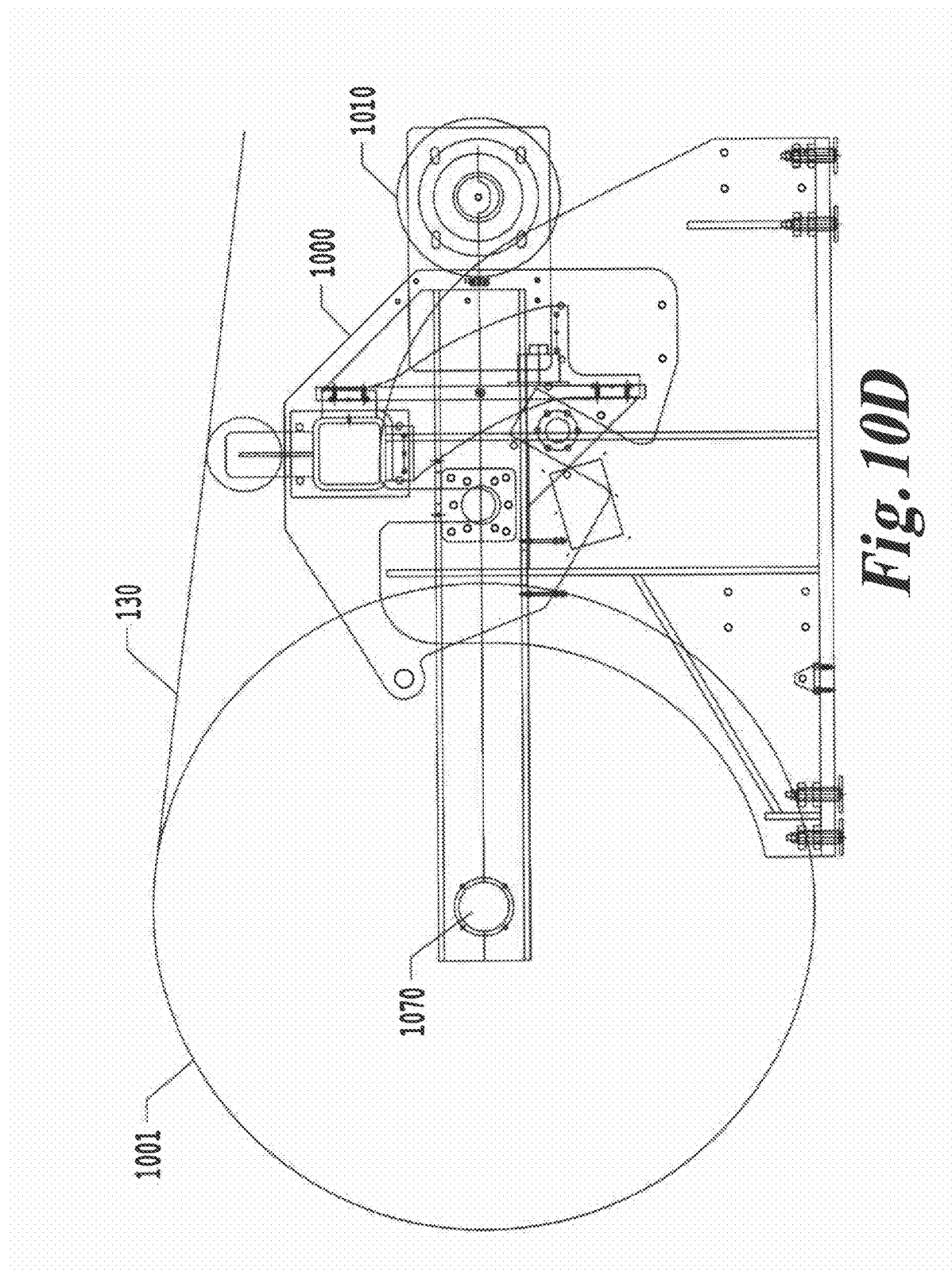
FIG. 10D is a side view of the unwinding system depicted in FIG. 10.
Figure 11:
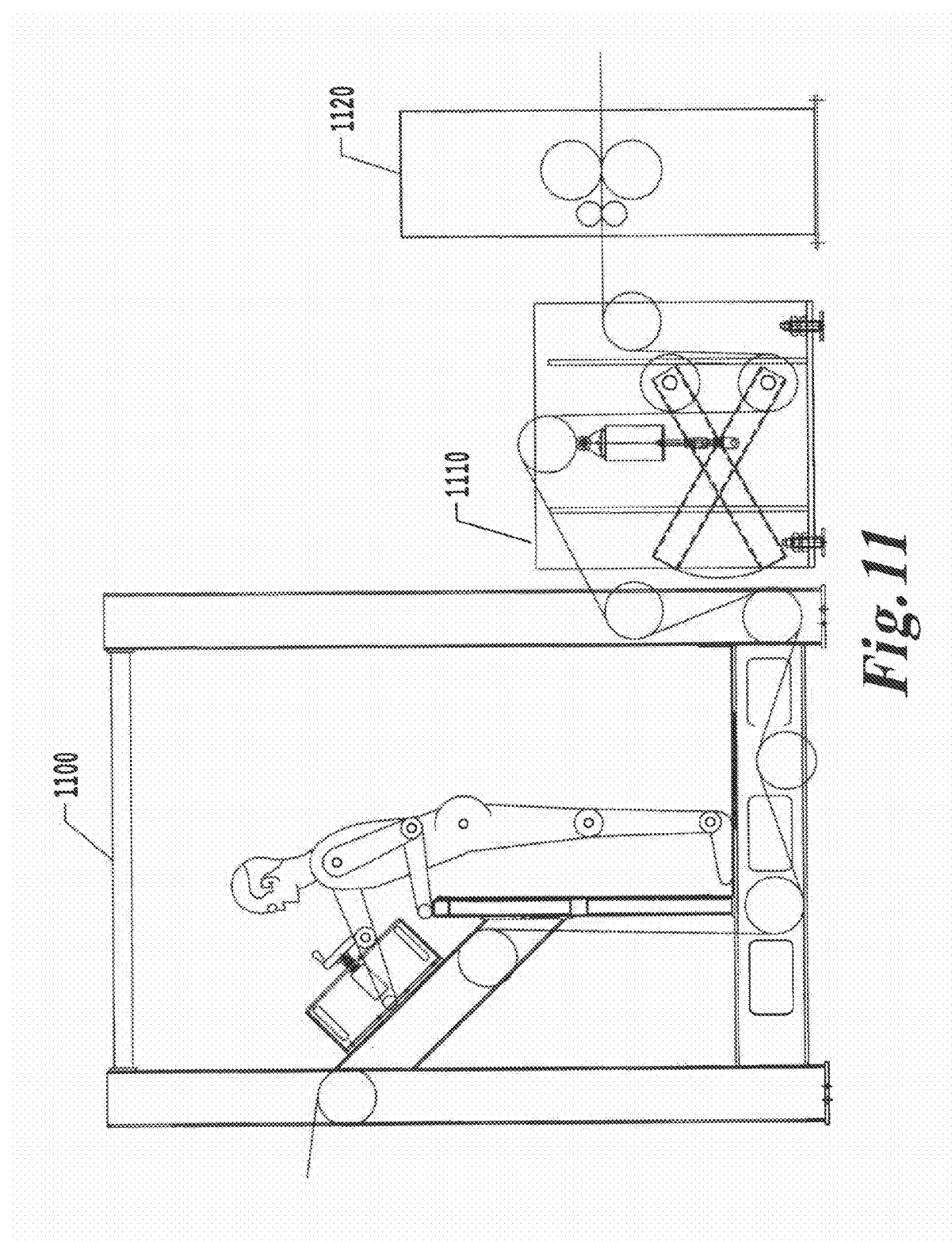
FIG. 11 depicts a splice station and optional dancer and cleaning stations used in conjunction with the backing unwind station of FIG. 10.

FIG. 10D depicts a detailed view of the backing unwind station 1000. The unwind station 1000 pivots in response to force created by the cylinder 1060 in order to move the rotating axis point 1070 upward and downward in order to lift and lower the roll 1001.

FIG. 11A is a detailed view of the splice station 1100 depicted in FIG. 11. As shown in FIG. 11A, various rollers 1180 either passively or actively convey the backing material 130. Within the splice station 1100, a user X adjusts a cutting surface insert 1109 in order to splice ends of separate rolls of material 130 together.

FIG. 11B describes a dancer in detail. As discussed above, the dancer applies a predetermined amount of tension to the material conveyed within the dancer. For example, the dancer 1110 includes a cylinder 1160, which may be hydraulic or pneumatic. The cylinder 1160 is controlled via a controller to apply a predetermined amount of tension to the material 130 by causing the pivot arm 1155 to pivot about the pivot point 1165. Typically, the cylinder 1160 is controlled by the controller based on input from a sensor that senses a force placed upon one of the rollers 1180.

Figure 12A:
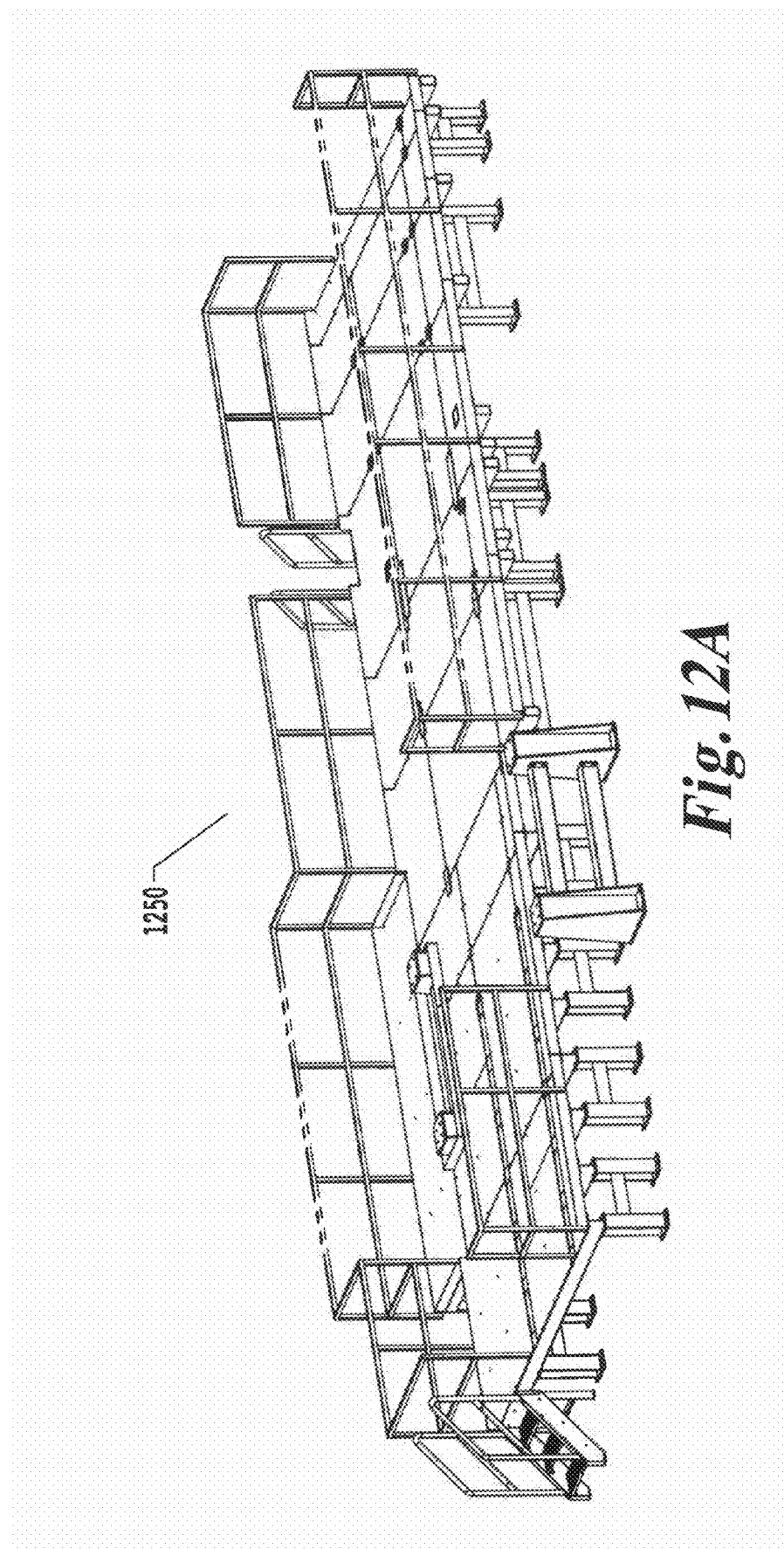
FIG. 12A is an isometric view of a platform partially depicted in FIGS. 12-14.

FIG. 12 depicts a facing unwind station 1200 that unwinds a roll 1201 of facing material such as material 110 discussed in reference to FIG. 1. A roll shuttle 1050 is also depicted in FIG. 12 and may operate in a similar manner to the roll shuttle 1050 discussed in reference to FIG. 10. Similarly, operation of the facing unwind station 1200 is typically similar to operation of the backing unwind station 1000. For example, the facing unwind station 1200 typically includes a motor 1210 that operates to unwind the roll 1201. However, it should be noted that, in order to allow substantially linear operation of the system 101, it is helpful to elevate the facing unwind station 1200 relative to the level of the backing unwind station 1000. Alternatively, the positions of the backing unwind station 1100 and facing unwind station 1200 could be reversed, and the facing unwind station could be positioned at a level below the backing unwind station 1100. In order to achieve this difference in elevation, a system 101 includes a platform 1250, which is depicted in detail in FIG. 12A. Accordingly, with the platform 1250, it is possible to elevate one roll of material and its traveling path relative to another roll of material and its traveling path.

Figure 13:
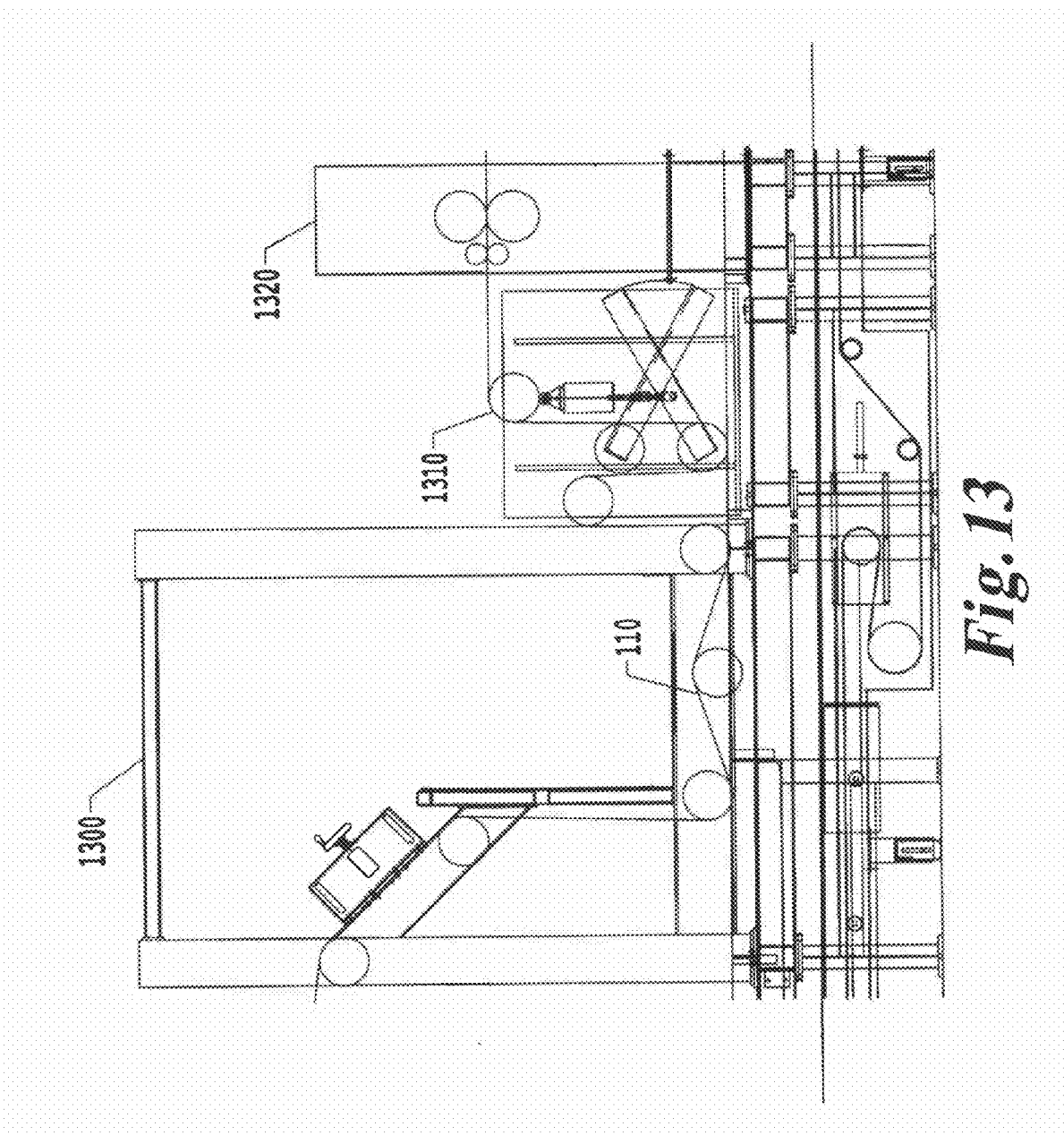
FIG. 13 depicts a splice station used in conjunction with the facing unwind station depicted in FIG. 12 along with an optional cleaning station and a dancer.
Figure 13A:
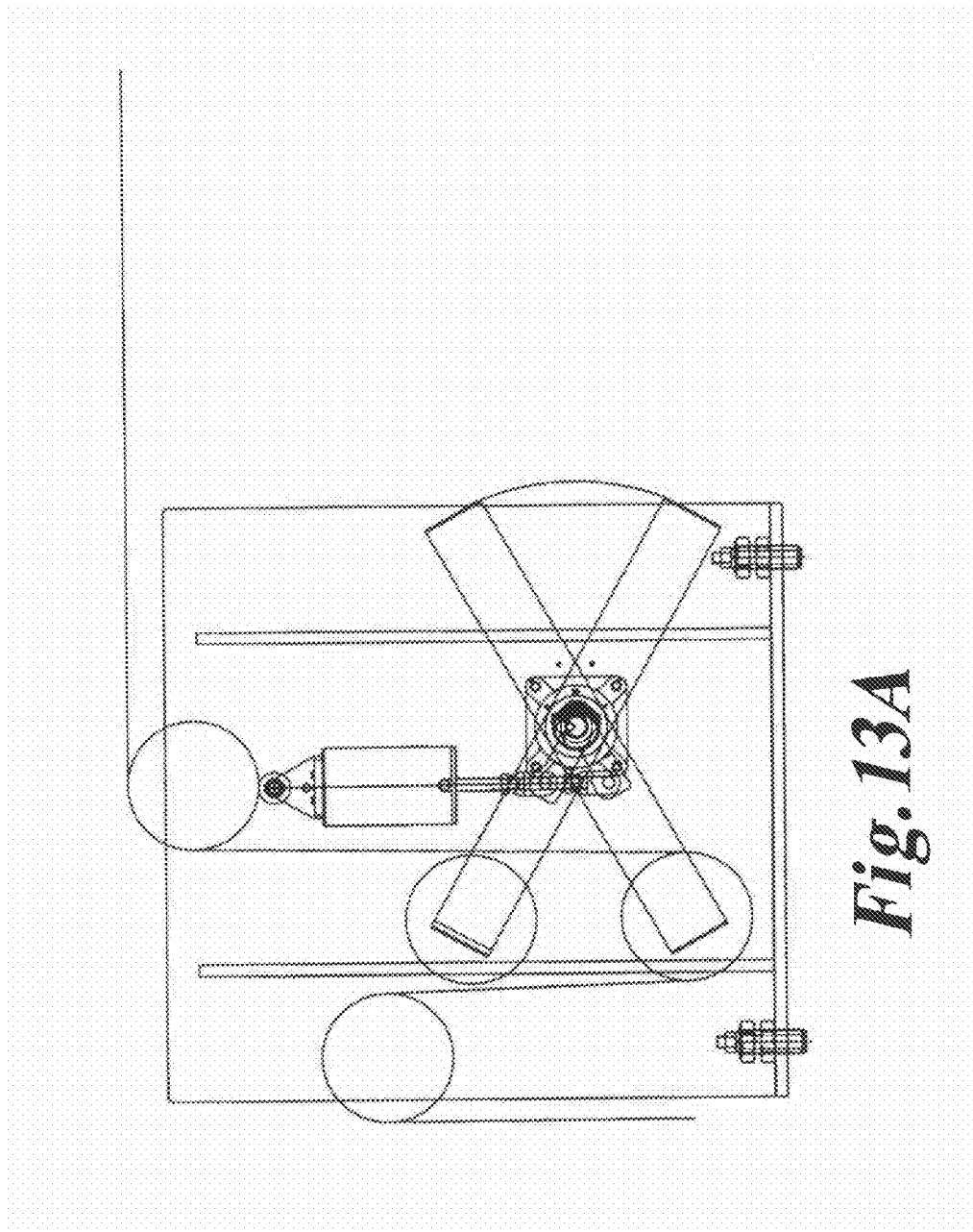
FIG. 13A depicts a side detailed view of the dancer used with the facing station described in FIG. 13.

FIG. 13 depicts a splice station 1300 for splicing the facing material 110 in a similar manner to the way the backing material 130 is spliced in the station 1100 shown in FIG. 11. In other words, the system 101 typically uses one roll 1201 of material after another, and the splicing station 1300 permits continuity of operation from one roll to the next. FIG. 13 also depicts an optional dancer 1310, which may be disposed in a position other than the one depicted in FIG. 13. The dancer 1310 is shown in more detail in FIG. 13A. The dancer 1310 functions in a similar manner to the dancer 1110 discussed in relation to FIG. 11.

Furthermore, an optional cleaner 1320 is disposed downstream of the dancer 1310 as shown in FIG. 13. The cleaner 1320 operates in a similar manner to 1120. It should be noted that water recycling systems are often used with one or both of the cleaners 1120 and 1320.

FIG. 14 depicts a roll of bonding material 1401 disposed in a bonding material unwind station 1400. FIG. 14 also shows the facing material 110, the bonding material 120, and the backing material 130 in relation to each other.

FIG. 14A depicts a detailed side view of the bonding material unwind station 1400. As shown in FIGS. 14A and 14B, which is an isometric view of the bonding material unwind station 1400, the material 120 is typically formed of sheets from two separate rolls 1401. Additionally, waste rolls 1403 receive a portion of the material from 1401, which is used to cover the material 120 before use.

Figure 14C:
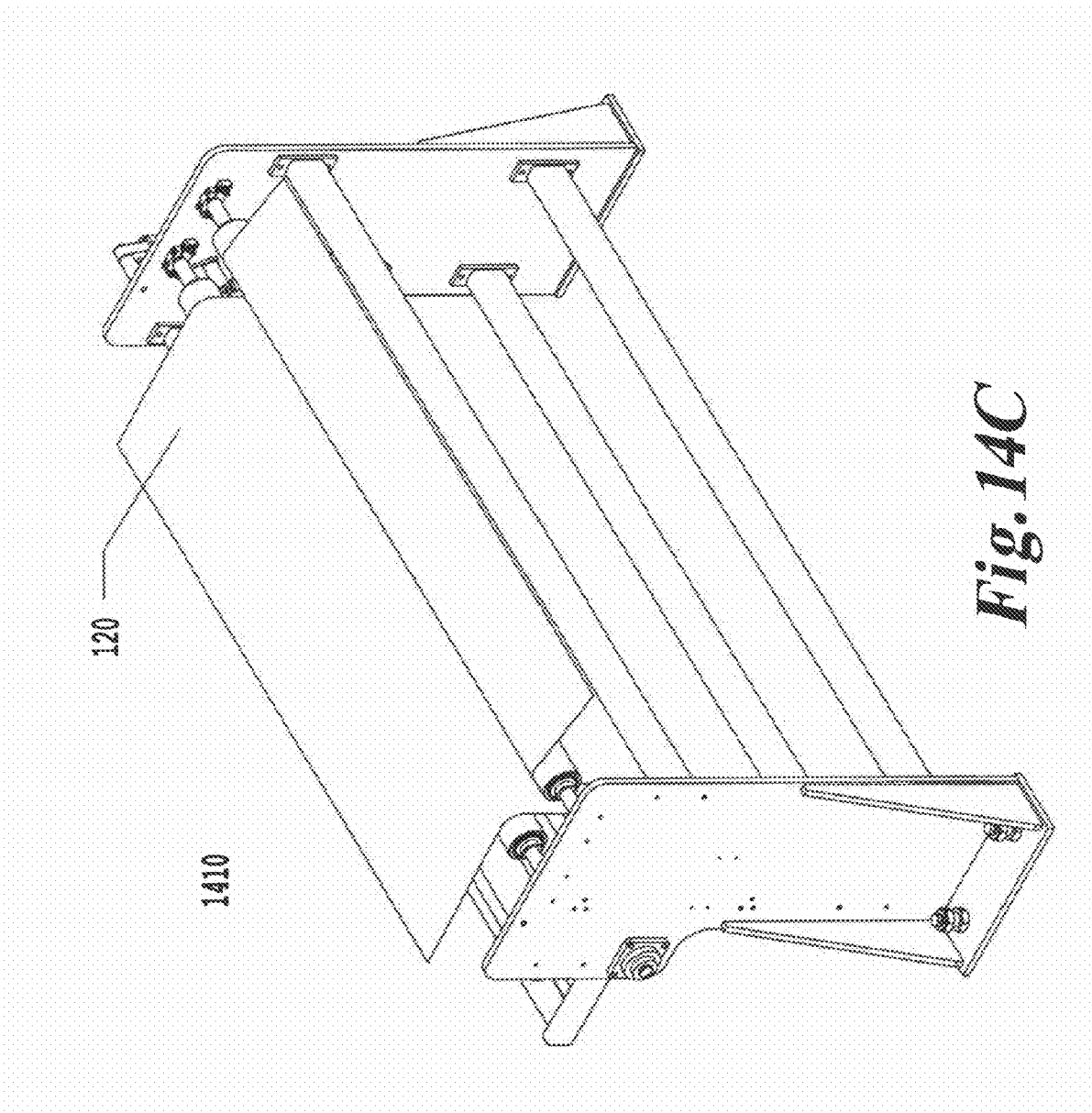
FIG. 14C depicts a dancer used in conjunction with the bonding layer unwind station.
Figure 14E:
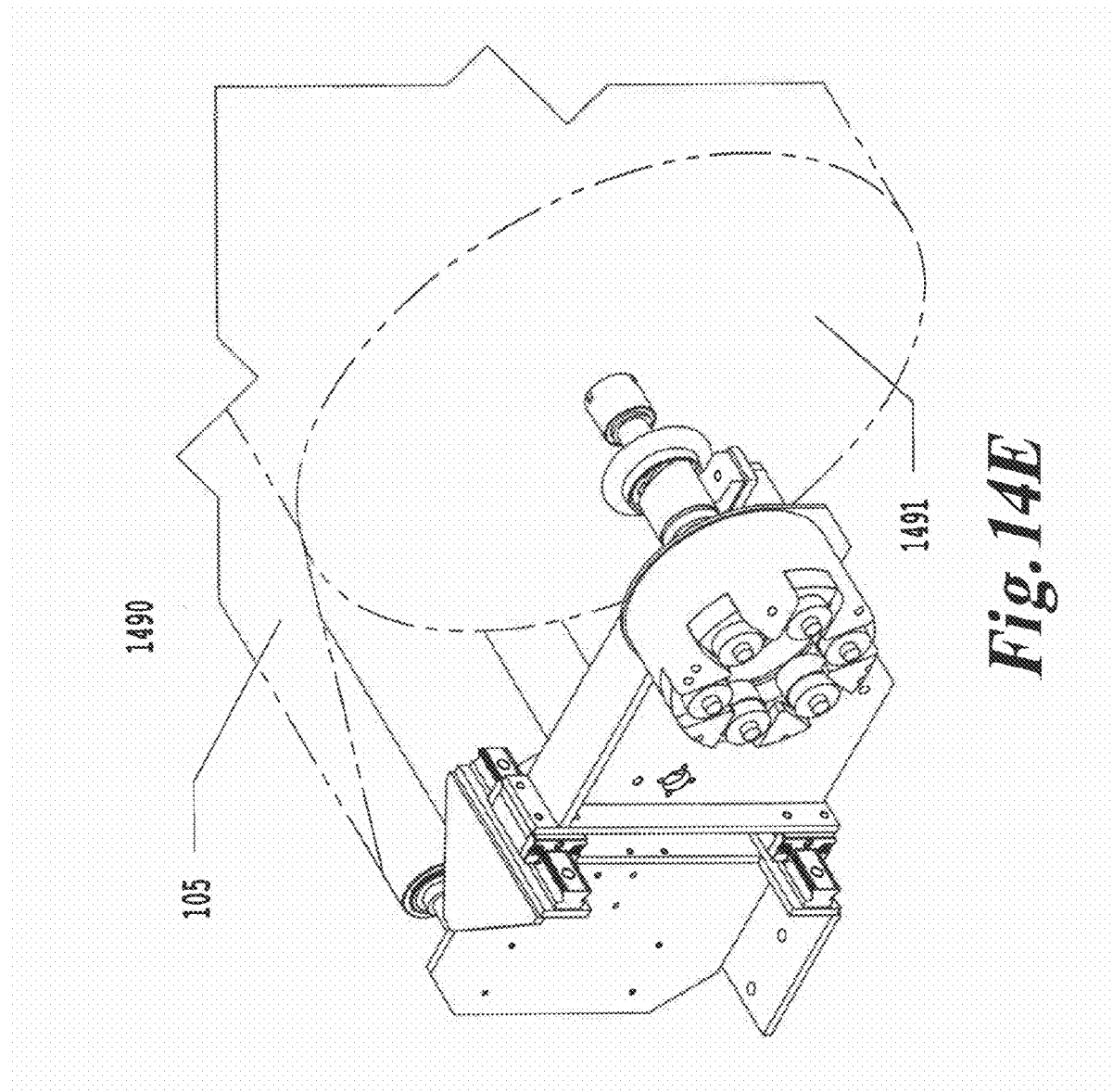
FIG. 14E is a partial isometric view of the auxiliary unwind station depicted in FIG. 14E.

FIG. 14C describes a bonding material dancer 1410. FIG. 14D depicts a detailed view of an auxiliary material unwind station 1490, and FIG. 14E depicts the auxiliary unwind station 1490 in isometric view. The auxiliary unwind station is used to apply an additional material to the facing material 110 as shown in FIG. 14. For example, in some cases, the auxiliary unwind station 1490 applies an enhanced material to a substrate material used for the facing material 110. However, the auxiliary unwind station 1490 is optional, and certain products do not require the addition of any auxiliary material 105. FIG. 14D and FIG. 14E each describe a roll 1491 of auxiliary material 105, which may or may not be used in conjunction with facing material 110. FIGS. 14F, 14G, and 14H depict various views of heaters 1440 used to apply heat to the casing material 110 and/or the backing material 130. The infrared heater 1440A applies heat directly to a surface of the material 130 that eventually comes into contact with the bonding material 120. Similarly, the infrared heater 1440B applies heat directly to a surface of the facing material 110 that comes into contact with the bonding material 120. Thus, as discussed above, the surfaces that directly contact the bonding layer are directly heated via the heaters 1440. This direct application of heat where it is needed saves energy inasmuch as it is not necessary to heat the entire thickness of the materials 110 and 130 in order to activate the heat activated bonding material 120. Rather, heat is applied where it is needed most, at the surface where the materials are to be joined.

FIG. 14I is a view of an embodiment of the heaters depicted in FIG. 14, but with a powder scattering unit 1450 installed for dispensing a powdered bonding material. The powdered bonding material is typically heat activatable, similar to the film discussed previously. The powder scattering unit 1450 is most often configured to shake or cast the powdered bonding material onto the backing material 130 from a position above the backing material 130, but other arrangements are possible. For example, if the positions of the backing material 130 and facing material 110 are reversed, then the powder scattering unit 1450 would apply powdered bonding material to the facing material 110. In one example, the powder scattering unit 1450 is driven by a motor that stirs or shakes the powdered bonding material. The motor is typically electric or hydraulic.

In some applications, heat may be applied via another type of heater, for example, a heated blower or a heated roller. Rollers similar to those shown in various other parts of the unwind station 1490 may be used, but with sufficient provisions made to apply heat to the roller. For example, an electric heater may be disposed inside the roller. However, the application of infrared heat to the various materials 110, 120, and/or 130 is preferred inasmuch as infrared heat can disrupt the surface tension of the material to which it is applied and therefore result in superior bonding between materials than is typically available with heat applied via convection or conduction methods alone. It should be noted, however, it is possible to add a device, such as a static electricity generator, that can disturb the surface tension of the materials 110 and 130. The addition of this static electricity generator is often not made when infrared radiation is used to heat the materials 110 and 130.

The heaters 1440A and 1440B typically heat the surface of the material to which they are applied to a temperature of 93° to about 310° C., more preferably from 180° to 250° C., even more preferably about 190° C. to about 230° C. (surface temp), and more preferably about 200° C. to about 220° C. Other temperatures may be used.

One or both of the infrared heaters 1440A and 1440B may be configured to provide a gradient to the infrared radiation applied to the surface of the facing material 110 or backing material 130. In other words, in order to prevent the edges of the heated material from overheating, it is preferable to provide greater radiation intensity at an area in the middle (away from the edges) of the facing material 110 or backing material 130 than is applied to the edges themselves. This is so because the edges of the material do not have as great of a heat sink in which to dump heat as the center of the material has. Accordingly, it is beneficial to provide a gradient to the amount of radiation applied to the heated surface. The gradient may be controlled via an electronic controller, for example, a temperature controller or a temperature program loaded onto a personal computer. Alternatively, the temperature gradient may be provided via hardwiring or may be provided via individual heat elements disposed within the heaters 1440 with elements of greater wattage disposed toward the center of the heaters 1440 and elements of relatively less wattage disposed toward the edges of the heaters 1440.

Although the temperature gradient noted above is typically preferred, especially when the materials to be heated are relatively sensitive to heat, some configurations of the system 101 use heaters 1440 without providing any temperature gradient. Additionally, as discussed previously, alternative forms of heating the facing material 110 and/or backing material 130 such as heated rollers or heated air blowers may be used in place of the infrared heaters 1440 or in addition to the heaters 1440. Additionally, as discussed previously, the heaters 1440 disposed upstream of the laminator 1500 may be replaced or augmented with heaters disposed within the laminator 1500 itself.

Figure 15:
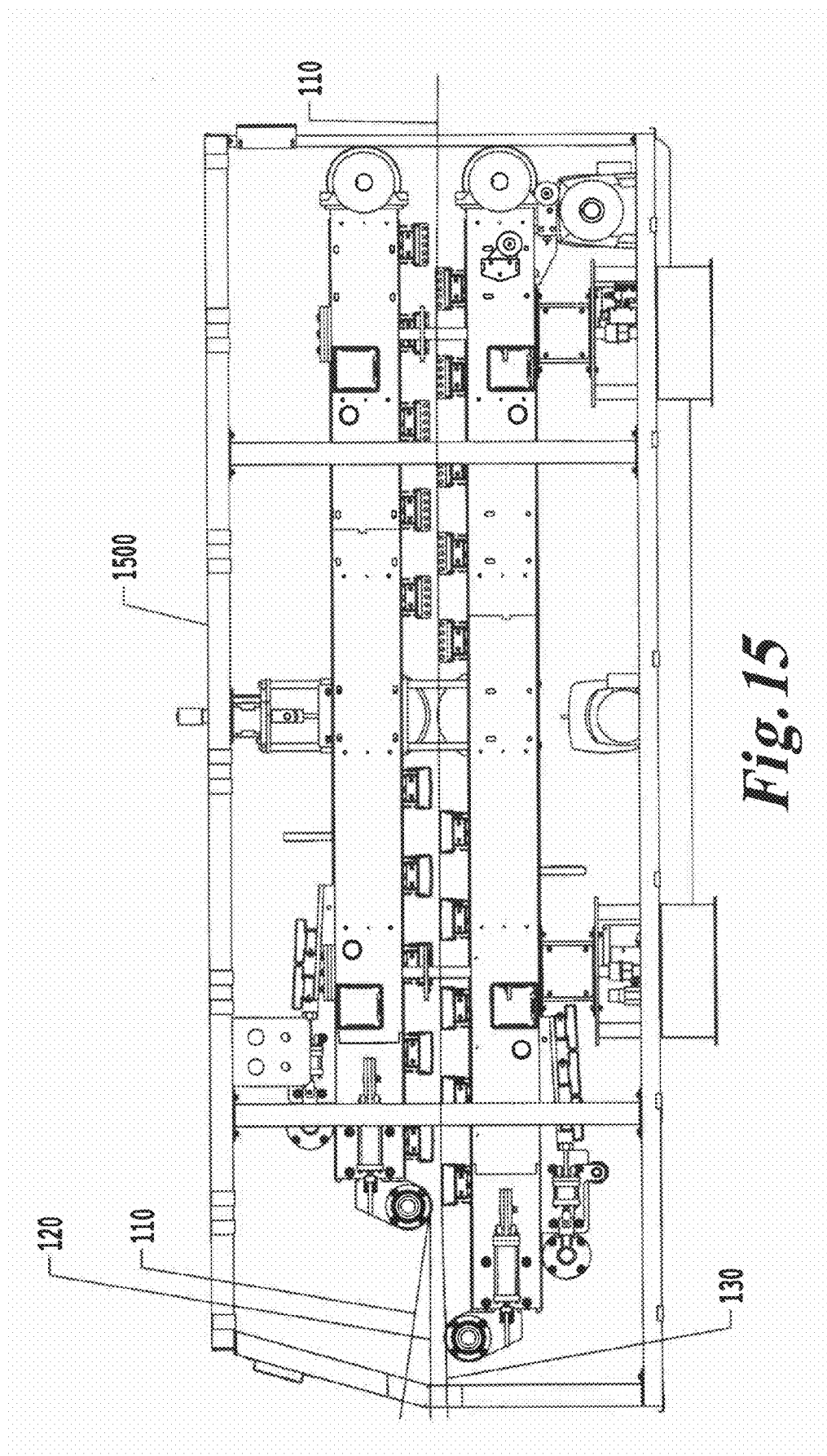
FIG. 15 describes a laminator used to laminate the facing material depicted in FIG. 12 to the backing material depicted in FIG. 10.

FIG. 15 depicts a laminator 1500 that presses together the facing material 110 (and auxiliary material, if any), heat activated bonding material 120, and backing material 130 to form a laminated material 100. The laminator 1500 typically includes one or more rollers, and, as discussed previously, may include additional heaters configured to heat at least one of the facing material 110 and backing material 130. As shown in FIG. 15, material is moving from left to right, and laminated material 100 exits the machine at its right-hand end.

Figure 16:
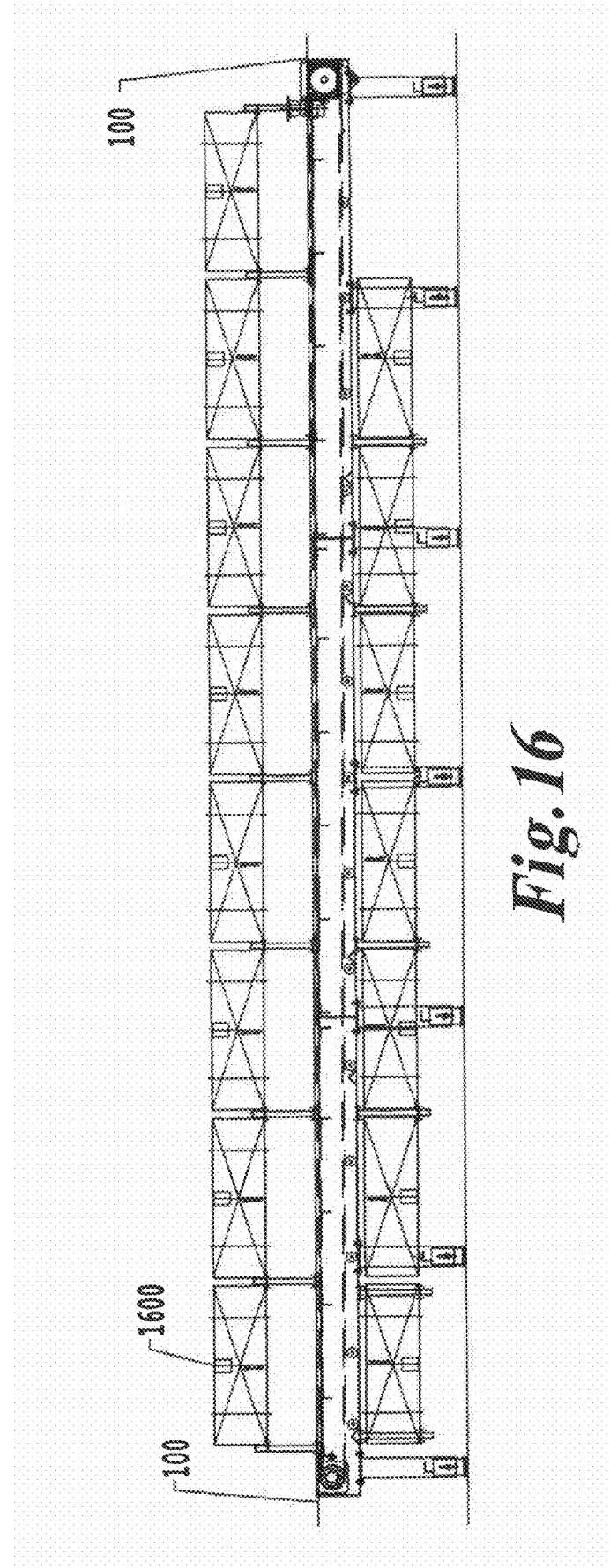
FIG. 16 describes a cooling conveyor disposed downstream of the laminator depicted in FIG. 15.
Figure 16A:
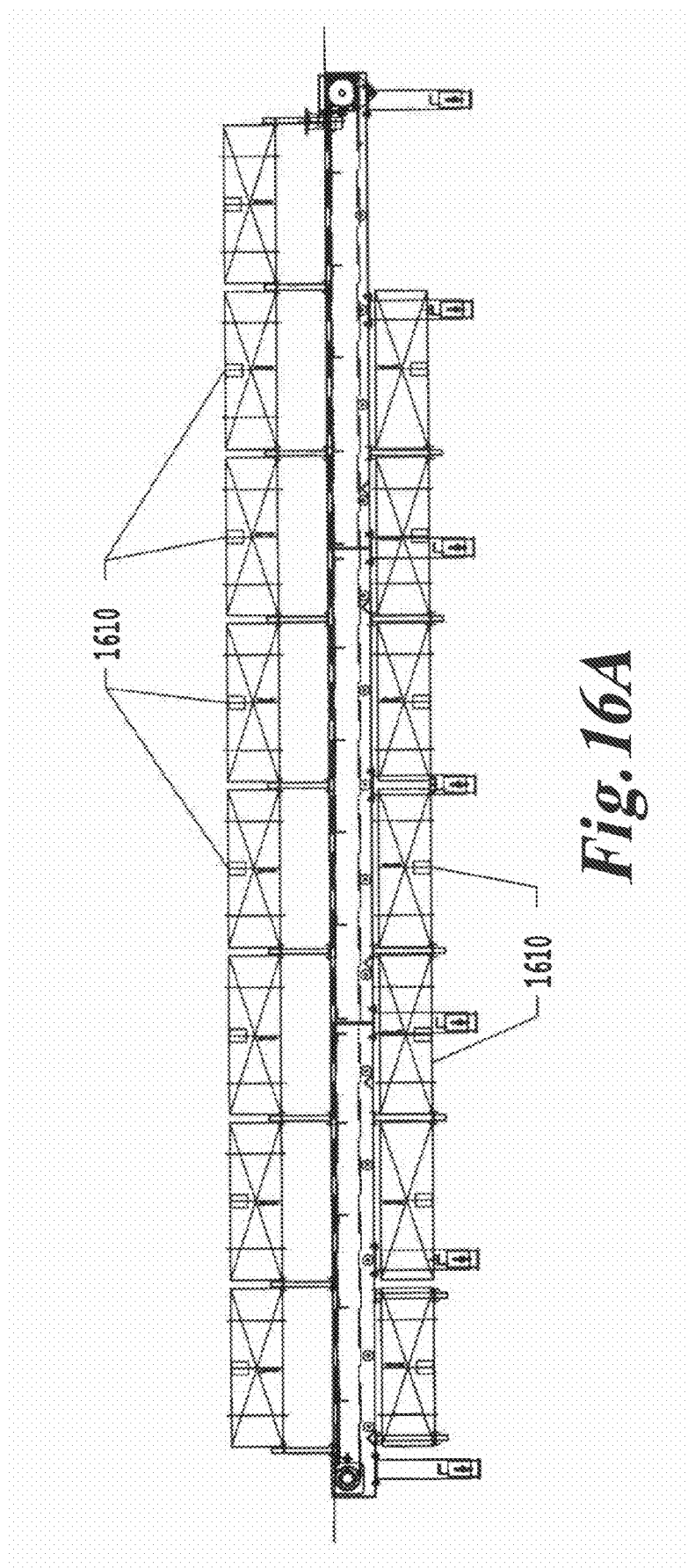
FIG. 16A is a side view of the laminator depicted in FIG. 16.
Figure 16C:
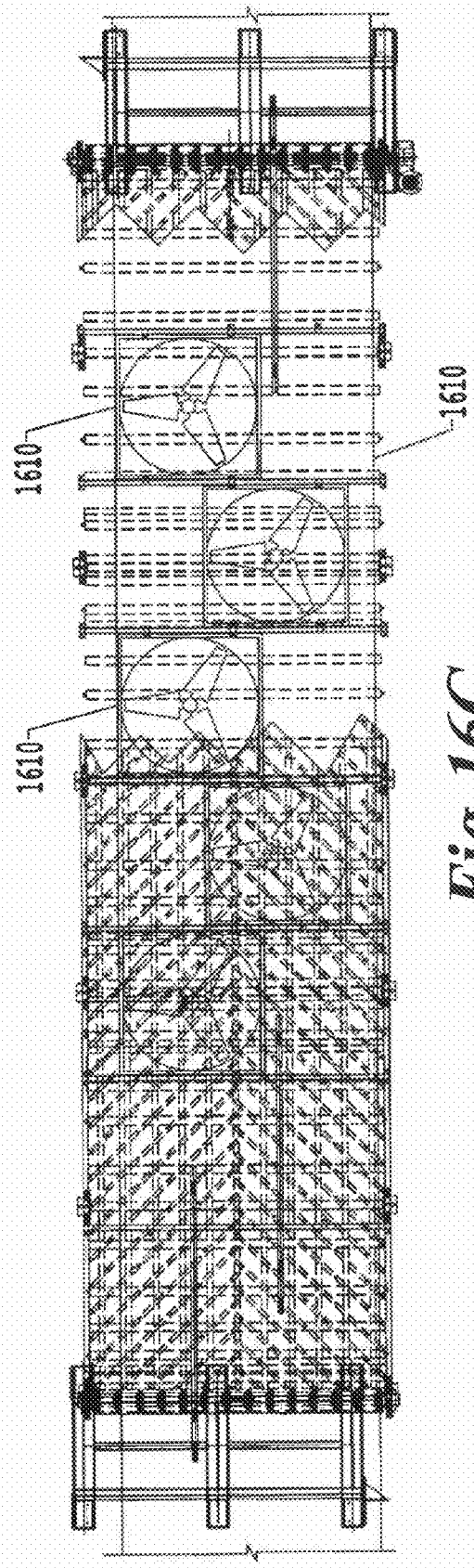
FIG. 16C is a top view of the laminator depicted in FIGS. 16, 16A, and 16B.
Figure 16D:
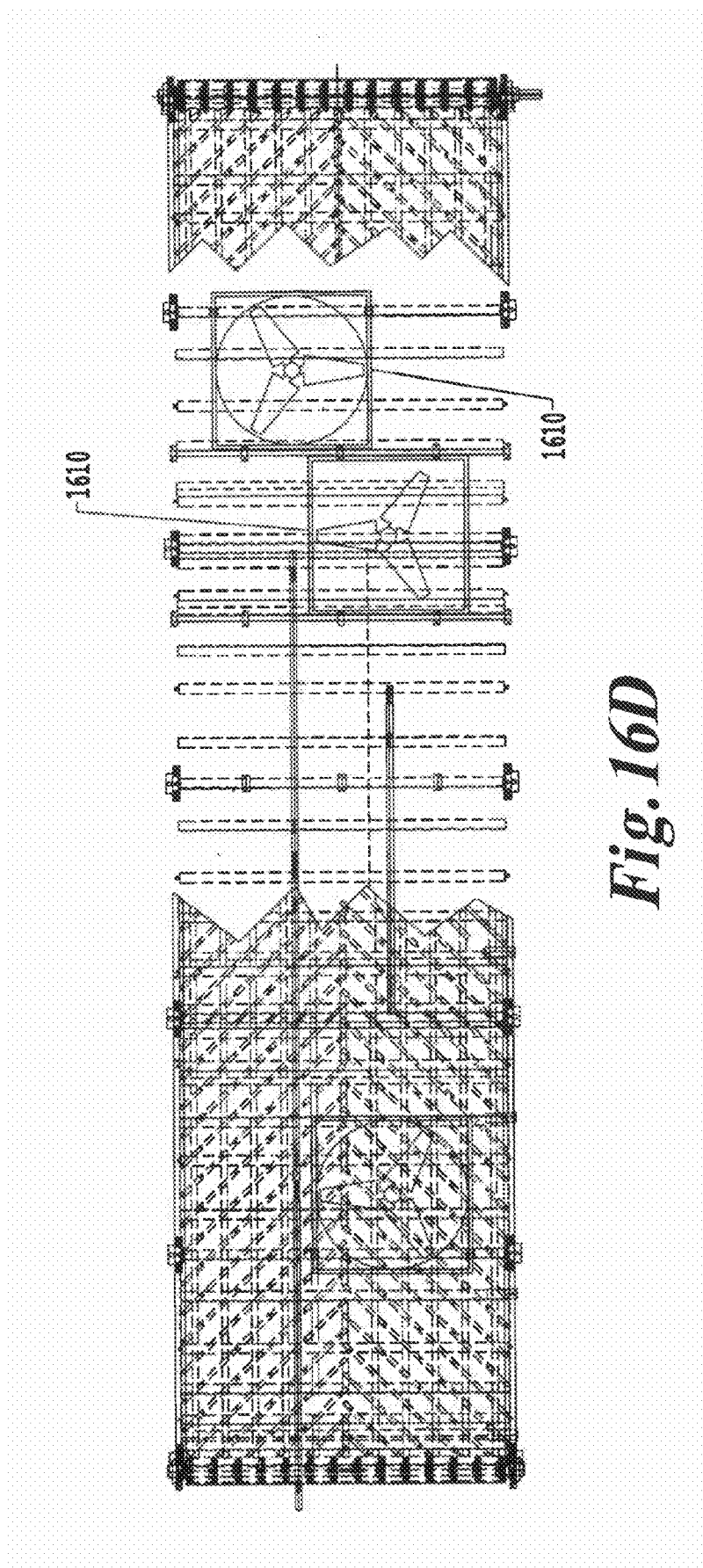
FIG. 16D is a bottom view of the laminator depicted in FIG. 16.

Upon exiting the laminator 1500, the laminated material 100 passes into the cooling conveyor 1600 shown in FIG. 16. The cooling conveyor 1600 typically cools the laminated material 100 by applying ambient or chilled air to at least one side of the laminated material 100, preferably both sides of the laminated material 100. FIG. 16A is a detailed side view of the laminator 1600 depicting fans 1610 depicted above and below a path where the material 100 travels. It is preferable that the cooling conveyor 1600 is from 10 to 40 feet, more preferably 20 to 35 feet, in length and that the cooling conveyor 1600 does not include sharp bends in the path of the laminated material 100 inasmuch as, having recently been heated during its bonding process, the laminated material 100 does not typically have its full tensile strength as it leaves the laminator 1500. Accordingly, the cooling conveyor 1600 typically includes a substantially straight path for the material 100 with fans 1610 disposed above and/or below the material 100 in order to allow the material 100 to cool before any substantial bending stress is applied to the material 100. As shown in FIGS. 16C and 16D, which are upper and lower plan views of the cooling conveyor 1600, fans 1610 may be disposed in a staggered pattern relative to the direction of movement (left to right) of the laminated material 100.

As shown in FIG. 16B, the fans 1610 are configured to blow cooling air over substantially an entire width of the laminated material 100. As further shown in FIG. 16B, there is typically a gap between the outputs of the fans 1610 and a surface of a belt 1620 on which the laminated material 100 is conveyed. This gap allows for variations in the thickness of the laminated material 100. For example, the laminated material 100 may be anywhere from about 1 to about 25 mm thick, more preferably about 2 to about 15 mm thick, and even more preferably about 4 to about 10 mm thick. It should be noted that, up to a certain point, the thinner the laminated material 100 is, the easier it is to heat, and therefore, the easier it is to bond. FIG. 17 depicts the laminated material 100 passing over an inspection station 1700. In the inspection station 1700, a user typically visually examines the material after it has been cooled in order to discover any defects that may be present in the material. Also depicted in FIG. 17 is a trim station in which edges of the laminated material 100 may be trimmed. For example, the trim station 1710 may comprise a water jet configured to cut a straight edge, or even a series of interlocking protrusions and cavities into the material. The interlocking cavities and protrusions form a so-called "puzzle-cut" pattern in which various pieces of laminated material 100 may be assembled to cover a floor the same way pieces of a child's puzzle interlock to form a picture. However, the typical procedure cuts a linear edge on the laminated material 100, and any puzzle cut patterning is performed later. In one example, the trim station 1710 cuts the laminated material 100 at an angle such that the facing material has a larger surface area than the backing material. In other words, the edge of the laminated material 100 is chamfered. One benefit of the above-noted chamfering is that, when pieces of the laminated material 100 are fit together, the upper surface of the laminated material 100, which exposes the facing material 110, abuts with an edge of an adjoining piece of laminated material 100 without interference from irregularities along the edge of the interior of the laminated material 100. In other words, any lumps or protrusions on the sides of the laminated material 100 do not interfere with closely abutting the top surface of the laminated material 100 with an adjoining piece of the laminated material 100.

After cutting with a water jet, air blowers typically blow air onto the cut material to dry it. In particular, the edges may be subjected to a directed air stream as this is the area most impacted by the water jet.

Figure 17A:
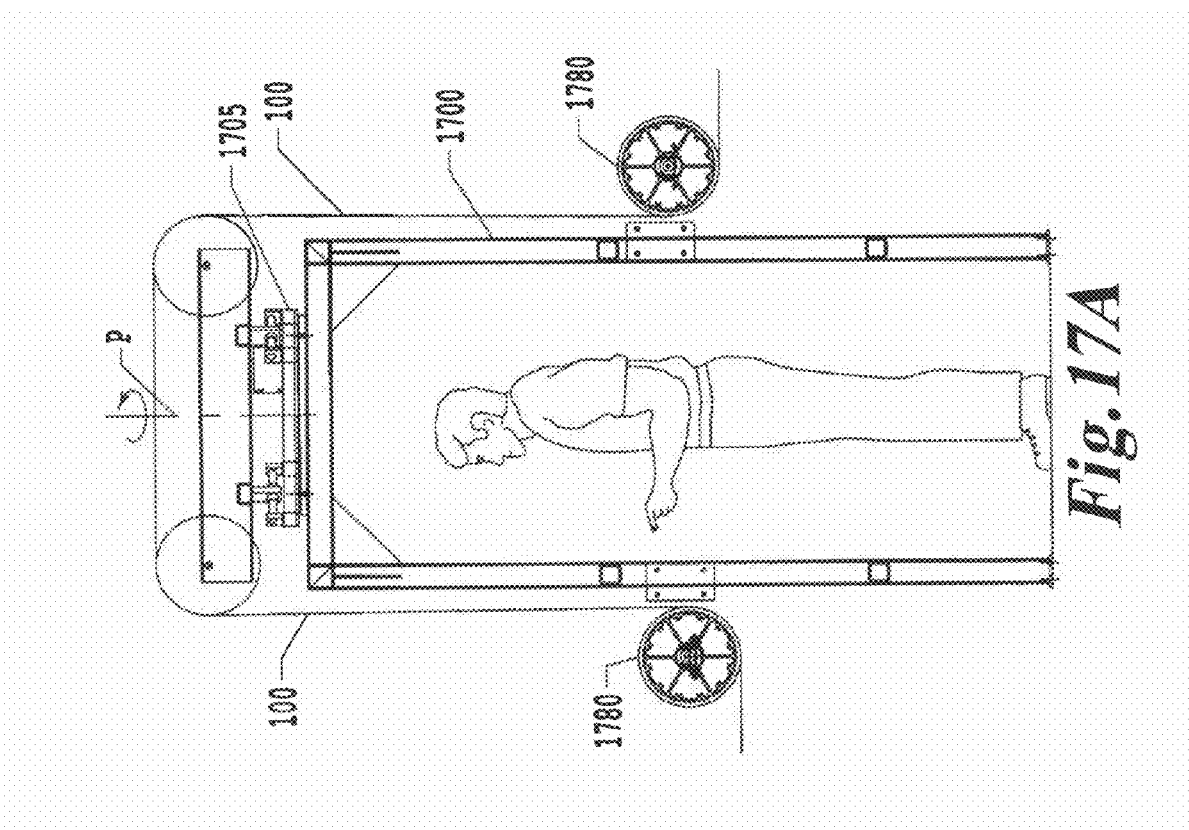
FIG. 17A is a side view of the inspection station depicted in FIG. 17.

FIG. 17A is a detailed view of the inspection station 1700. The rollers 1780 in the inspection station 1700 are typically of sufficient diameter to prevent excessive bending of the freshly laminated material 100 because, as discussed previously, the laminated material 100 may not be at its full tensile strength. Accordingly, it is preferable to maximize the bending radius of any changes in direction in the path of the laminated material 100. For example, it is preferable that the diameter of the rollers 1780 is at least eight inches. More preferably, the diameter of the rollers is ten to twelve inches.

The inspection station typically includes a guider 1705 that pivots about an axis P. The guider checks the material for deviation from its intended direction of travel (generally perpendicular to the axes of the rollers) and aligns the material to ensure that it does not move off of the machine. The guider 1705 typically incorporates an electric or hydraulic motor in combination with a sensor that determines the location of the laminated material. Additional guiders 1705 are typically disposed upstream to guide the materials used to form the laminated material, i.e., the facing material 110, backing material 130, and/or bonding material 120.

Figure 17B:
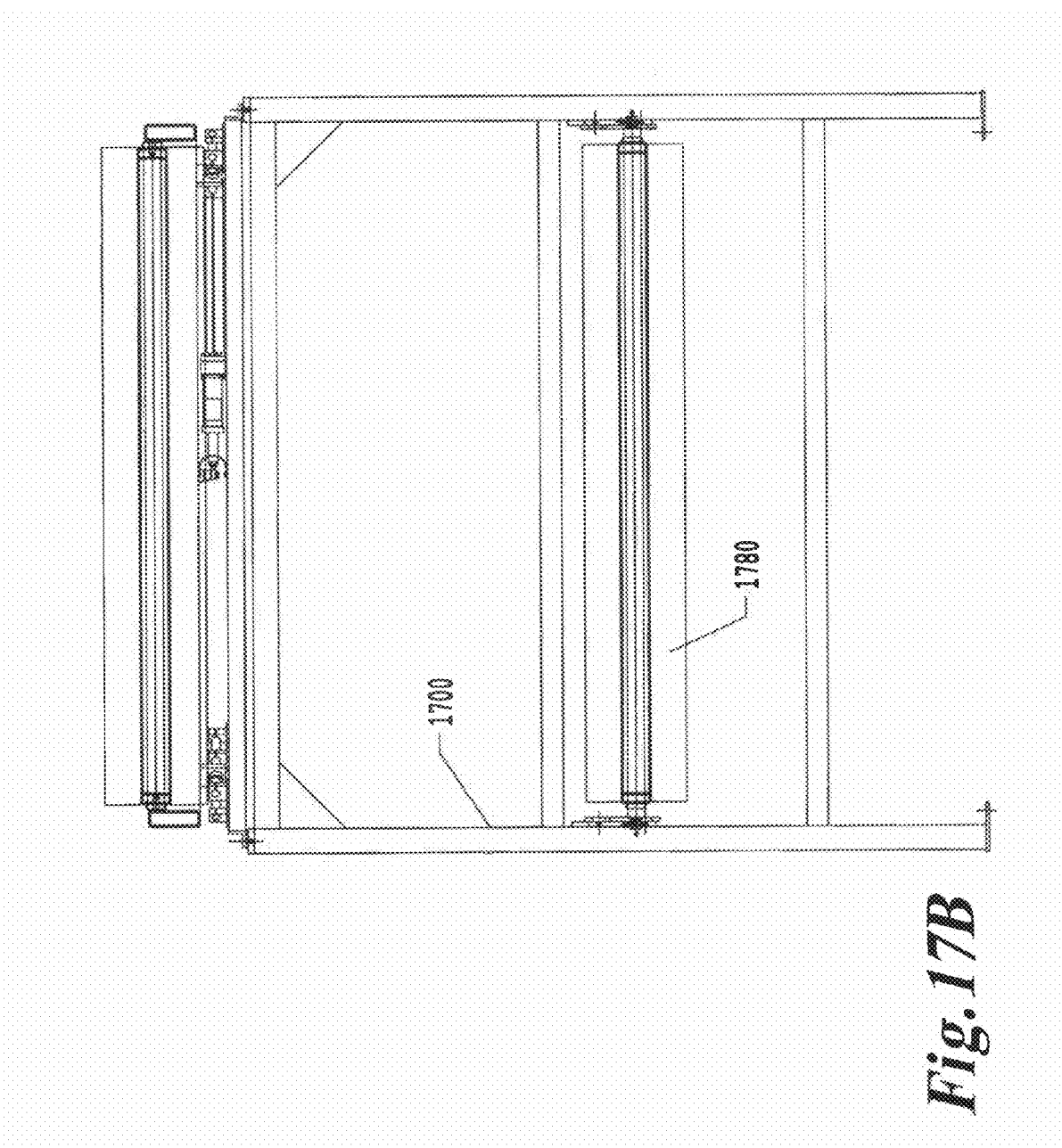
FIG. 17B is an end view of the inspection station depicted in FIG. 17.

FIG. 17B is an end view of the inspection station 1700. Typically, the rollers 1780 have a length of approximately 80 inches. However, other lengths are possible, and the length can be configured as needed.

Figure 17C:
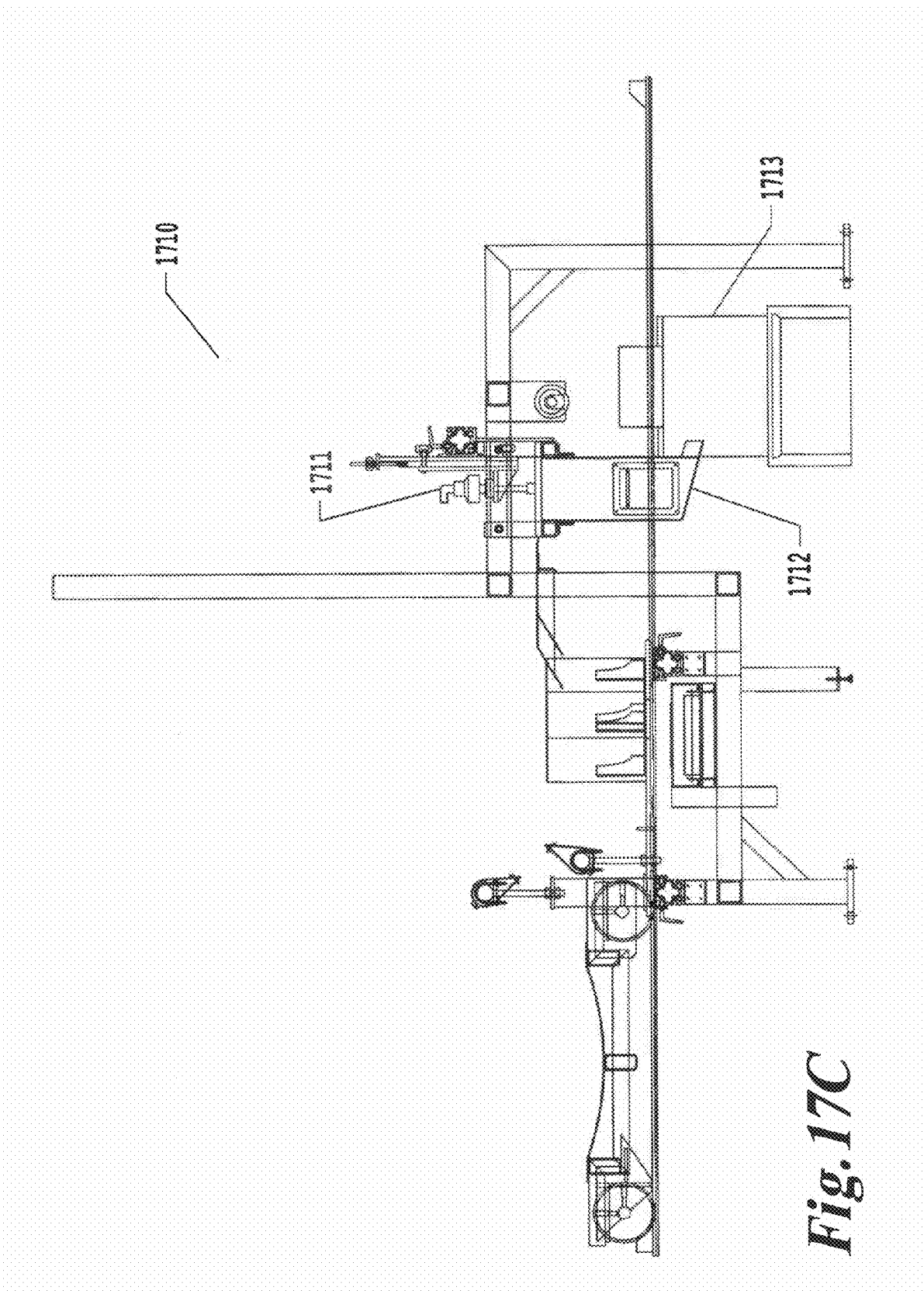
FIG. 17C is a side view of the trim station depicted in FIG. 17.

FIG. 17C is a side view of the trim station 1710 shown from an opposite perspective of that depicted in FIG. 17. In other words, FIG. 17C shows the trim station 1710 as the laminated material 100 moves from right to left. As discussed previously, in some cases, it is preferable to apply a chamfer to the edge of the laminated material 100 when trimming. In the example of the trim station 1710 shown in FIG. 17C, a nozzle of 0.10 inch in diameter (orifice) is provided. In another example, a nozzle with an orifice of 0.005 inches in diameter is provided. As shown in FIG. 17C, a nozzle subassembly 1711 directs a fluid jet into a tank 1712, which drains into a filter assembly 1713. Thus, fluid used in the trimming process and ejected through the nozzle 1711 can be recovered, filtered, and reused in order to reduce water consumption.

Figure 18:
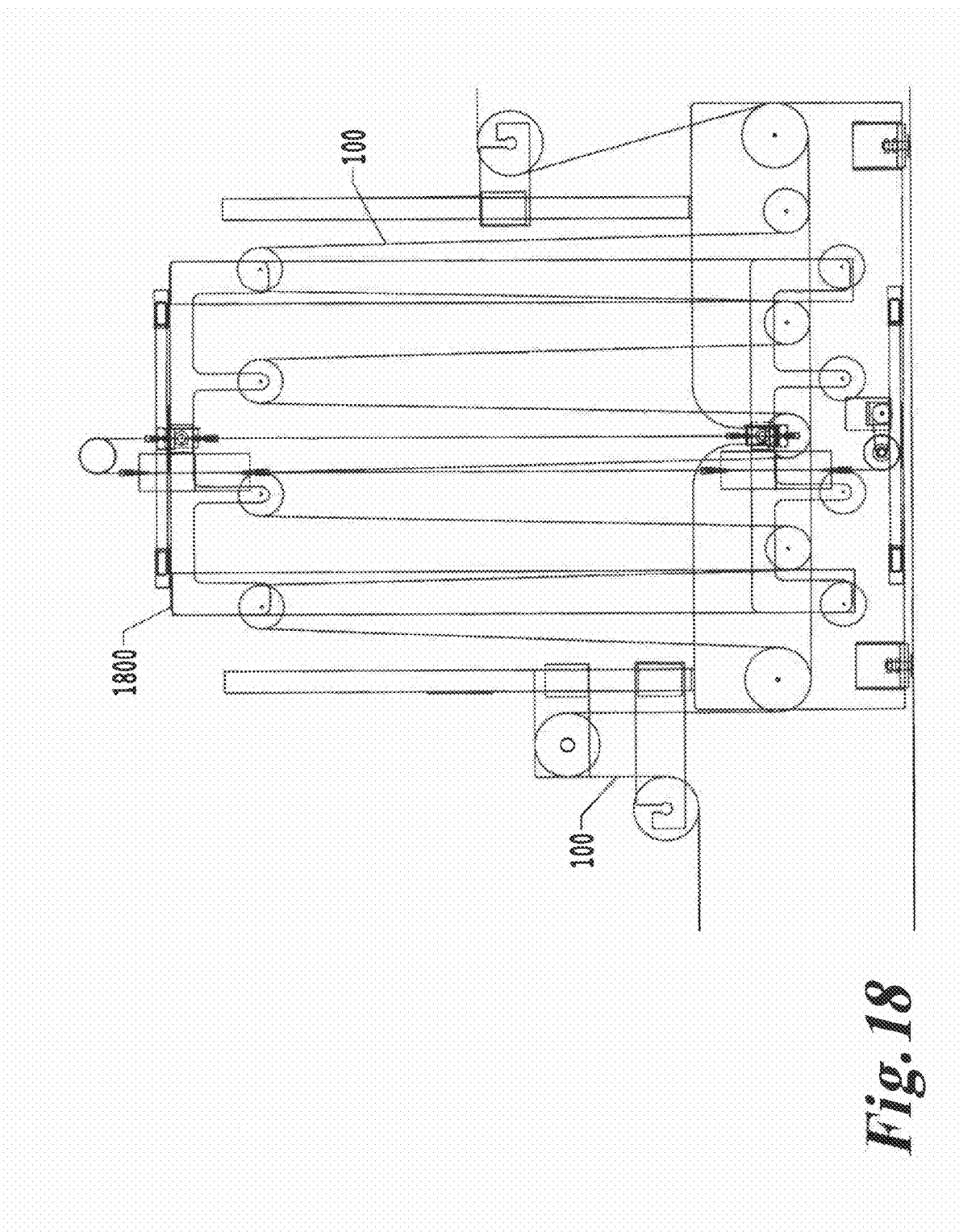
FIG. 18 depicts an accumulator disposed downstream of the cooling station and trim station depicted in FIGS. 16 and 17.

FIG. 18 depicts an accumulator 1800 disposed downstream of the trim station 1710. It should be noted, however, the trim station may follow the accumulator, if desired. The accumulator typically reverses direction of the laminated material from a substantially upward direction to a substantially downward direction repeatedly in order to provide a convenient way of storing material while the material is still in an unrolled state. In other words, by repeatedly reversing the direction of the laminated material 100, the accumulator 1800 can store, for example, 70 to 100 feet of material before the laminated material 100 is ultimately cut and rolled into rolls 1901 (see FIG. 19). In the embodiment shown in FIG. 18, about 71 feet of the laminated material 100 is shown stored in the path provided by the accumulator 1800.

Figure 19A:
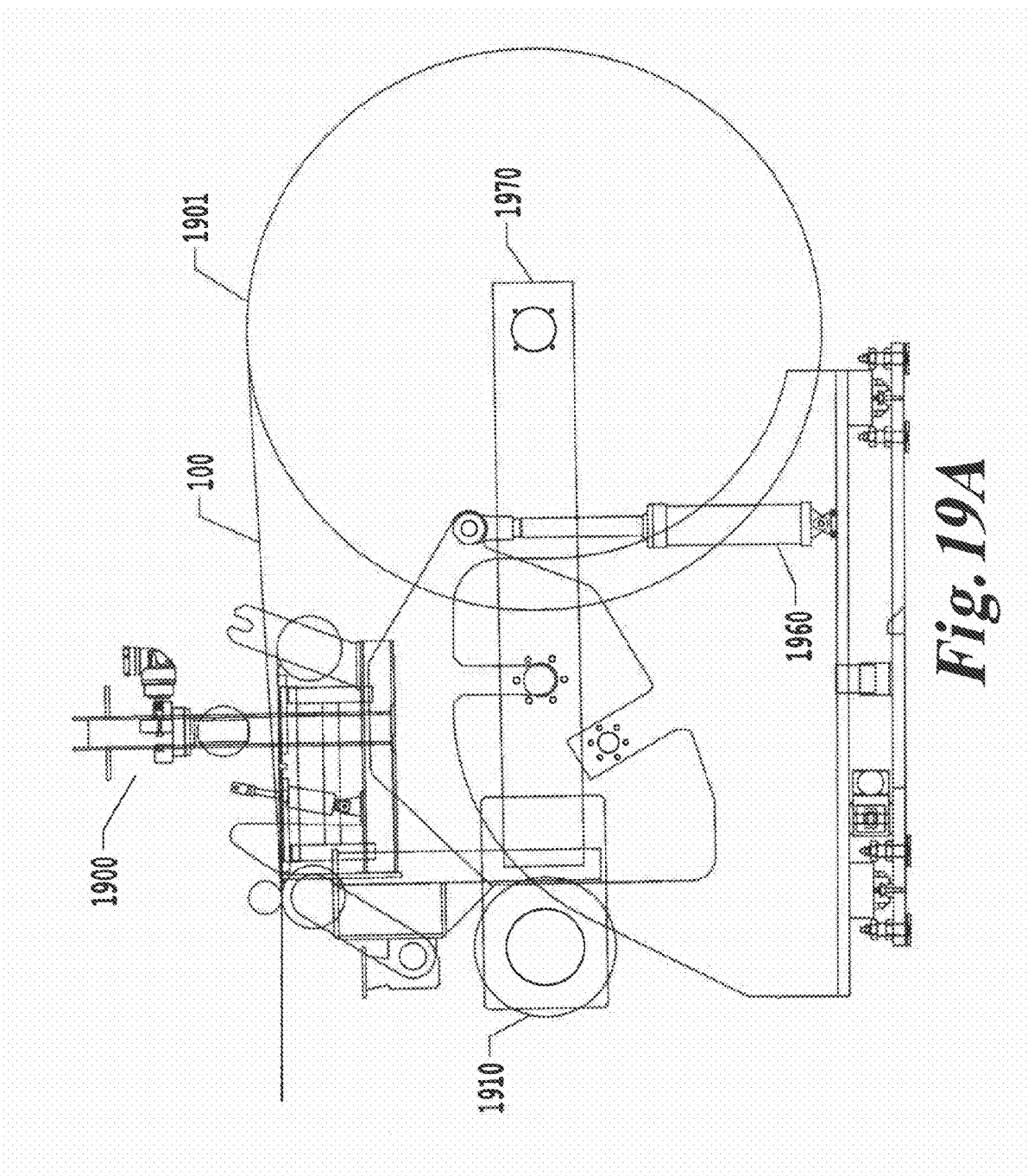
FIG. 19A is a detailed view of the rewind system depicted in FIG. 19.
Figure 19B:
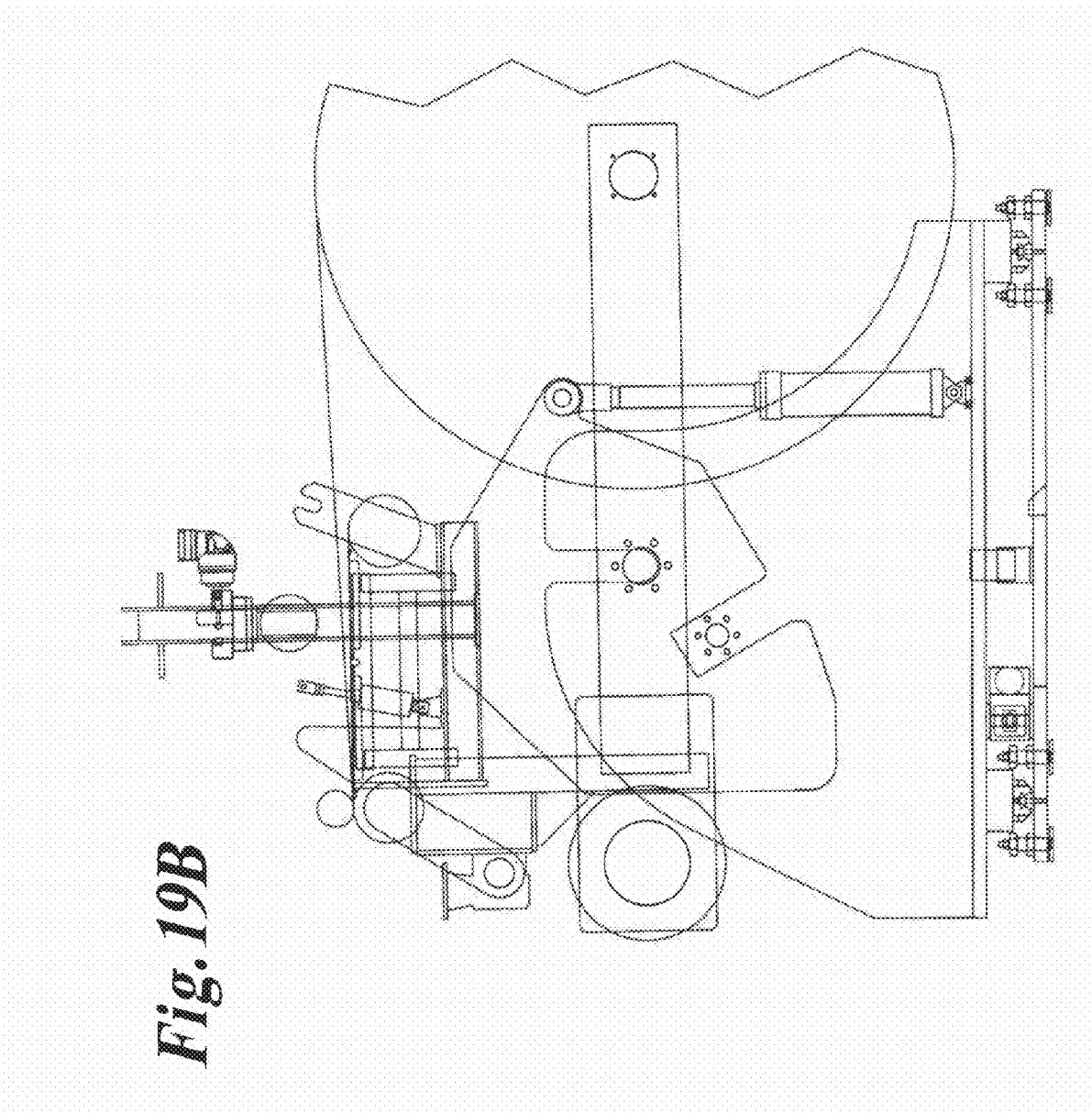
FIG. 19B is a partial view of the rewind system depicted in FIG. 19 in a loaded state.

FIG. 19 depicts a rewind station 1900 in which the laminated material 100 is rolled into a roll 1901. After being rolled into the roll 1901, the material is typically moved away on a roll shuttle 1950, which may be similar in construction to the roll shuttle used to deliver the backing material 130 or the facing material 110. FIG. 19A depicts a detailed view of the rewind station 100, which typically includes a motor 1910. Similar to the backing unwind station 1000, the rewind station 1900 typically includes a cylinder 1960 that applies a moment force to pivot the rewind station 1900 to unload the roll 1901 (see FIG. 19C). The roll 1901 is partially depicted in FIG. 19B before unloading. FIG. 19C depicts the rewind station 1900 after unloading the roll 1901.

Figure 20:
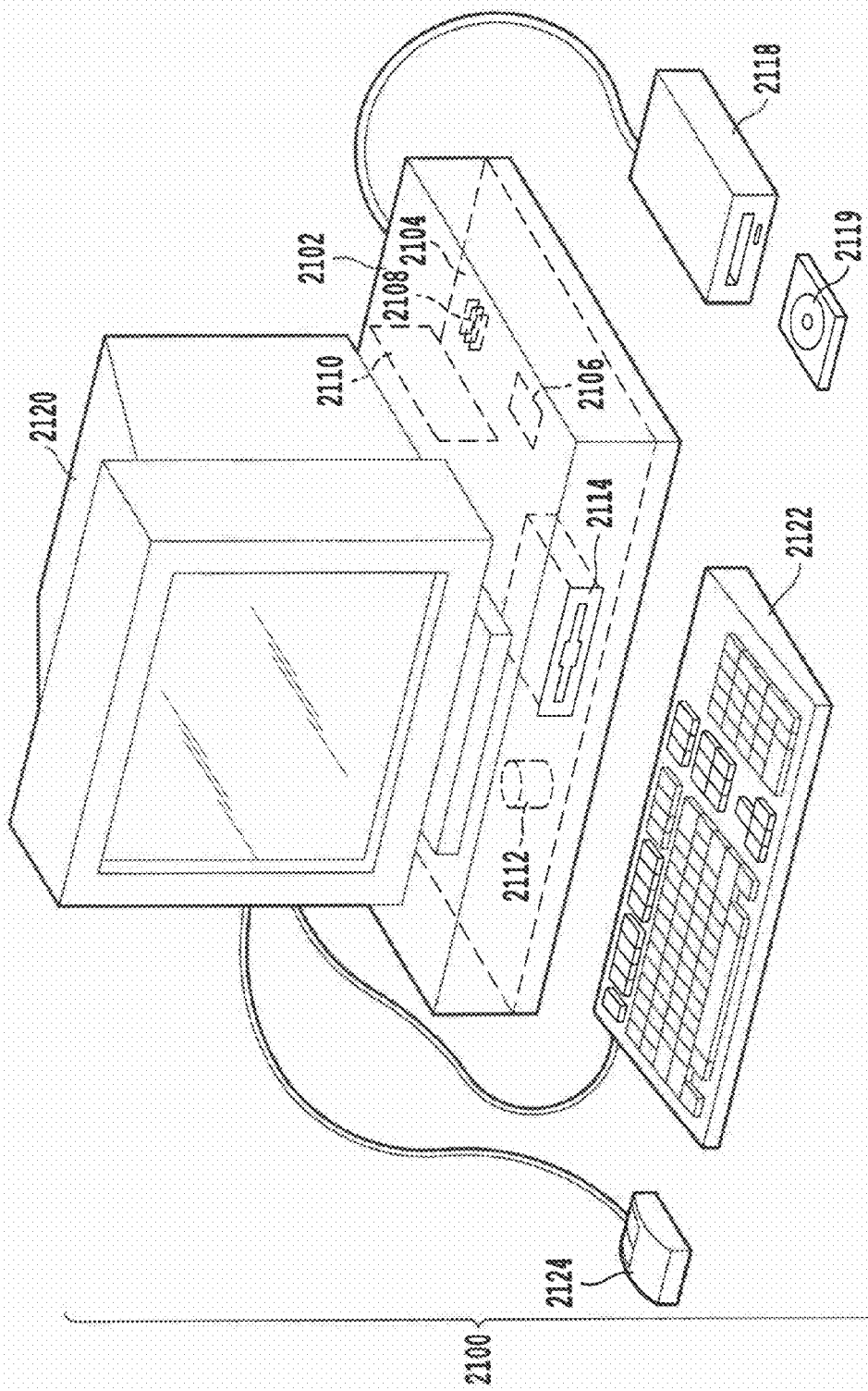
FIG. 20 is a schematic illustration of a computer system for operating the manufacturing system 101.

FIG. 20 is a schematic illustration of a computer system for operating the manufacturing system 101. A computer 2100 implements the method of the present invention, wherein the computer housing 2102 houses a motherboard 2104 which contains a CPU 2106, memory 2108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 2100 also includes plural input devices, (e.g., a keyboard 2122 and mouse 2124), and a display card 2110 for controlling monitor 2120. In addition, the computer system 2100 further includes a floppy disk drive 2114; other removable media devices (e.g., compact disc 2119, tape, and removable magneto-optical media (not shown)); and a hard disk 2112, or other fixed, high density media drives, connected using an appropriate device bus (e.g., a SCSI bus, an Enhanced IDE bus, or a Ultra DMA bus). Also connected to the same device bus or another device bus, the computer 2100 may additionally include a compact disc reader 2118, a compact disc reader/writer unit (not shown) or a compact disc jukebox (not shown). Although compact disc 2119 is shown in a CD caddy, the compact disc 2119 can be inserted directly into CD-ROM drives which do not require caddies. In addition, a printer (not shown) also provides printed listings of tracked temperatures and tomographic information.

As stated above, the system includes at least one computer readable medium. Examples of computer readable media are compact discs 2119, hard disks 2112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 2100 and for enabling the computer 2100 to interact with a human user. Such software may include, but is not limited to, device drivers, operating systems and user applications, such as development tools. Such computer readable media further includes the computer program product of the present invention for tracking temperature and tomographic information. The computer code devices of the present invention can be any interpreted or executable code mechanism, including but not limited to scripts, interpreters, dynamic link libraries, Java classes, and complete executable programs. The computer 2100 is typically configured to execute code stored in one of the above-noted computer readable media, which, when executed on the computer 2100, causes the computer 2100 to operate the manufacturing system 101 to perform any of the processes described in this document and to produce any of the products described in this document.

Although only certain embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention. For example, the process and system described above may be arranged to handle various thicknesses of material 100. For example, from one millimeter to 50 millimeters. Additionally, various widths of materials may be accommodated in the processes and system described above. For example, widths from a few inches to a dozen feet may be implemented.

Figure 21:
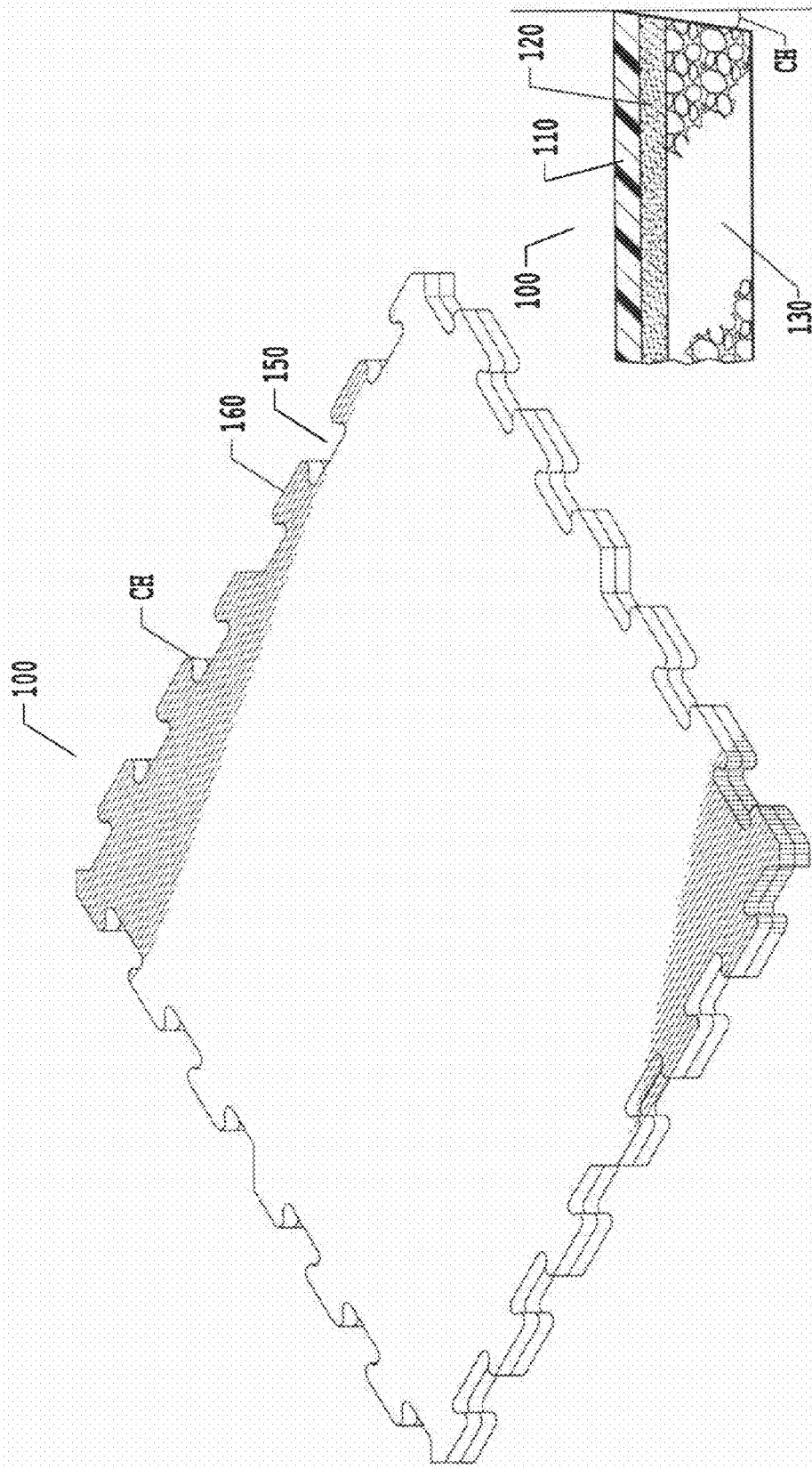
FIG. 21 is a depiction of a puzzle-cut pattern that can be applied to any of the covering materials described herein.

FIG. 21 is a view of a puzzle-cut flooring material according to one embodiment of the invention with a series of interlocking cavities 150 and protrusions 160. This arrangement can be applied to any configuration of the product 100. In many cases, the cavities 150 and protrusions 160 will interlock such that a first piece the product 100 will have to be lifted relative to an interlocked second piece of the product 100 in order to release the protrusions 160 of the first piece of the product 100 from the cavities 150 of the second piece of the product 100. Additionally, the edge of the product 100 is often chamfered with a chamfer CH (see FIG. 21A). In one example, the chamfer CH is approximately 5 degrees, which results in a slightly larger surface area for the top portion of the product 100 relative to the bottom portion. As discussed previously, this chamfer allows adjacent pieces of the product 100 to rest next to each other (or interlock) without interference from irregularities in the sidewalls of the product 100. One benefit of this arrangement is that seams between the top surfaces of the interlocked pieces of the product 100 are less visible from above. A chamfer such as the one depicted in FIG. 21A can be applied to the product 100 regardless of whether the product includes cavities 150 or protrusions 160. In other words, the chamfer CH can be applied to straight edges of the product 100 as well as to curved edges. Other shapes and sizes of cut pieces of the flooring may be made, aside from the puzzle-cut flooring shown in FIG. 21. For example, large or small circles, polygons, curved pieces, and strips may be produced.

Although the product 100 depicted in FIG. 21 includes cavities 150 and protrusions 160 on all four sides as viewed from above, the shape of the product 100 and the number of sides on which cavities 150 and protrusions 160 are present can vary. For example, in many instances, it is preferable that one or more of the sides of the product 100 are straight so that these sides present an edge that fits along a wall, into a corner, or defines a particular living/working space. In some cases, the straight edges are un-chamfered while the interlocking areas are chamfered. In other cases, all the edges are chamfered, even the straight edges.

Figure 22:
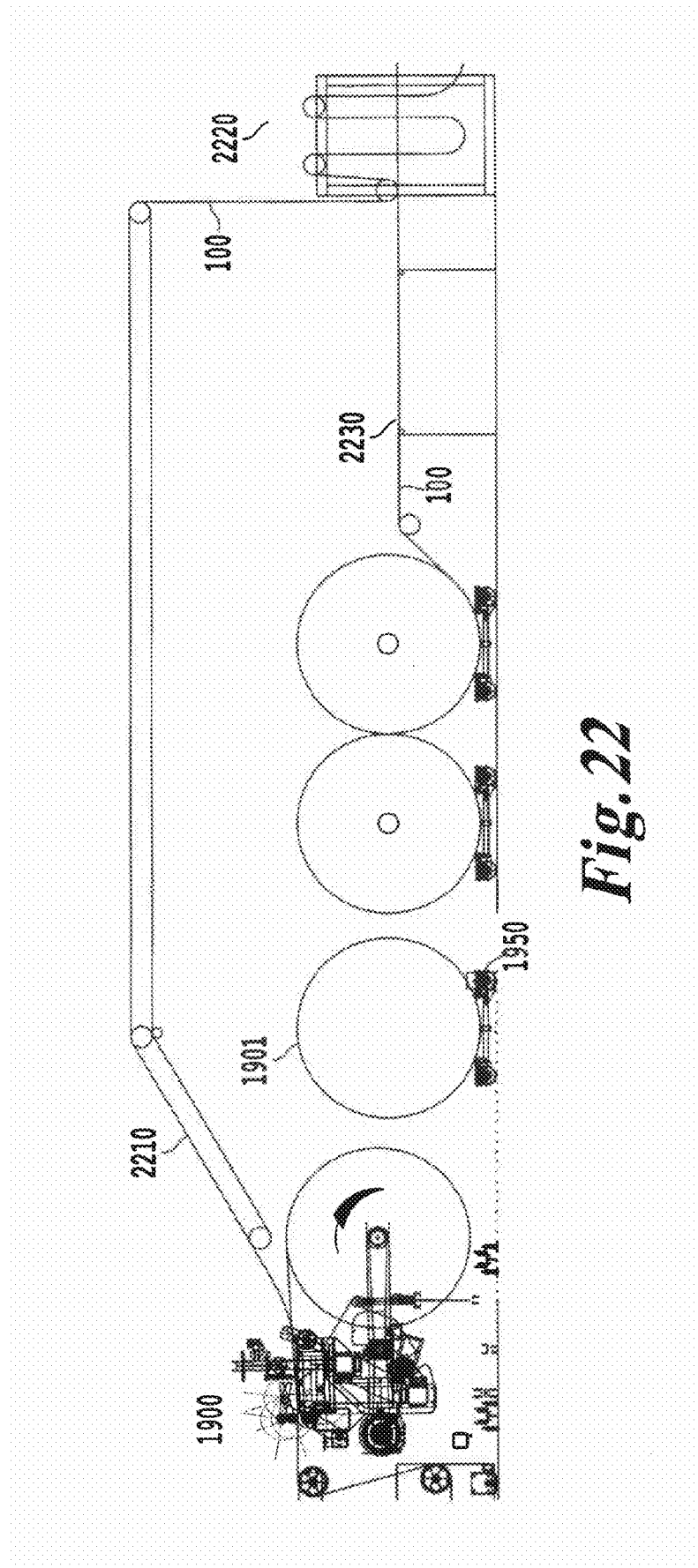
FIG. 22 depicts a side view of an arrangement of the laminator with a first part of an optional/alternative continuous die cutting pathway.

FIG. 22 depicts a first portion of a die cutting system that may be implemented in combination with the lamination system described above. In one embodiment, the die cutting system is entirely detached from the lamination system, and rolls 1901 are positioned in an unload or unwind station directly in front of a stencil table 2230. In such an arrangement, one benefit is that the die cutting station may be used with materials unrelated to those currently being produced in the lamination system. Another benefit is that the rolls 1901 may be temporarily stored before being die cut. In this way, the final form of the material in the rolls may be determined well after the lamination is completed.

In another arrangement, product 100 bypasses the rewind station 1900 and travels along a bypass conveyor 2210 and toward a mini-accumulator 2220. The mini-accumulator 2220 may be the same or similar to the accumulator 1800 discussed previously. Typically, however, the mini-accumulator 2220 stores less material than the accumulator 1800. By storing material in the mini-accumulator 2220, the infeed table 2310 (see FIG. 23) can continuously supply the press 2320 (shown in FIG. 23). In other words, as the laminator system typically feeds material continuously, and sometimes at a substantially constant rate, the mini-accumulator 2220 allows a build-up of material to supply the press 2320, which typically functions as an indexing machine inasmuch as material starts and stops in order to feed the press 2320.

As shown in FIG. 23, the press 2320, once having pressed a pattern into the product 100, sends the pressed, i.e., cut, material to the outfeed table 2330 which then may send the material to a take-away conveyor 2340 that feeds a shuttle conveyor 2350 that stacks the cut pieces in a stack 2360. Alternatively, the cut pieces produced by the press 2320 may be stacked by hand rather than handled by a take-away conveyor 2340 and shuttle conveyor 2350.

The press 2320 typically uses a belt such as a urethane belt in order to accommodate the pressing action used to cut the product 100. The flexible belt supports the product 100 during the pressing portion of the die cutting process. To perform die cutting, the press 2320 exerts a force on the product 100 and shears the product 100 into any of various shapes such as squares, rectangles, other polygons, circles, or the above-noted puzzle-cut pieces. The die cutting system may be controlled by the same controller used to the control the lamination system or may have its own controller or computer system. In one embodiment, the die cutting system is operated via manual control.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for installing a laminated surface covering on a substrate, comprising:
    installing a plurality of laminated surface tiles on the substrate and interlocking the laminated surface tiles to form a two dimensional laminated surface covering on the substrate, wherein the laminated surface covering comprises:
        a plurality of laminated surface tiles shaped from a laminated surface covering including a base surface, an adhesive, and a face surface,
        wherein the plurality of laminated surface tiles include edge surfaces with protrusion portions and cavity portions, and the protrusion portions are interlocked with the cavity portions between different laminated surface tiles,
        wherein the base surface of the laminated surface covering comprises a layer of a backing material and the face surface of the laminated surface covering comprises a layer of a facing material, and the adhesive bonds the facing material directly to the backing material; and
        wherein the backing material comprises a rubber component;
    wherein the substrate comprises a substantially horizontal surface having a plurality of non-horizontal borders; and
    wherein the laminated surface tiles are installed on the substrate without fixing the laminated surface tiles to the horizontal surface of the substrate.

2. The process of claim 1, wherein the substrate is in the form of a floor.

3. The process of claim 1, wherein the laminated surface tiles are from about 2 mm to about 25 mm thick.

4. The process of claim 1, wherein the laminated surface tiles are from about 2 mm to about 15 mm thick.

5. The process of claim 1, wherein the base surface material comprises granulated recycled rubber from tires.

6. The process of claim 1, wherein the base surface material comprises at least 10% by weight of reground rubber from a recycled surface covering.

7. The process of claim 1, wherein the base surface material comprises reground rubber from a recycled surface covering.

8. The process of claim 1, wherein the base surface material comprises first and second rubber granules, the first rubber granules having a first specific gravity, the second rubber granules having a second specific gravity different from the first specific gravity.

9. The process of claim 1, wherein the facing material comprises at least one of a synthetic fiber, a rubber, a wood, a natural fiber, a flocked material, a tufted material, a recycled fiber, a woven fabric, and a non-woven fabric.

10. The process of claim 1, wherein the rubber component is a recycled, granulated, rebounded rubber.

11. The process of claim 1, wherein the adhesive comprises a layer of bonding material that is in a solid form at room temperature.

12. The process of claim 1, wherein the surface tension of the backing material is disrupted prior to bonding with the facing material.

13. A process for installing a laminated surface covering on a substrate, comprising:
 installing a plurality of laminated surface tiles on the substrate and interlocking the laminated surface tiles to form a two dimensional covering on the substrate, wherein the laminated surface covering comprises:
  a plurality of laminated surface tiles shaped from a laminate comprising a facing material, a backing material comprising a rubber component, and a bonding material disposed between the facing material and the backing material, wherein the surface tension of the backing material is disrupted prior to directly bonding with the facing material,
  wherein the plurality of laminated surface tiles include edge surfaces with protrusion portions and cavity portions, and the protrusion portions are interlocked with the cavity portions between different laminated surface tiles, and
  wherein the backing material comprises a rubber component;
 wherein the substrate comprises a substantially horizontal surface having a plurality of non-horizontal borders; and
 wherein the laminated surface tiles are installed on the substrate without fixing the laminated surface tiles to the horizontal surface of the substrate.

14. The process of claim 13, wherein the substrate is in the form of a floor.

15. The process of claim 13, wherein the laminated surface tiles are from about 2 mm to about 25 mm thick.

16. The process of claim 13, wherein the laminated surface tiles are from about 2 mm to about 15 mm thick.

17. The process of claim 13, wherein the base surface material comprises granulated recycled rubber from tires.

18. The process of claim 13, wherein the base surface material comprises at least 10% by weight of reground rubber from a recycled surface covering.

19. The process of claim 13, wherein the base surface material comprises reground rubber from a recycled surface covering.

20. The process of claim 13, wherein the base surface material comprises first and second rubber granules, the first rubber granules having a first specific gravity, the second rubber granules having a second specific gravity different from the first specific gravity.

21. The process of claim 13, wherein the facing material comprises at least one of a synthetic fiber, a rubber, a wood, a natural fiber, a flocked material, a tufted material, a recycled fiber, a woven fabric, and a non-woven fabric.

22. The process of claim 13, wherein the rubber component is a recycled, granulated, rebounded rubber.

23. The process of claim 13, wherein the adhesive comprises a layer of bonding material that is in a solid form at room temperature.

24. A process for installing a laminated surface covering on a substrate, comprising:
 installing a plurality of laminated surface tiles on the substrate and interlocking the laminated surface tiles to form a two dimensional covering on the substrate, wherein the laminated surface covering comprises:
  a plurality of laminated surface tiles including a base surface, an adhesive, and a face surface,
  wherein the plurality of laminated surface tiles include edge surfaces with protrusion portions and cavity portions, and the protrusion portions are interlocked with the cavity portions between different laminated surface tiles,
  wherein the base surface comprises a rubber component, and
  wherein the base surface and the face surface are laminated directly together;
 wherein the substrate comprises a substantially horizontal surface having a plurality of non-horizontal borders; and
 wherein the laminated surface tiles are installed on the substrate without fixing the laminated surface tiles to the horizontal surface of the substrate.

* * * * *